(12) United States Patent
Moriya et al.

(10) Patent No.: US 8,698,114 B2
(45) Date of Patent: Apr. 15, 2014

(54) EXTREME ULTRAVIOLET LIGHT SOURCE DEVICE, LASER LIGHT SOURCE DEVICE FOR EXTREME ULTRAVIOLET LIGHT SOURCE, AND METHOD OF ADJUSTING LASER LIGHT SOURCE DEVICE FOR EXTREME ULTRAVIOLET LIGHT SOURCE DEVICE

(71) Applicant: Gigaphoton Inc., Oyama (JP)

(72) Inventors: Masato Moriya, Hiratsuka (JP); Hideo Hoshino, Hiratsuka (JP); Hakaru Mizoguchi, Hiratsuka (JP); Osamu Wakabayashi, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/759,970

(22) Filed: Feb. 5, 2013

(65) Prior Publication Data

US 2013/0148677 A1    Jun. 13, 2013

Related U.S. Application Data

(62) Division of application No. 12/560,864, filed on Sep. 16, 2009, now Pat. No. 8,395,133.

(30) Foreign Application Priority Data

Sep. 19, 2008  (JP) ................................. 2008-240915
Jan. 16, 2009  (JP) ................................. 2009-008001
Sep. 14, 2009  (JP) ................................. 2009-212003

(51) Int. Cl.
*G21K 5/00*    (2006.01)

(52) U.S. Cl.
USPC ................... 250/504 R; 250/423 R; 250/424; 250/425; 250/493.1; 250/494.1

(58) Field of Classification Search
USPC ............... 250/423 R, 424, 425, 493.1, 494.1, 250/504 R
See application file for complete search history.

(56) References Cited

U.S. PATENT DOCUMENTS

| | | | |
|---|---|---|---|
| 5,994,687 A * | 11/1999 | Chanteloup et al. ....... | 250/201.9 |
| 8,395,133 B2 * | 3/2013 | Moriya et al. ............ | 250/504 R |
| 2008/0179549 A1 * | 7/2008 | Bykanov et al. .......... | 250/504 R |
| 2010/0078577 A1 * | 4/2010 | Moriya et al. ............ | 250/504 R |

FOREIGN PATENT DOCUMENTS

| | | |
|---|---|---|
| JP | 2003-270551 A | 9/2003 |
| JP | 2006-128157 A | 5/2006 |

* cited by examiner

*Primary Examiner* — Michael Logie
(74) *Attorney, Agent, or Firm* — McDermott Will & Emery LLP

(57) ABSTRACT

An EUV light source device properly compensates the wave front of laser beam which is changed by heat. A wave front compensator and a sensor are provided in an amplification system which amplifies laser beam. The sensor detects and outputs changes in the angle (direction) of laser beam and the curvature of the wave front thereof. A wave front compensation controller outputs a signal to the wave front compensator based on the measurement results from the sensor. The wave front compensator corrects the wave front of the laser beam to a predetermined wave front according to an instruction from the wave front compensation controller.

18 Claims, 63 Drawing Sheets

FIG. 53

| | LINE OF DRIVER LASER BEAM | | | | BEAM DELIVERY + FOCUSING OPTICAL SYSTEM | | | |
|---|---|---|---|---|---|---|---|---|
| | WAVE FRONT CHANGE CAUSED BY AMPLIFIER | | WAVE FRONT CHANGE CAUSED BY SA | | | | | |
| | WAVE FRONT COMPENSATOR | SENSOR | WAVE FRONT COMPENSATOR | SENSOR | WAVE FRONT COMPENSATOR | ISOLATOR | FOCUSING OPTICAL SYSTEM | SENSOR |
| #1 | FIG. 30 | FIG. 37 | FIG. 30 | FIG. 37 | FIG. 31 | FIG. 13 | FIG. 12 | PART OF FIG. 45 |
| #2 | FIG. 30 | FIG. 37 | FIGS. 33, 34 | FIG. 42 | FIGS. 19, 20 | FIG. 13 | FIG. 12 | FIG. 42 |
| #3 | FIG. 31 | FIG. 46 | FIGS. 33, 34 | FIG. 42 | FIGS. 33, 34 | FIG. 13 | FIG. 12 | FIG. 42 |

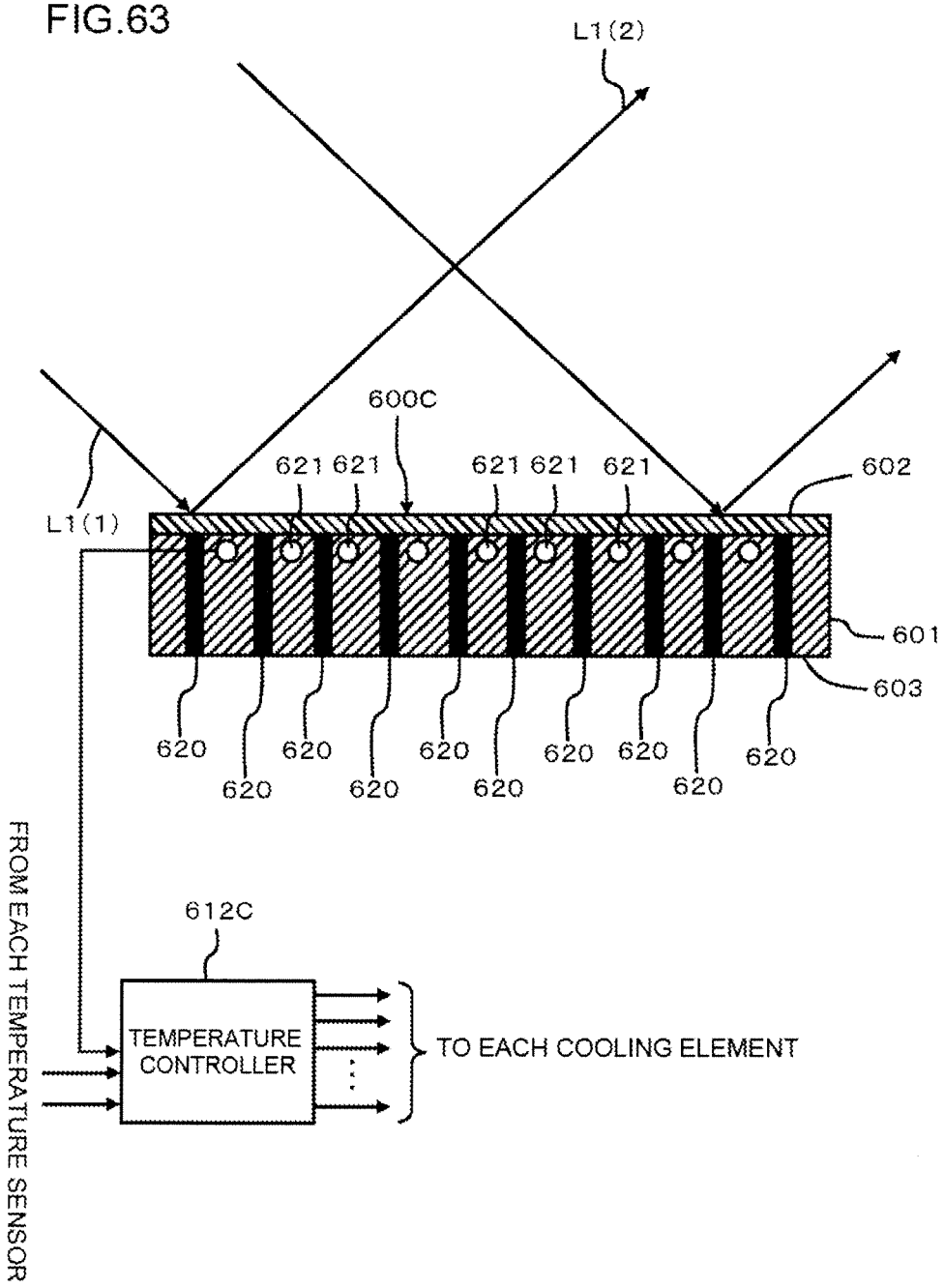

EXTREME ULTRAVIOLET LIGHT SOURCE DEVICE, LASER LIGHT SOURCE DEVICE FOR EXTREME ULTRAVIOLET LIGHT SOURCE, AND METHOD OF ADJUSTING LASER LIGHT SOURCE DEVICE FOR EXTREME ULTRAVIOLET LIGHT SOURCE DEVICE

RELATED APPLICATIONS

The present application is a Divisional of U.S. application Ser. No. 12/560,864 filed on Sep. 16, 2009, which in turn claims priority from Japanese application Nos. 2009-212003 filed on Sep. 14, 2009, 2009-008001 filed on Jan. 16, 2009 and 2008-240915 filed Sep. 19, 2008, the entire contents of each of which are hereby incorporated by reference into this application.

BACKGROUND OF THE INVENTION

The present invention relates to an extreme ultraviolet light source device, a laser light source device for an extreme ultraviolet light source device, and a method of adjusting a laser light source device for an extreme ultraviolet light source device.

A semiconductor chip is created, for example, by reduction projection of a mask on which a circuit pattern is drawn onto a wafer having a resist applied thereon, and by repeatedly performing processing, such as etching and of thin film formation. The progressive reduction of the scale of semiconductor processing demands the use of radiation of further short wavelength.

Accordingly, research has been made on a semiconductor exposure technique which uses radiation of extremely short wavelength of 13.5 nm or so and a reduction optics system. This type of technique is termed EUVL (Extreme Ultra Violet Lithography: exposure using extreme ultraviolet light). Hereinafter, extreme ultraviolet light will be abbreviated as "EUV light".

Three types of EUV light sources are known: an LPP (Laser Produced Plasma: plasma produced by a laser) type light source, a DPP (Discharge Produced Plasma) type light source, and an SR (Synchrotron Radiation) type light source.

The LPP type light source is a light source which generates a plasma by irradiating laser beam on a target material, and employs EUV radiation emitted from this plasma. The DPP type light source is a light source which employs a plasma generated by an electrical discharge. The SR (synchrotron radiation) is a light source which uses orbital radiation. Of those three types of light sources, the LPP type light source is more likely to acquire high-output EUV radiation as compared to the other two types because the LPP type light source can provide an increased plasma density, and can ensure a larger solid angle over which the radiation is collected.

To acquire high-power laser beam at a high repeating frequency, therefore, a laser light source device configured according to the MOPA (Master Oscillator Power Amplifier) system is proposed (JP-A-2006-128157).

An art of regulating the wave front of laser beam using a deformable mirror whose surface shape can be variable controlled freely to some extent is known (JP-A-2003-270551).

To acquire EUV radiation of 100 W to 200 W or so, for example, it is necessary to set the output of a carbon dioxide gas laser as driver laser beam to 10 to 20 kW or so. The use of such high-power laser beam causes various optical elements in the optical path to absorb radiation and thus become hot, so that the shape and direction of the wave front of laser beam change. It is described herein that the wave front of laser beam includes the shape and direction of the wave front of laser beam.

When high-power laser beam passes through a lens or a window, the shape and refractive index of the lens or window vary due to a heat-originated temperature increase, changing the wave front of laser beam. When the wave front of laser beam changes, for example, the laser beam cannot be efficiently input to an amplification area in a laser amplifier, so that a laser output cannot be acquired as expected. Further, because the focal position of laser beam which is input into the chamber changes according to a change in the wave front of the laser beam, the laser beam cannot be efficiently irradiated on a target material, thus lowering the power of the EUV radiation.

SUMMARY OF THE INVENTION

Accordingly, the present invention addresses the above-identified problems, and it is an object of the invention to provide an extreme ultraviolet light source device, a laser light source device for an extreme ultraviolet light source device, and a method of adjusting a laser light source device for an extreme ultraviolet light source device, which can compensate the direction of laser beam and the shape of the wave front thereof to a predetermined direction and predetermined wave front shape. It is another object of the invention to provide an extreme ultraviolet light source device, a laser light source device for an extreme ultraviolet light source device, and a method of adjusting a laser light source device for an extreme ultraviolet light source device, which can compensate the direction of laser beam and the shape of the wave front thereof at a plurality of locations set on an optical path, and perform control in such a way that the compensation operations at the individual locations do not cause contention. Further objects of the invention may be readily apparent from the following description of the presently preferred embodiments.

To achieve the objects, according to a first aspect of the invention, there is provided an extreme ultraviolet light source device that generates extreme ultraviolet by irradiating laser beam on a target material for turning the target material into plasma, comprising a target material supply unit that supplies the target material into a chamber, a laser oscillator that outputs laser beam, an amplification system that amplifies the laser beam output from the laser oscillator by at least one amplifier, and a focusing system for irradiating the laser beam, amplified by the amplification system, on the target material in the chamber. Further, at least the amplification system is provided with at least one first detection unit that detects a direction of laser beam and a shape of a wave front thereof in the amplification system, or detects beam parameters equivalent to the direction of the laser beam and the shape of the wave front thereof in the amplification system, at least one first compensation unit that compensates the direction of the laser beam and the shape of the wave front thereof which are detected by the first detection unit to a predetermined direction and a predetermined wave front shape, and at least one compensation control unit that controls a compensation operation by the first compensation unit according to a result of detection performed by the first detection unit.

The focusing system can be provided with at least one second compensation unit separate from the first compensation unit, and at least one second detection unit separate from the first detection unit.

When a plurality of first compensation units are provided in the amplification system, the compensation control unit controls the compensation operations of the first compensation units according to a predetermined sequence set beforehand to compensate the direction of the laser beam and the shape of the wave front thereof to the predetermined direction and the predetermined wave front shape. For example, the compensation control unit controls the compensation operations of the first compensation units in order from one located upstream in a traveling direction of the laser beam.

The compensation control unit can control the compensation operation of the first compensation unit and a compensation operation of the second compensation unit according to a predetermined sequence set beforehand to compensate the direction of the laser beam and the shape of the wave front thereof to the predetermined direction and the predetermined wave front shape. For example, the compensation control unit can control the compensation operation of the second compensation unit after controlling the compensation operation of the first compensation unit.

The at least one amplifier is classified into a preamplifier provided upstream in a traveling direction of the laser beam and a main amplifier provided downstream in the traveling direction of the laser beam, and the first compensation unit is provided upstream or downstream of at least the preamplifier.

The target material supply unit can supply the target material into the chamber after the first compensation unit compensates the direction of the laser beam and the shape of the wave front thereof to the predetermined direction and the predetermined wave front shape. Alternatively, the target material supply unit can supply the target material into the chamber after the first compensation unit and the second compensation unit respectively compensate the direction of the laser beam and the shape of the wave front thereof to the predetermined direction and the predetermined wave front shape.

The amplification system can be provided with a saturable absorber for absorbing laser beam of a predetermined value or less.

The first compensation unit may have an angle compensation capability for adjusting an outgoing angle of the laser beam in the predetermined direction, and a curvature compensation capability for adjusting a curvature of the wave front of the laser beam to the predetermined wave front shape.

The first compensation unit can be configured as a reflection optical system including a mirror capable of variably controlling a curvature.

The first detection unit can be configured to include a reflection mirror that reflects the laser beam, and an optical sensor that detects a state of leak radiation transmitting through the reflection mirror as an electric signal.

According to a second aspect of the invention, there is provided a laser light source device for use in an extreme ultraviolet light source device, comprising a laser oscillator that outputs laser beam, an amplification system that amplifies the laser beam output from the laser oscillator by at least one amplifier, and a focusing system that inputs the laser beam, amplified by the amplification system, into a chamber of the extreme ultraviolet light source device. Further, at least the amplification system is provided with at least one first compensation unit that compensates a direction of laser beam and a shape of a wave front thereof in the amplification system to a predetermined direction and a predetermined wave front shape, and at least one compensation control unit that controls a compensation operation by the first compensation unit.

According to a third aspect of the invention, there is provided a method of adjusting a laser light source device for use in an extreme ultraviolet light source device, the laser light source device including a an amplification system that amplifies laser beam output from a laser oscillator by at least one amplifier, and a focusing system that inputs the laser beam, amplified by the amplification system, into a chamber of the extreme ultraviolet light source device, the method comprising outputting the laser beam from the laser oscillator, detecting a direction of the laser beam amplified by the amplifier and a shape of a wave front thereof, and compensating the detected direction of the laser beam and the detected shape of the wave front thereof to a predetermined direction and a predetermined wave front shape.

A Shack-Hartmann wave front instrument may be included as a detector that detects the direction of the laser beam and the shape of the wave front thereof.

A beam pointing measuring instrument and a beam profile measuring instrument may be included as a detector that detects the beam parameters equivalent to the direction of the laser beam and the shape of the wave front thereof.

At least two beam profile measuring instruments may be included as a detector that detects the beam parameters equivalent to the direction of the laser beam and the shape of the wave front thereof.

The extreme ultraviolet light source device according to the first aspect may be configured in such a way as to include either a measuring instrument that measures a temperature distribution of an optical element to which a thermal load is applied, or an energy detector that detects a laser energy as a detector that detects the beam parameters equivalent to the direction of the laser beam and the shape of the wave front thereof, whereby the direction of the laser beam and the shape of the wave front thereof are predicted based on a signal from the measuring instrument or a signal from the energy detector.

Further, a window of the chamber, or a window of the amplifier, or a window of the saturable absorption cell may be configured as a diamond window.

It is possible to detect only the direction of laser beam and control the direction of laser beam to a predetermined direction according to the result of the detection. Further, a mirror which reflects laser beam can be provided with a cooling mechanism for cooling a mirror surface in an axial symmetrical fashion.

BRIEF DESCRIPTION OF THE DRAWINGS

FIG. 53 is an explanatory diagram showing an example of a preferable combination of the embodiments;

FIG. 63 is a cross-sectional view of a mirror according to a thirty-eighth embodiment.

DESCRIPTION OF THE SPECIFIC EMBODIMENTS

Preferred embodiments of the present invention will be described below with reference to the accompanying drawings. According to the embodiments, at least one compensation means (34, 44) for compensating the wave front of laser beam is provided on an optical path where laser beam passes. The compensation means can arrange the traveling direction of laser beam and the shape of the wave front thereof. While a laser light source device to be used in an extreme ultraviolet light source device will be described herein, the invention can be adapted to other laser light source devices than the laser light source device for use in an extreme ultraviolet light source device.

First Embodiment

Figure 1:
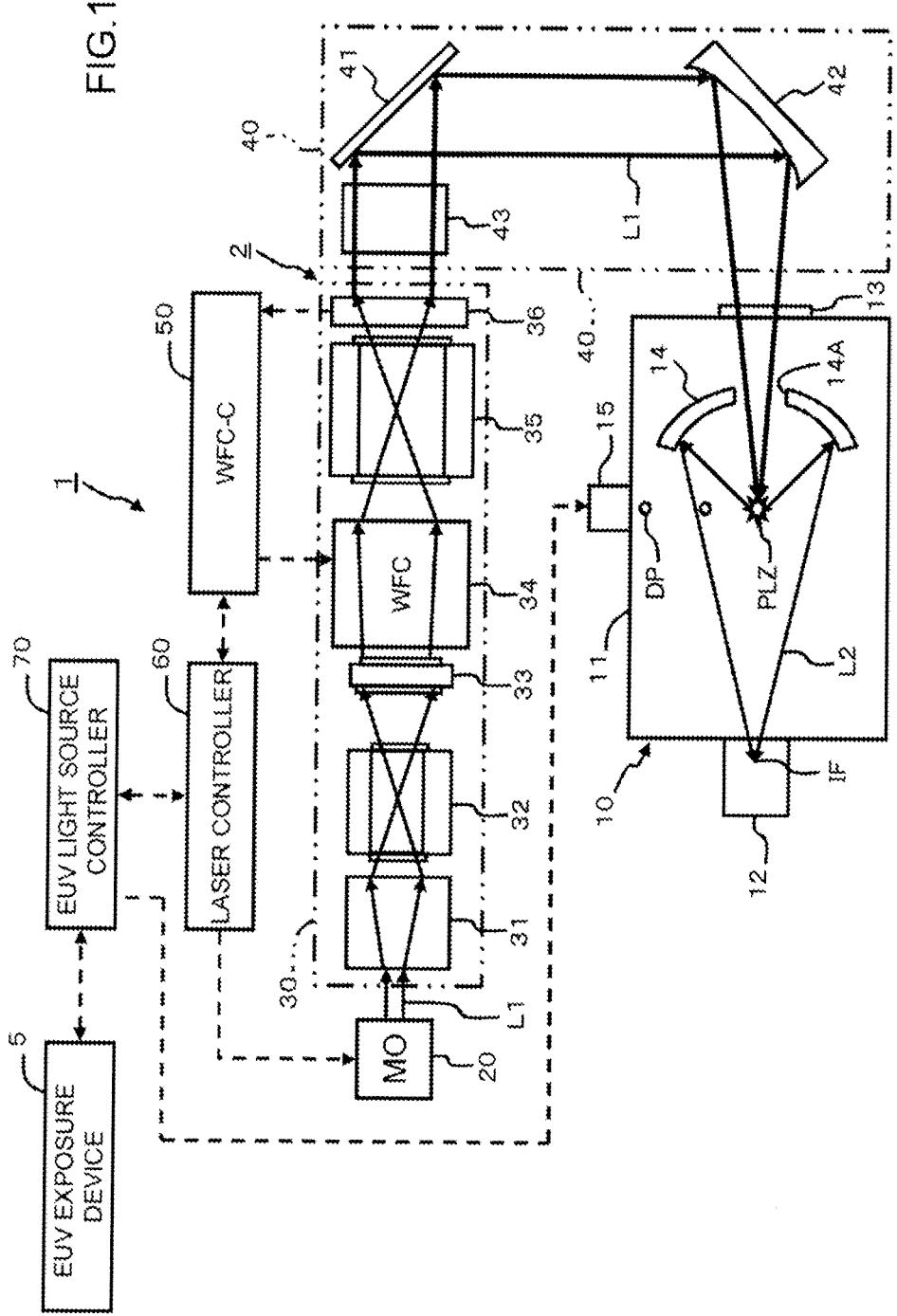
FIG. 1 is a configurational diagram of an EUV light source device according to a first embodiment of the present invention.

A first embodiment of the invention will be described referring to FIGS. 1 to 8. FIG. 1 is an explanatory diagram showing the general configuration of an EUV light source device 1. The characteristic configurations of the invention as seen in the individual embodiments to be described below are not limited to the illustrated combinations, but it is noted that various other combinations are possible and are included within the scope of the invention.

The EUV light source device 1 is configured to have, for example, a chamber 10 for generating EUV radiation, a laser light source device 2 for supplying laser beam to the chamber 10, and an EUV light source controller 70. The laser light source device 2 includes, for example, a laser oscillator (master oscillator) 20 which determines the time-dependent waveform of a laser pulse and the repeating frequency, an amplification system 30, a focusing system 40, a wave front compensation controller 50, and a laser controller 60. The EUV light source device 1 supplies EUV radiation to an EUV exposure device 5.

First, the outline of the chamber 10 will be described. The chamber 10 has, for example, a chamber body 11, a connecting unit 12, a window 13, an EUV collector mirror 14, and a target material supply unit 15.

The chamber body 11 is kept in a vacuum state by an unillustrated vacuum pump. The chamber body 11 can be provided with, for example, a mechanism or the like for collecting debris.

The connecting unit 12 is provided to connect between the chamber 10 and the EUV exposure device 5. EUV radiation generated in the chamber 10 is supplied to the EUV exposure device 5 via the connecting unit 12.

The window 13 is provided at the chamber body 11. Driver laser beam from the laser light source device 2 enters the chamber 10 through the window 13.

The EUV collector mirror 14 is a mirror for reflecting EUV radiation to be collected at an intermediate focus IF. The intermediate focus IF is set in the connecting unit 12. The EUV collector mirror 14 is configured as, for example, a concave surface like a rotary ellipsoid which idealistically does not generate aberration to transfer an image at a plasma emission point to the intermediate focus IF. A multilayer coating which includes, for example, a molybdenum coating and a silicon coating is provided at the top surface of the EUV collector mirror 14 to reflect EUV radiation with a wavelength of 13 nm or so.

The target material supply unit 15 supplies a target material, such as tin, in the form of a solid or liquid. Tin may be supplied as a tin compound such as stannane ($SnH_4$). In case where tin is supplied in the form of liquid, it can be achieved by a method of supplying tin in the form of a solution containing tin or supplying tin in the form of a colloidal solution containing tin or a tin compound in addition to a method of heating pure tin to the melting point to be liquefied. Although tin droplets DP will be explained as a target material by way of example according to the embodiment, the invention is not limited to tin droplets. For example, other materials, such as lithium (Li) and xenon (Xe), may be used as well.

First, the action in the chamber 10 will be briefly described. Driver laser beam is focused at a predetermined position in the chamber body 11 through the input window 13. The target material supply unit 15 drops the tin droplets DP toward the predetermined position. At the timing at which the tin droplets DP reach the predetermined position, the laser light source device 2 outputs driver laser beam L1 of predetermined power. The tin droplets DP are irradiated with the driver laser beam L1 to become plasma PLZ. The plasma PLZ radiates EUV radiation L2. The EUV radiation L2 is collected at the intermediate focus IF in the connecting unit 12, and is supplied to the EUV exposure device 5.

Next, the configuration of the laser light source device 2 will be described. The laser light source device 2 is configured as a carbon dioxide gas pulse laser light source device, and outputs pulses of driver laser beam L1 with, for example, a wavelength of 10.6 µm, a single lateral mode, a repeating frequency of 100 kHz, 100 to 200 mJ and 10 kW to 20 kW.

The laser beam output from the laser oscillator 20 is amplified by the amplification system 30, and is supplied to the focusing system 40. The focusing system 40 supplies the driver laser beam L1 into the chamber 10. The focusing system 40 has, for example, a reflection mirror 41, an off-axis parabolic concave mirror 42, and a relay optical system 43. The side of the laser oscillator 20 will be called "upstream side" and the side of the chamber 10 will be called "downstream side" hereinafter with the traveling direction of laser beam as a reference.

The amplification system 30 has, for example, an relay optical system 31, a preamplifier 32, a saturable absorber 33, a wave front compensator 34, a chamber 10 main amplifier 35, and a sensor 36. Hereinafter, the saturable absorber 33 will be called "SA 33". It is noted that the power of laser beam may be enhanced by using an MOPA (Master Oscillator and Power Amplifier).

The relay optical system 31 is an optical system for adjusting the spread angle of the beam of laser beam output from the laser oscillator 20, and the size of the beam in order to efficiently fill the amplification area in the preamplifier 32 with the laser beam output from the laser oscillator 20. The relay optical system 31 expands the beam radius of the laser beam output from the laser oscillator 20 to convert the beam to a predetermined beam flux.

The preamplifier 32 amplifies input laser beam, and outputs the amplified laser beam. The laser beam amplified by the preamplifier 32 is input to the SA 33. The SA 33 demonstrates a function of passing laser beam having an intensity equal to or higher than a predetermined threshold value, and inhibiting passing of laser beam having an intensity less than the predetermined threshold value. Accordingly, the SA 33 absorbs laser beam (return light) returning from the chamber 10 and parasitic oscillating radiation or self-excited oscillating radiation from the main amplifier 35 to prevent the preamplifier 32 and the laser oscillator 20 from being damaged. Further, the SA 33 serves to suppress a pedestal and enhance the quality of the pulse waveform of laser beam. The "pedestal" is a minute pulse which is generated in close proximity time to the main pulse.

Figure 2:
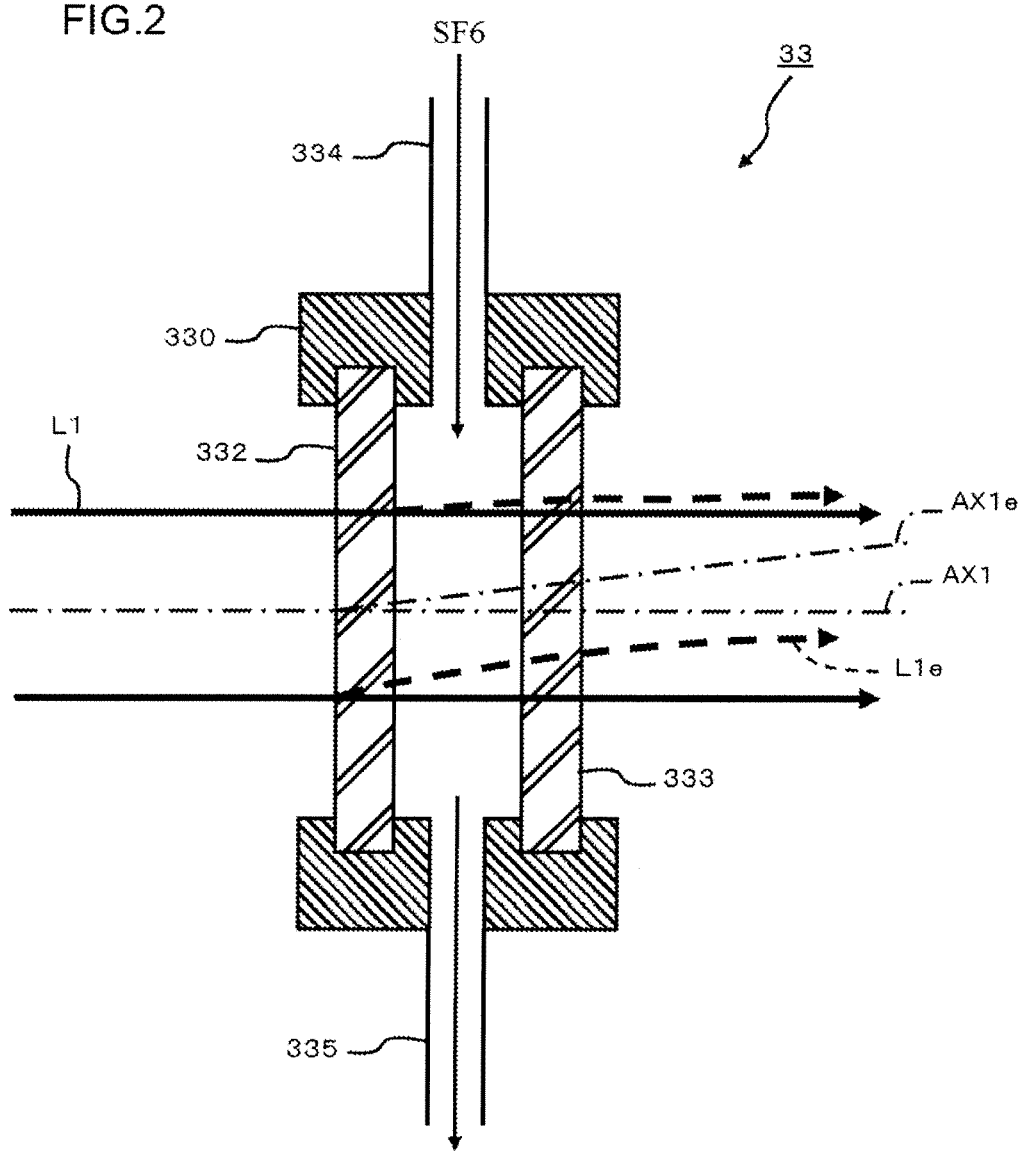
FIG. 2 is an explanatory diagram of a saturable absorber.

FIG. 2 shows an example of the configuration of the SA 33. The SA 33 has, for example, a holder 330 with an unillustrated water cooling jacket, two windows 332 and 333 mounted to the holder 330, a flow inlet 334 through which a sulfur hexafluoride gas ($SF_6$ gas) flows in, and a flow outlet 335 from which the $SF_6$ gas flows out.

The laser beam L1 amplified by the preamplifier 32 enters through the left input window 332, and passes through the right output window 333. The $SF_6$ gas supplied to a clearance between the windows 332 and 333 serves to absorb the carbon dioxide gas.

Figure 3:
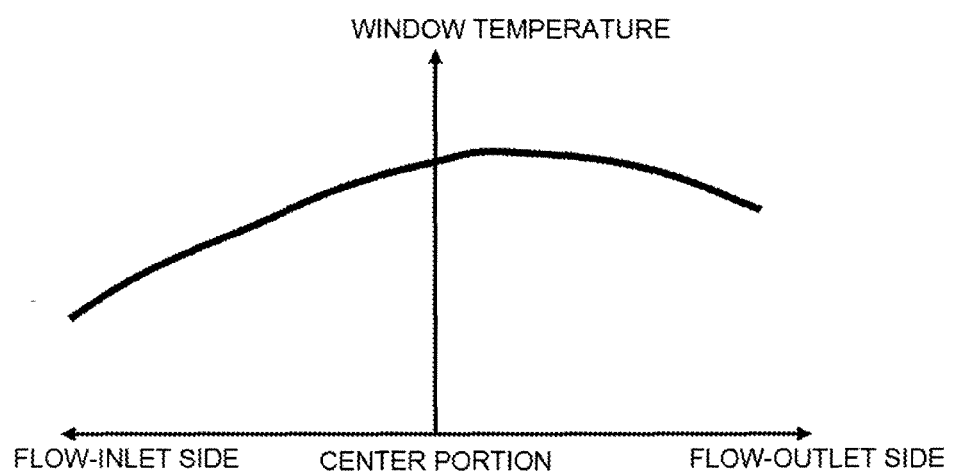
FIG. 3 is a graph showing changes in the temperature of the saturable absorber.

FIG. 3 is a graph showing a temperature distribution occurring in the SA 33. The $SF_6$ gas enters the clearance between the windows 332 and 333 from the flow inlet 334, absorbs laser beam with an intensity equal to or lower than the threshold value, and flows out from the flow outlet 335. Accordingly, a temperature distribution which shifts in the flow direction of the $SF_6$ gas occurs in the SA 33. The temperature distribution of the windows of the SA 33 changes the distribution of the refractive indexes of the windows.

As a result, the laser beam L1 passing the SA 33 is shifted in a direction AX1e shifted from a reference optical axis AX1 as shown by a broken like L1e in FIG. 2. The wave front of the laser beam L1 passing through the SA 33 does not change concentrically while maintaining the reference optical axis AX1, but is curved along the axis AX1e. That is, as the laser beam L1 passes through the SA 33, the direction of the laser beam is shifted, and the shape of the wave front of the laser beam is changed.

Even if laser beam L1e whose traveling direction and wave front shape are changed is input to the main amplifier 35 directly, an amplification action cannot be obtained as expected. This is because the amplification area in the main amplifier 35 cannot be efficiently filled with the laser beam.

To overcome the problem, the wave front compensator 34 as the "first compensation unit" is provided between the SA 33 and the main amplifier 35. The wave front compensator is expressed by "WFC" (Wave Front Compensator) occasionally in the following description and the drawings.

Figure 4:
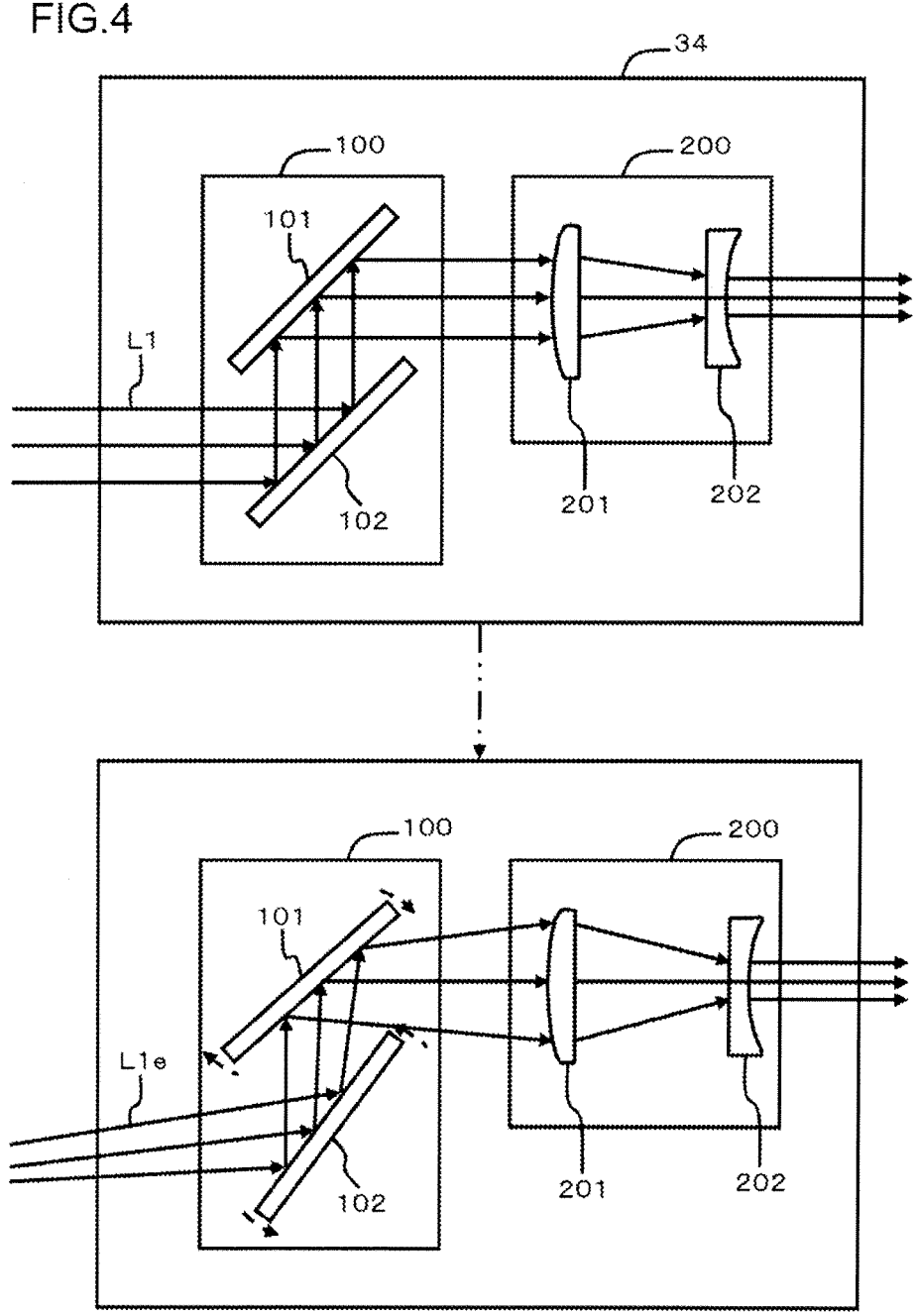
FIG. 4 is a configurational diagram of a wave front compensator.

FIG. 4 is an explanatory diagram exemplarily showing the principle of the wave front compensator 34. The upper side of FIG. 4 shows a case where a low thermal load is applied to the amplification system 30. The lower side of FIG. 4 shows a case where a high thermal load is applied to the amplification system 30.

The wave front compensator 34 has an angle compensator 100 and a wave front curvature compensator 200. The angle compensator 100 is an optical system for adjusting the angle (traveling direction) of laser beam. The wave front curvature compensator 200 is an optical system for adjusting the curvature of the wave front of laser beam (spreading of the beam). Specific configurational examples will be described later as different embodiments.

The angle compensator 100 is configured to include, for example, two reflection mirrors 101 and 102 disposed in parallel and opposite to each other. As shown on the lower side of FIG. 4, the reflection mirror 101, 102 is provided rotatable about an X axis (vertical axis in FIG. 4) and a Y axis (axis on the same plane as the X axis and orthogonal thereto) as the rotational center. That is, each reflection mirror 101, 102 is mounted in such a way as to be able to tilt and roll.

In case of a low thermal load, the laser beam L1 travels along the reference optical axis, so that it is unnecessary to change the state of each reflection mirror 101, 102. In case of a high thermal load, the laser beam L1e is input off the reference optical axis. Accordingly, the state of each reflection mirror 101, 102 is changed adequately to match with the outgoing direction of the laser beam.

The wave front curvature compensator 200 includes, for example, a convex lens 201 and a concave lens 202. A concave wave and a convex wave can be corrected to a plane wave by adjusting the relative position of the convex lens 201 and the concave lens 202.

The wave front compensation controller 50 as the "compensation control unit" adequately drives the angle compensator 100 and the wave front curvature compensator 200 so as to cancel a deviation from a target value based on the result of measurement performed by the sensor 36. Accordingly, the wave front compensator 34 corrects the angle of the input laser beam and the curvature of the shape of the wave front thereof to a predetermined direction and predetermined wave front shape before outputting the laser beam. The wave front compensator 34 expands the beam radius of the laser beam in such a way as to provide a beam angle and wave front curvature which are needed for efficient amplification by the main amplifier 35, thereby converting the laser beam to a predetermined laser beam flux. The converted laser beam is amplified by the main amplifier 35.

The sensor 36 as the "first detection unit" is provided downstream of the main amplifier 35 to detect the angle of the input laser beam and the curvature of the wave front thereof. The sensor 36 should be configured to be able to directly or indirectly measure the angle of laser beam and the curvature of the wave front thereof.

Figure 5:
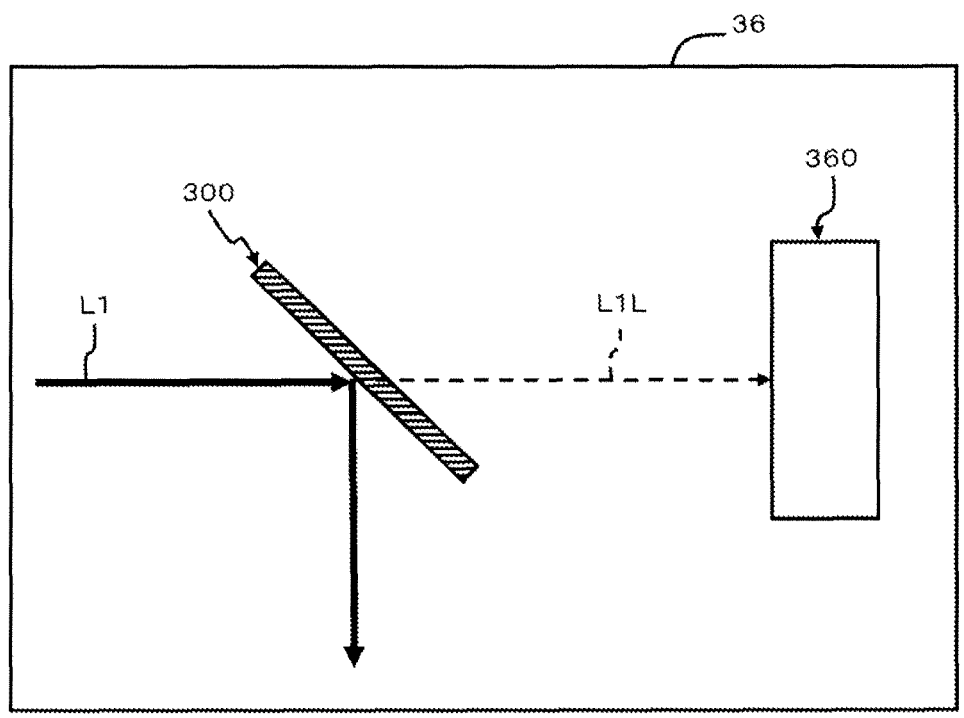
FIG. 5 is an exemplary diagram of a sensor.

The outline of the sensor 36 will be described referring to FIGS. 5 and 6. Other configurational examples of the sensor 36 will be described later as different embodiments. As shown in the principle diagram of FIG. 5, the sensor 36 is configured to include, for example, a reflection mirror 300 which reflects laser beam L1, and an optical sensor unit 360 which measures laser beam L1L slightly transmitting through the reflection mirror 300.

Figure 6:
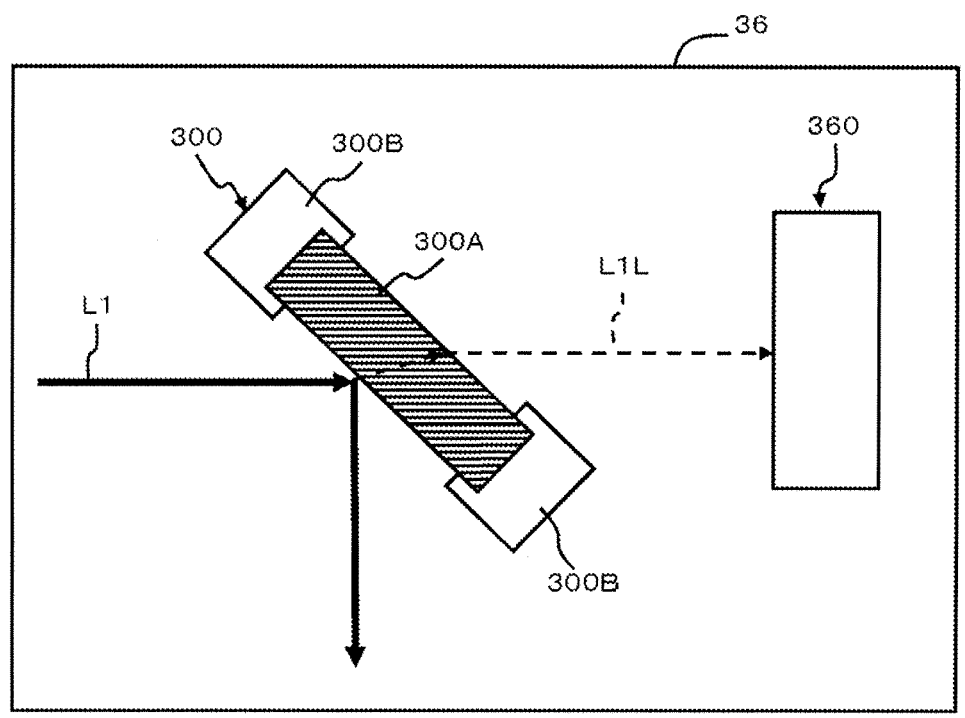
FIG. 6 is another exemplary diagram of the sensor.

FIG. 6 shows an example of the sensor 36. The reflection mirror 300 coated with a coating which reflects the laser beam at a high reflectivity has a beam splitter board 300A and a holder 300B with an unillustrated water cooling jacket for holding the beam splitter board 300A.

The beam splitter board 300A is formed of a material, such as silicon (Si), zinc selenide (ZnSe), gallium arsenide (GaAs) or diamond. While most of the laser beam L1 is reflected by the high-reflectivity coating, very slight laser beam L1L transmits through the beam splitter board 300A.

The laser beam L1L transmitted through the beam splitter board 300A very slightly is input to the optical sensor unit 360. As the optical sensor unit 360, for example, a beam profiler for measuring the intensity distribution of laser beam, a power sensor (calorie meter, pyroelectric sensor or the like) for measuring the laser duty and the load of an optical element, a wave front sensor capable of simultaneously measuring the state of the wave front of laser beam and the direction of the wave front thereof, or the like can be used.

Further, as will be described later, the state of the wave front of laser beam and the angle (direction) of the wave front thereof may be predicted using parameters (temperature, operational instruction value, etc.) relating to the state of laser beam and a data base obtained through simulation, empirical results or the like.

Next, the control system will be described. As shown in FIG. 2, the EUV light source device 1 has the wave front compensation controller 50, the laser controller 60, and the EUV light source controller 70.

Figure 7:
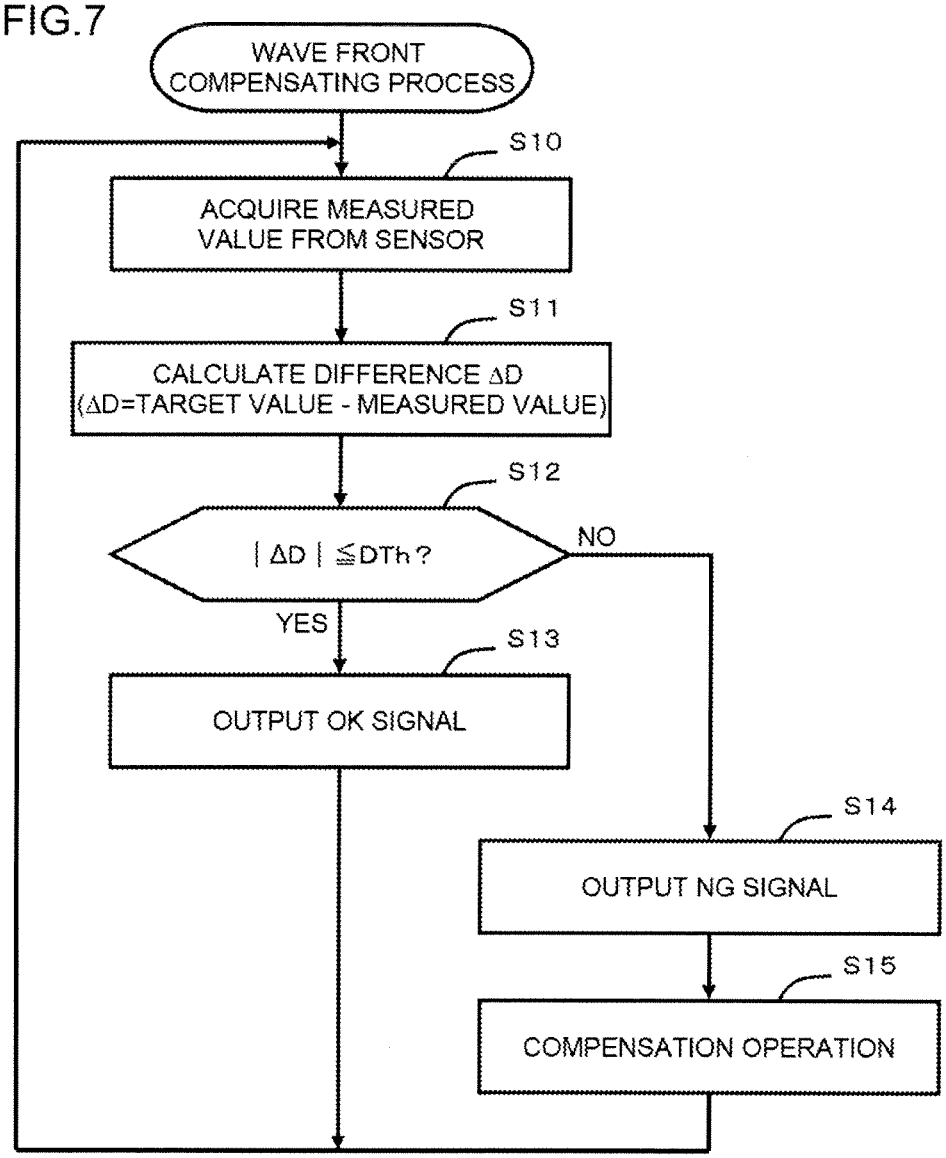
FIG. 7 is a flowchart of a wave front compensating process.

FIG. 7 is a flowchart illustrating a wave front compensating process which is executed by the wave front compensation controller 50. This process is executed at the time the laser light source device 2 is invoked before starting operating. That is, the at the adjustment stage before the operation of the laser light source device 2 starts, first, before irradiation on a target, an unillustrated shutter or the like, for example, is closed to inhibit laser beam from being input to the EUV chamber 10, and then, adjusting oscillation of the laser is carried out. Then, when seed laser beam is output from the laser oscillator 20, the wave front of laser beam and the angle (direction) thereof are adjusted in such a way that the amplification efficiency of the main amplifier 35 is kept high in a laser beam line downstream of the laser oscillator 20. It is noted that individual flowcharts to be described herein below illustrate the outlines of the individual processes which may differ from the actual computer programs. It is noted that so-called persons skilled in the art would be able to change or delete illustrated steps, or add new steps. Hereinafter, the direction of laser beam is occasionally called "angle".

The wave front compensation controller 50 acquires a measured value from the sensor 36 (S10), and calculates a difference ΔD between a target value and the measured value (S11). The wave front compensation controller 50 determines whether or not the absolute value of the difference ΔD is equal to or smaller than a predetermined allowable value DTh (S12). The allowable value DTh is set to a value which does not affect, for example, the amplification characteristic of laser beam.

When the absolute value of the difference ΔD between the target value and the measured value is equal to or smaller than the allowable value DTh (S12: YES), the wave front compensation controller 50 outputs an OK signal to the laser controller 60 (S13). The OK signal is an adjustment complete signal which means that the wave front of laser beam has been adjusted to a predetermined wave front (curvature and direction).

When the absolute value of the difference ΔD is greater than the allowable value DTh (S12: NO), on the other hand, the wave front compensation controller 50 outputs an NG signal to the laser controller 60 (S14). The NG signal is an adjustment incomplete signal which means that the wave front of laser beam has not been adjusted to a predetermined wave front.

The wave front compensation controller 50 outputs a drive signal to the wave front compensator 34 to cause the wave front compensator 34 to execute a compensation operation (S15). In response to the drive signal, the wave front compensator 34 operates the angle compensator 100 and the wave front curvature compensator 200. As the compensation operation is executed once or plural times, the wave front of laser beam is matched with the predetermined wave front.

Figure 8:
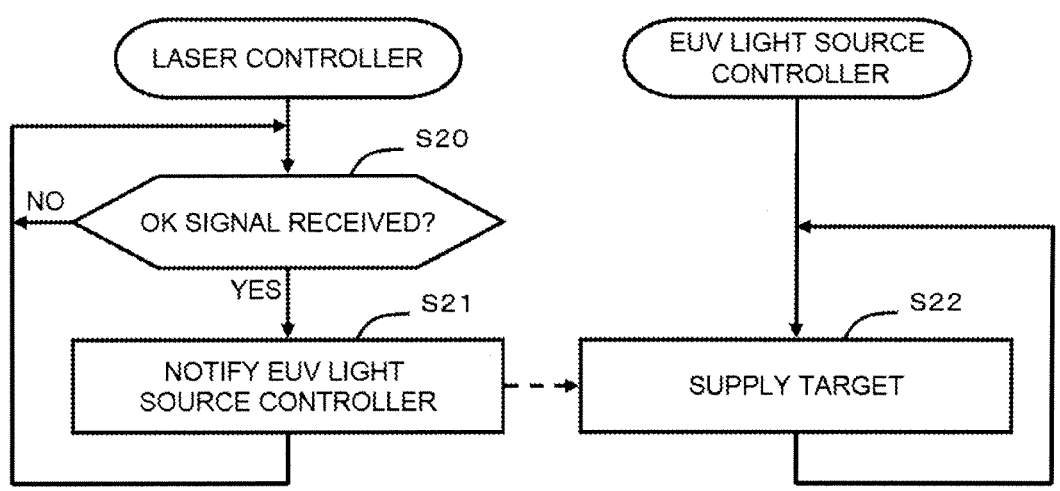
FIG. 8 is a flowchart of a process in which a laser controller notifies an EUV light source controller of completion of adjustment.

FIG. 8 is a flowchart illustrating the operation of the laser controller 60 and the operation of the EUV light source controller 70. Upon reception of the OK signal from the wave front compensation controller 50 (S20: YES), the laser controller 60 notifies the EUV light source controller 70 of completion of the adjustment of the laser light source device 2 (S21).

Upon reception of the notification of the adjustment completion from the laser controller 60, the EUV light source controller 70 controls the target material supply unit 15 to supply droplets DP to the chamber body 11 (S22).

The laser controller 60 controls the laser oscillator 20 to output the laser beam L1 at the timing of supplying the droplets DP. The laser beam L1 is amplified by the amplification system 30, and is then input to the chamber 10 via the focusing system 40. The droplets DP are irradiated with the laser beam L1 to become plasma PLZ. EUV radiation L2 radiated from the plasma PLZ is collected at the intermediate focus IF by the EUV collector mirror 14, and sent to the EUV exposure device 5.

According to the embodiment, as described above, the wave front compensator 34 for adjusting the curvature of the wave front of laser beam and direction thereof and the sensor 36 for detecting the curvature of the wave front of laser beam and direction thereof are provided in the amplification system 30 for amplifying laser beam output from the laser oscillator 20. According to the embodiment, therefore, the wave front compensator 34 can adjust the curvature of the wave front of laser beam and direction (angle) thereof before the operation of the laser light source device 2 starts. This can stabilize the output characteristic of laser beam even in an operational state where the thermal load is high.

According to the embodiment, to adjust the angle (direction) of laser beam and the curvature of the wave front thereof in the amplification system 30, the focusing characteristic of laser beam to be sent to the chamber 10 via the focusing system 40 can also be maintained stably to some extent.

According to the embodiment, as mentioned above, laser beam with stable power can be focused at a predetermined position (the focal position of the EUV collector mirror and the target) in the chamber 10. Therefore, the EUV light source device 1 according to the embodiment can stably generate high-power EUV radiation.

Second Embodiment

A second embodiment will be described referring to FIGS. 9 and 10. Because individual embodiments to be described below are modifications of the first embodiment, their descriptions are mainly about the differences from the first embodiment. According to the second embodiment, the focusing system 40 is also provided with a mechanism for performing wave front compensation (wave front compensator 44, sensor 45 and wave front compensation controller 50(2)).

Figure 9:
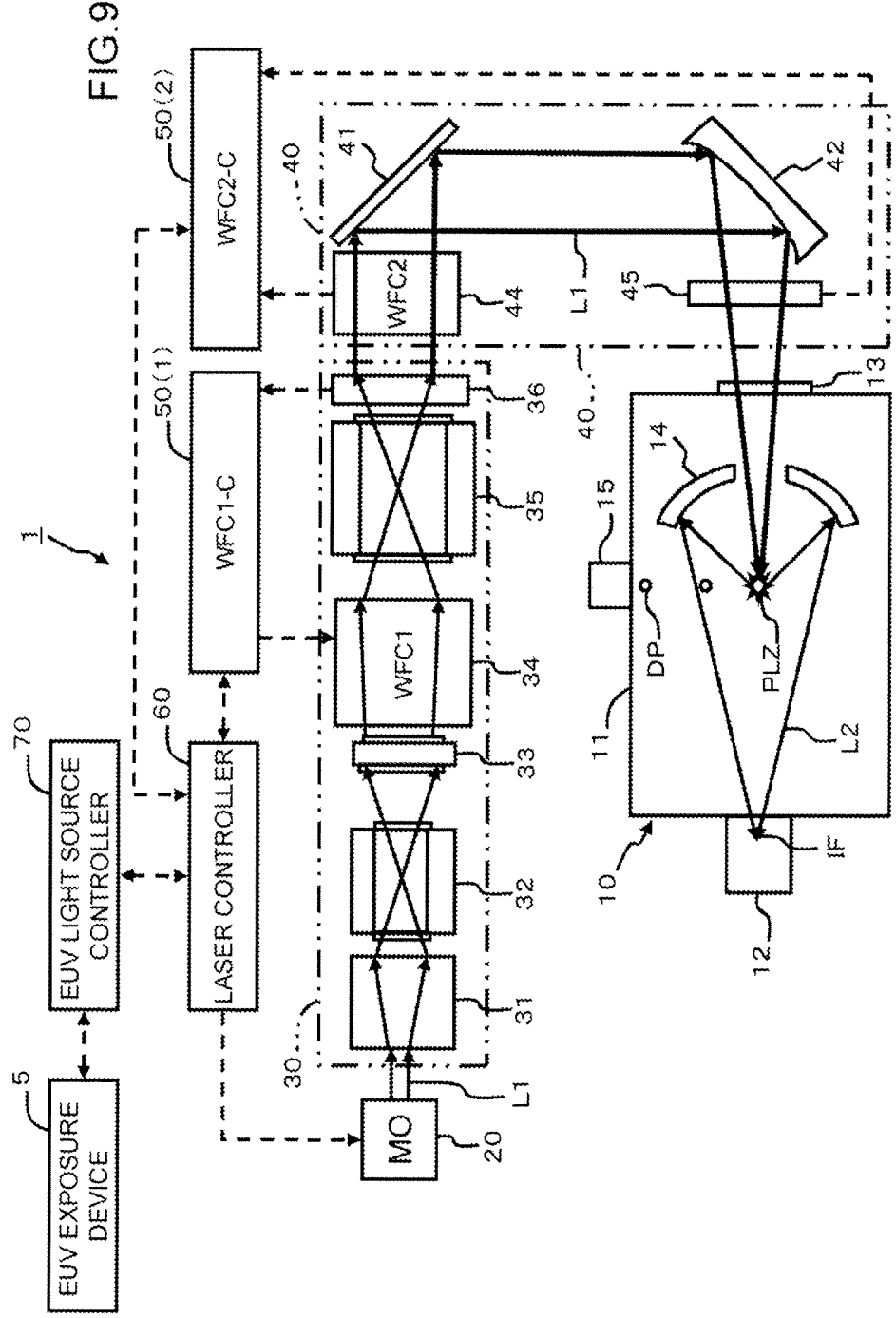
FIG. 9 is a configurational diagram of an EUV light source device according to a second embodiment.

FIG. 9 is an explanatory diagram showing the general configuration of an EUV light source device 1 according to the embodiment. According to the embodiment, the second wave front compensator 44 as the "second compensation unit" and the second sensor 45 as the "second detection unit" are provided in the focusing system 40.

Further, the embodiment includes a second wave front compensation controller 50(2) for compensating laser beam in the focusing system 40 in addition to a first wave front compensation controller 50(1) for compensating laser beam in the amplification system 30.

Figure 10:
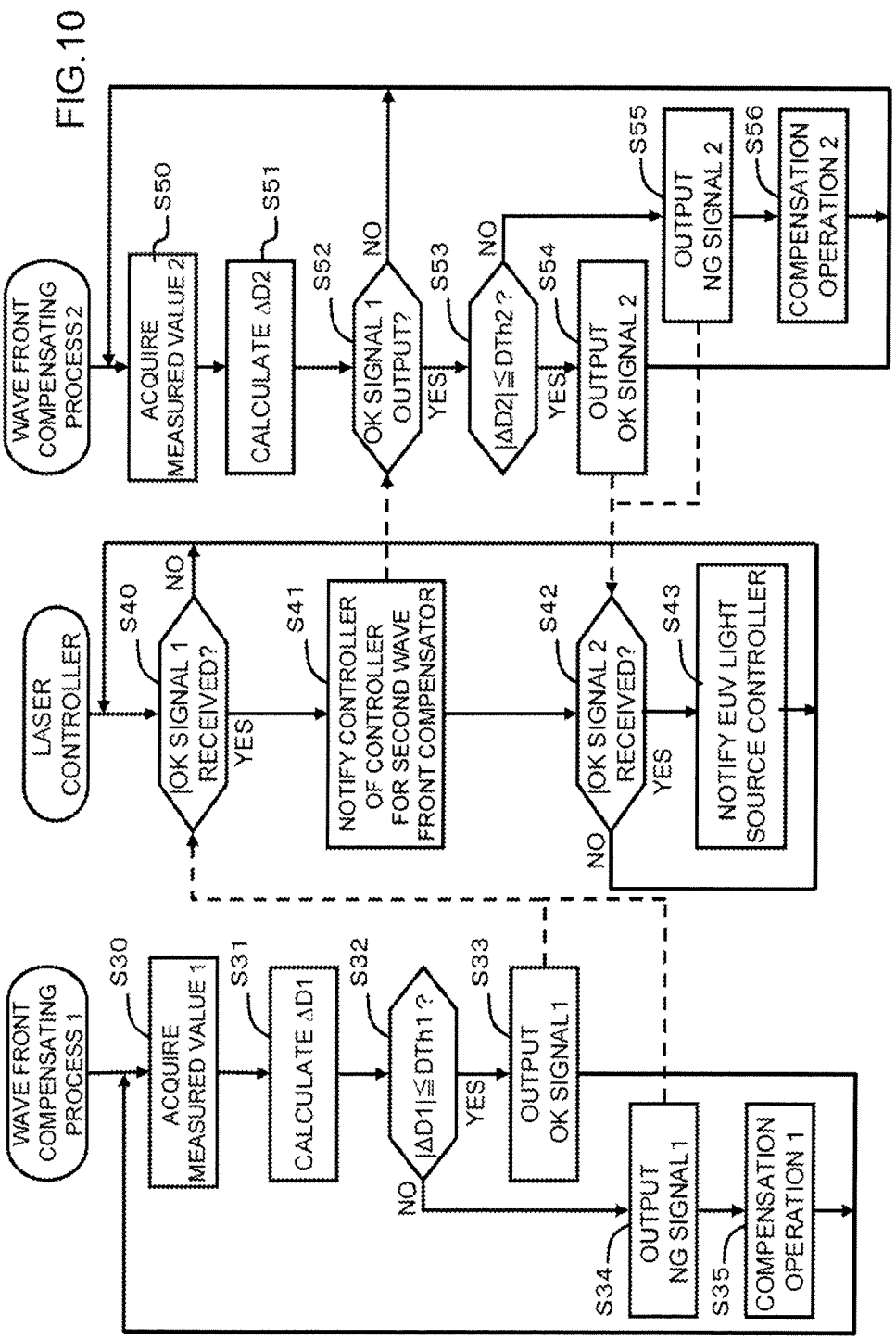
FIG. 10 is a flowchart of a wave front compensating process.

FIG. 10 is a flowchart illustrating the operation of the embodiment. According to the embodiment, as will be described below, the curvature and the direction (angle) of the wave front of laser beam are corrected in order from the upstream side. First, the wave front compensation controller 50(1) which controls the wave front compensator 34 in the amplification system 30 acquires a measured value from the sensor 36 (S30), and calculates a difference ΔD1 (S31).

The wave front compensation controller 50(1) determines whether or not the absolute value of the difference ΔD1 is equal to or smaller than an allowable value DTh1 (S32). When the absolute value of the difference ΔD1 is equal to or smaller than the allowable value DTh1 (S32: YES), the wave front compensation controller 50(1) outputs an OK signal to the laser controller 60 (S33).

When the absolute value of the difference ΔD1 is greater than the allowable value DTh1 (S32: NO), the wave front compensation controller 50(1) outputs an NG signal to the laser controller 60 (S34). The wave front compensation controller 50(1) instructs the wave front compensator 34 to execute a compensation operation to reduce the difference between the target value and the measured value (S35).

Upon reception of the OK signal from the wave front compensation controller 50(1) (S40: YES), the laser controller 60 notifies the completion of the wave front compensation at the previous stage to the wave front compensation controller 50(2) which manages the wave front compensator 44 (S41). This notification is shown as "OK signal 1" in FIG. 10.

The wave front compensation controller 50(2) acquires a measured value from the sensor 45 (S50), and calculates a difference ΔD2 between the target value and the measured value (S51). The wave front compensation controller 50(2) determines whether or not the notification of the completion of the wave front compensation at the previous stage has been received from the laser controller 60 (S52).

The wave front compensation controller 50(2) repeatedly executes the steps S50 and S51 until the wave front compensation by the wave front compensation controller 50(1) is completed (S52). When the wave front compensation by the wave front compensation controller 50(1) at the previous stage is completed (S52: YES), the wave front compensation controller 50(2) determines whether or not the absolute value of the difference ΔD2 calculated in the step S51 is equal to or smaller than an allowable value DTh2 (S53).

When the absolute value of the difference ΔD2 is equal to or smaller than the allowable value DTh2 (S53: YES), the wave front compensation controller 50(2) outputs the OK signal to the laser controller 60 (S54). When the absolute value of the difference ΔD2 is greater than the allowable value DTh2 (S53: NO), the wave front compensation controller 50(2) outputs a drive signal to the wave front compensator 44, so that the wave front compensator 44 executes an operation to compensate the curvature and the direction (angle) of the wave front of laser beam (S56).

Upon reception of the OK signal from the second wave front compensation controller 50(2) (S42: YES), the laser controller 60 notifies the EUV light source controller 70 of the completion of the adjustment of the laser light source device 2 (S43).

According to the embodiment, after completion of the wave front compensating process on the upstream side (in the amplification system) is confirmed, the wave front compensating process on the downstream side (in the focusing system) is carried out. It is therefore possible to prevent the wave front compensation by the wave front compensation controller 50(1) and the wave front compensation by the wave front compensation controller 50(2) from having contention, which would otherwise disable execution of sufficient wave front compensation or result in failure of the wave front compensation.

The embodiment demonstrates advantages similar to those of the first embodiment. Further, because wave front compensation of laser beam is executed even in the focusing system 40 according to the embodiment, the beam focusing performance can be made more stable.

Third Embodiment

A third embodiment will be described referring to FIGS. 11 to 14. According to the embodiment, wave front compensators 34(1), 34(2), 34(3) and 34(4) are associated with amplifiers 32(1), 32(2), 35(1) and 35(2), and wave front compensation of laser beam is executed every time laser beam is amplified.

Figure 11:
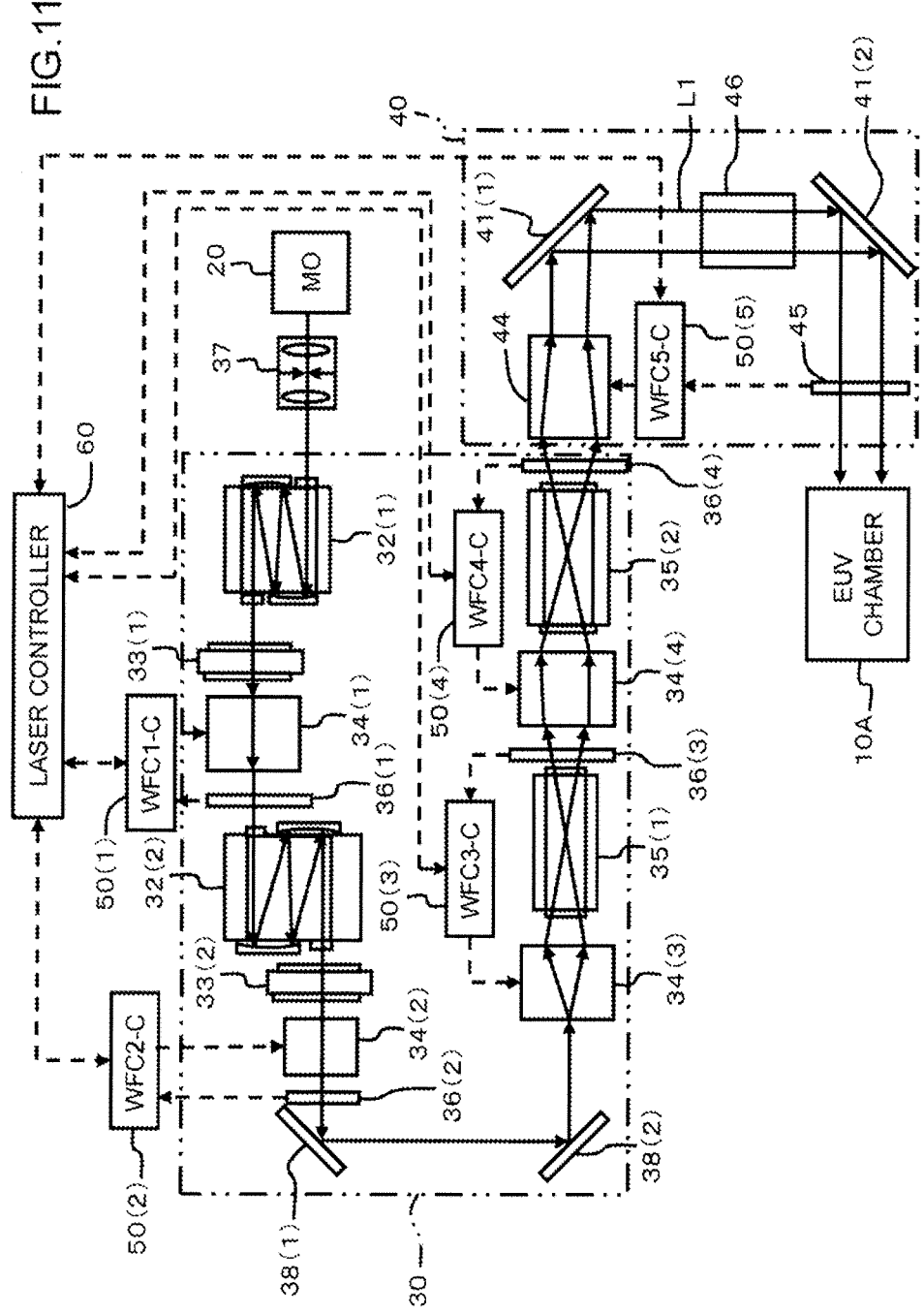
FIG. 11 is a configurational diagram of an EUV light source device according to a third embodiment.

FIG. 11 is a general configurational diagram of an EUV light source device 1 according to the embodiment. According to the embodiment, two slab type preamplifiers 32(1), 32(2) are used as preamplifiers. As laser beam travels along a zigzag optical path in the slab type preamplifier 32(1), 32(2), the laser beam is amplified. A plurality of main amplifiers 35(1), 35(2) are provided in association with the plurality of preamplifiers provided. That is, pulse beam output from the laser oscillator (MO) 20 is amplified by the plurality of preamplifiers. Then, the amplified pulse beam passes through the plurality of main amplifiers to be amplified further. The individual amplifiers are arranged in series to amplify the pulse beam.

A spatial filter 37 for improving the spatial lateral mode is provided on the output side of the laser oscillator 20. Further, an SA 33(1) is provided at the output side of the preamplifier 32(1), and an SA 33(2) is provided at the output side of another preamplifier 32(2).

The wave front compensator 34(1) and a sensor 36(1) are provided on the downstream side (laser beam output side) of the first SA 33(1). The wave front compensator 34(2) and a sensor 36(2) are provided on the downstream side of the second SA 33(2).

Laser beam which has passed the sensor 36(2) is reflected by reflection mirrors 38(1), 38(2) to be input to the wave front compensator 34(3). The wave front compensator 34(3) is provided on the upstream side (laser beam input side) of the main amplifier 35(1). A sensor 36(3) corresponding to the wave front compensator 34(3) is provided downstream of the main amplifier 35(1).

The wave front compensator 34(4) is provided on the upstream side of the last main amplifier 35(2). A sensor 36(4) is provided downstream of the main amplifier 35(2).

A wave front compensator 44 and sensor 45 are also provided in the focusing system 40 as per the second embodiment. Further, according to the embodiment, a polarization splitting isolator 46 is provided between a reflection mirror 41(1) and a reflection mirror 41(2).

A description will be given of the behavior of laser beam in the amplification system 30 and the focusing system 40. First, as laser beam output from the laser oscillator 20 transmits through the spatial filter 37, the spatial lateral mode is improved. The laser beam with the improved spatial lateral mode is input to the input window of the slab type preamplifier 32(1), is amplified while passing in zigzag manner between two concave mirrors, and is output from the output window.

The laser beam amplified by the preamplifier 32(1) passes through the SA 33(1). As a result, laser beam with an intensity equal to or lower than a predetermined threshold value is removed from the laser beam. When the laser beam passes through the SA 33(1), the curvature and the direction (angle) of the wave front of the laser beam change as described above referring to FIG. 2.

Accordingly, the laser beam affected by the SA 33(1) is compensated by the wave front compensator 34(1). A wave front compensation controller (WFC1-C) 50(1) detects the state of the laser beam after wave front compensation based on the measured value from the sensor 36(1), and controls the wave front compensator 34(1) in such a way that the curvature and angle of the wave front of laser beam become predetermined values.

The laser beam compensated by the wave front compensator 34(1) is input to the second preamplifier 32(2) to be amplified therein, and then passes through the SA 33(2). The wave front of the laser beam having passed the SA 33(2) is compensated in the same manner as described above. Based on the measured value from the sensor 36(3), a wave front compensation controller (WFC2-C) 50(2) outputs a drive signal to the wave front compensator 34(2) in such a way that the curvature and angle of the wave front of laser beam become predetermined values.

The laser beam compensated by the wave front compensator 34(2) is passes through the main amplifier 35(1) and the sensor 36(3) to be input to the wave front compensator 34(3) via the two reflection mirrors 38(1), 38(2). A wave front compensation controller (WFC3-C) 50(3) controls the wave front compensator 34(3) based on the measured value from the sensor 36(3) provided on the output side of the main amplifier 35(1). The wave front compensation controller 50(3) operates the wave front compensator 34(3) to acquire the wave front which can efficiently fill the laser amplification area of the main amplifier 35(1) with laser beam.

The laser beam compensated by the wave front compensator 34(3) passes through the main amplifier 35(1) and the sensor 36(3) to be input to the wave front compensator 34(4). Based on the measured value from the sensor 36(4) provided on the output side of the main amplifier 35(2), a wave front compensation controller (WFC4-C) 50(4) controls the wave front compensator 34(4) in such a way that the curvature and the direction (angle) of the wave front of laser beam become predetermined values, as described in the foregoing description of the wave front compensator 34(3).

According to the embodiment, laser beam is amplified four times in total, and the curvature and the angle of the wave front of the laser beam are compensated in the amplification system 30. Accordingly, the high-power laser beam output from the last main amplifier 35(2) is stabilized.

The laser beam output from the amplification system 30 is input to the wave front compensator 44 in the focusing system

40. A wave front compensation controller (WFC5-C) 50(5) causes the wave front compensator 44 to execute wave front compensation based on the signal from the sensor 45 provided before the window 13 of a chamber 10A. This provides laser beam having a predetermined plane wave.

The laser beam compensated by the wave front compensator 44 passes through the polarization splitting isolator 46 to enter the reflection mirror 41(2). The isolator 46 will be described later referring to FIG. 13. The laser beam reflected by the reflection mirror 41(2) is input to the window 13 of the chamber 10A via the sensor 45.

Figure 12:
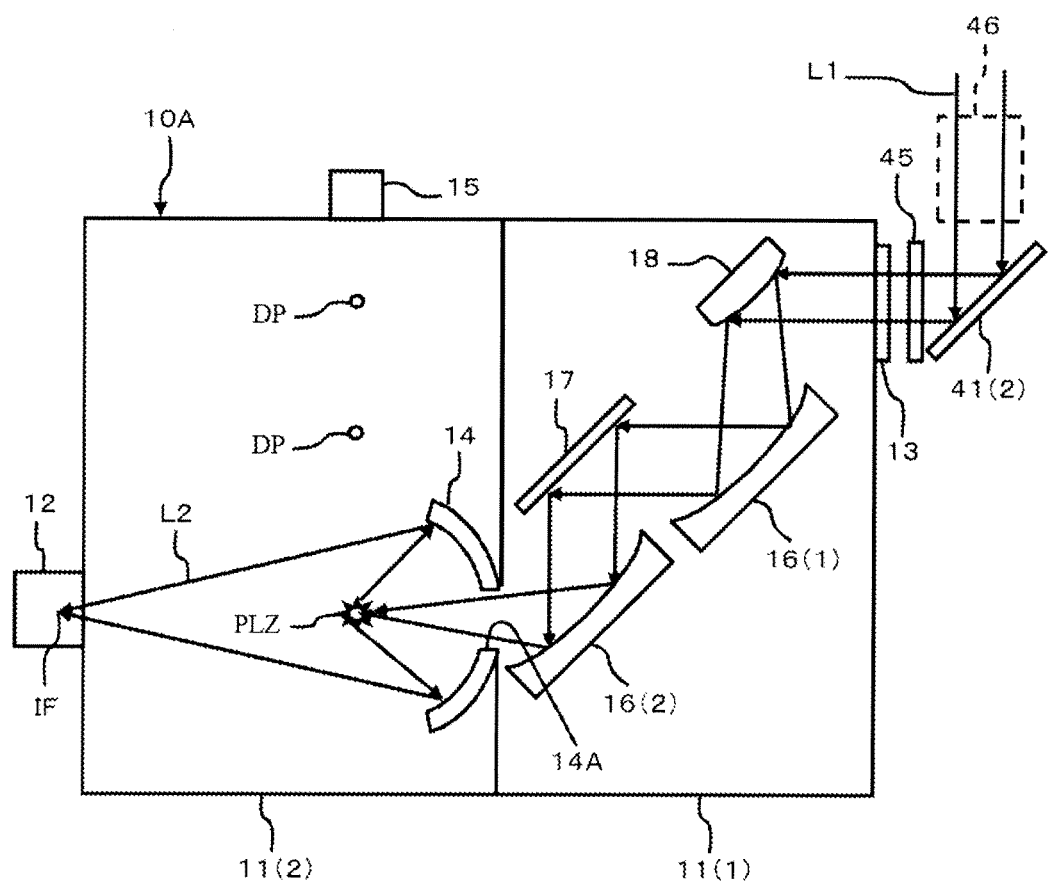
FIG. 12 is a configurational diagram of an EUV chamber.

FIG. 12 is an explanatory diagram showing the chamber 10A according to the embodiment. The chamber 10A is separated into two areas 11(1) and 11(2). One area 11(1) is a focusing area to arrange laser beam input from the laser light source device 2. The other area 11(2) is an EUV emission area to irradiate laser beam onto droplets DP to generate EUV radiation.

The two areas 11(1), 11(2) are separated by a partition. The focusing area 11(1) and the EUV emission area 11(2) communicate with each other through a small hole formed in the partition separating the areas 11(1), 11(2). The pressure in the focusing area 11(1) can be set slightly higher than the pressure in the EUV emission area 11(2). This can prevent debris generated in the EUV emission area 11(2) from entering the focusing area 11(1).

The laser beam entering the focusing area 11(1) from the window 13 is reflected by an off-axis parabolic convex mirror 18 to be input to an off-axis parabolic concave mirror 16(1). As the laser beam is reflected by the mirror 18 and the mirror 16(1), it has a predetermined beam radius.

The laser beam set to the predetermined beam radius is input to a reflection mirror 17 and reflected thereat to enter another off-axis parabolic concave mirror 16(2). The laser beam reflected by the off-axis parabolic concave mirror 16(2) enters the EUV emission area 11(2) to be irradiated onto droplets DP through a hole portion 14A of the EUV collector mirror 14.

It is preferable that the windows through which laser beam passes, such as the window of each amplifier 32(1), 32(2), 35(1), 35(2), the window of each SA 33(1), SA 33(2), and the window of the chamber 10A, should be formed of a material having the characteristic of diamond.

Diamond passes the wavelength of 10.6 μm of a CO2 laser, and has a high heat conductivity. Even when a large thermal load is applied, therefore, a temperature distribution is not likely to occur, thus making difficult to change the shape and the refractive index. Therefore, the curvature and angle of the wave front of the laser beam which passes through a diamond window are not likely to change.

Because diamond is generally expensive, however, it may be difficult to form all the windows of diamond due to the cost. In consideration of the cost, a diamond window can be used for a window which is used in an element to which a relatively high thermal load is applied. In this laser system, except for the SA 33, further downstream the location is, the higher the thermal load becomes, so that it is better to use a diamond window for both windows of the main amplifier 35 and the window of the EUV chamber 10A to which a relatively high thermal load is applied. Further, the SA 33 absorbs the CO2 laser beam, so that its thermal load becomes higher. It is therefore better to use a diamond window for the SA 33, regardless of whether it is provided on the upstream side of the beam or the downstream side.

Figure 13:
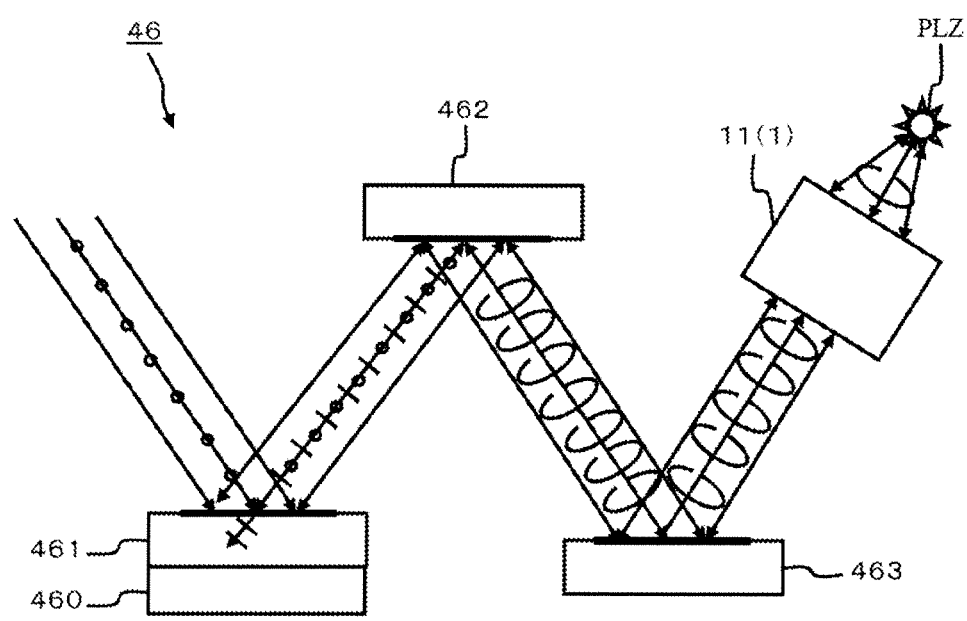
FIG. 13 is a configurational diagram of an isolator.

FIG. 13 is an explanatory diagram showing the configuration of the isolator 46. The isolator 46 has, for example, a first mirror 461 with a heat sink 460, a second mirror 462, and a third mirror 463. The laser beam reflected by the third mirror 463 is input to the focusing area 11(1) where a focusing optical system for focusing laser beam in the chamber 10A is provided, through the window 13 (see FIG. 12) of the reflection mirror 41(2).

The first mirror 461 passes P polarized light and reflects only S polarized light by means of a dielectric multilayer coating provided on the top surface of the first mirror 461. The P polarized light is absorbed by the substrate of the first mirror 461, and is cooled by the heat sink 460. The laser beam is input to the first mirror 461 as the S polarized light.

The S polarized laser beam reflected by the first mirror 461 is input to the second mirror 462 provided obliquely opposite to the first mirror 461. A λ/4 coating which produces a phase difference of π/2 is formed on the top surface of the second mirror 462. Therefore, the laser beam is reflected by the second mirror 462 to be converted to circularly polarized light.

The circularly polarized laser beam is input to the third mirror 463. The third mirror 463 is coated with a coating which reflects the P polarized light and S polarized light with a high reflectivity. The laser beam reflected by the third mirror 463 passes through the focusing area 11(1) where the focusing optical system for focusing laser beam is provided, and is collected and irradiated on the droplets to generate plasma PLZ.

The laser beam reflected by the plasma PLZ returns as reverse circularly polarized light along the same optical path as having traveled at the time of irradiation. The return circularly polarized light is reflected by the third mirror 463 to be input to the second mirror 462. The laser beam is reflected by the λ/4 coating of the second mirror 462 to be converted to P polarized light.

The P polarized laser beam is input to the first mirror 461. The P polarized laser beam input to the first mirror 461 transmits through the coating of the first mirror 461 and absorbed by the substrate of the mirror 461 to be converted to heat. The heat is discharged by the heat sink 460. Therefore, the laser beam which is reflected by the plasma PLZ to return can be prevented from returning to the inlet side of the isolator 46. This can prevent self-excited oscillation caused by the return beam of the driver laser beam L1.

The use of the isolator 46 of the reflection optical system as shown in FIG. 13 can make the deformation of the wave front, caused by laser beam passing through the isolator 46, smaller than the use of the isolator of the transmission optical system.

Figure 14:
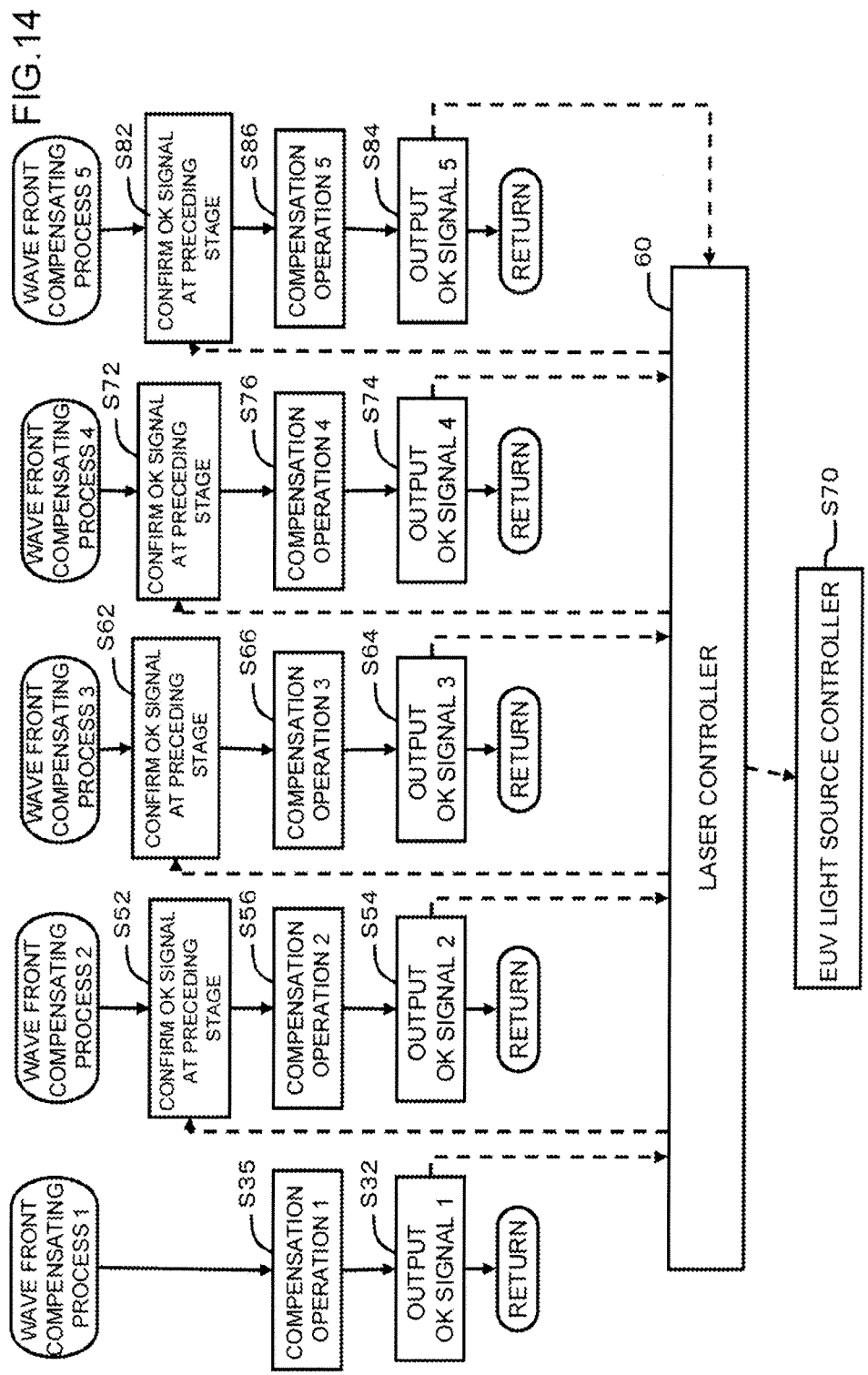
FIG. 14 is a flowchart of a wave front compensating process.

FIG. 14 is a flowchart illustrating the outline of the operation according to the embodiment. As mentioned in the description of the second embodiment, when a plurality of wave front compensators are provided, wave front compensation is executed in order from the upstream wave front compensator.

First, the wave front compensation controller 50(1) executes first wave front compensation using the wave front compensator 34(1) located on the most upstream side (S35), and notifies the laser controller 60 of the completion of wave front compensation (S32).

Next, after confirming that notification of the completion of wave front compensation is output from the wave front compensation controller 50(1) at the preceding stage (S52), the wave front compensation controller 50(2) executes second wave front compensation using the wave front compensator 34(2) (S56). Then, the wave front compensation controller 50(2) notifies the laser controller 60 of the completion of wave front compensation (S54).

Likewise, after confirming that notification of the completion of wave front compensation is output from the wave front compensation controller 50(2) at the preceding stage (S62), the wave front compensation controller 50(3) executes third wave front compensation using the wave front compensator 34(3) (S66). Then, the wave front compensation controller 50(3) notifies the laser controller 60 of the completion of wave front compensation (S64).

Likewise, after confirming that notification of the completion of wave front compensation is output from the wave front compensation controller 50(3) at the preceding stage (S72), the wave front compensation controller 50(4) executes fourth wave front compensation using the wave front compensator 34(4) (S76). Then, the wave front compensation controller 50(4) notifies the laser controller 60 of the completion of wave front compensation (S74).

After confirming that notification of the completion of wave front compensation is output from the wave front compensation controller 50(4) at the preceding stage (S82), the last wave front compensation controller 50(5) executes last wave front compensation using the wave front compensator 44 (S86). Then, the wave front compensation controller 50(5) notifies the laser controller 60 of the completion of wave front compensation (S84).

The laser controller 60 receives the notifications of the completion of wave front compensation from the wave front compensation controllers 50(1) to 50(5) in order. Upon reception of every notification of the completion of wave front compensation, the laser controller 60 notifies the EUV light source controller 70 of the completion of adjustment of the laser light source device 2.

The embodiment with the foregoing configuration also has advantages similar to those of the first and second embodiments. According to the embodiment, the wave front compensators 34(1) to 34(5) are associated with the amplifiers 32(1), 32(2), 35(1) and 35(2) in the amplification system 30, and laser beam is input to the individual amplifiers at the proper curvature and angle of the wave front. Therefore, the embodiment can amplify laser beam more stably than the first and second embodiments.

Fourth Embodiment

Figure 15:
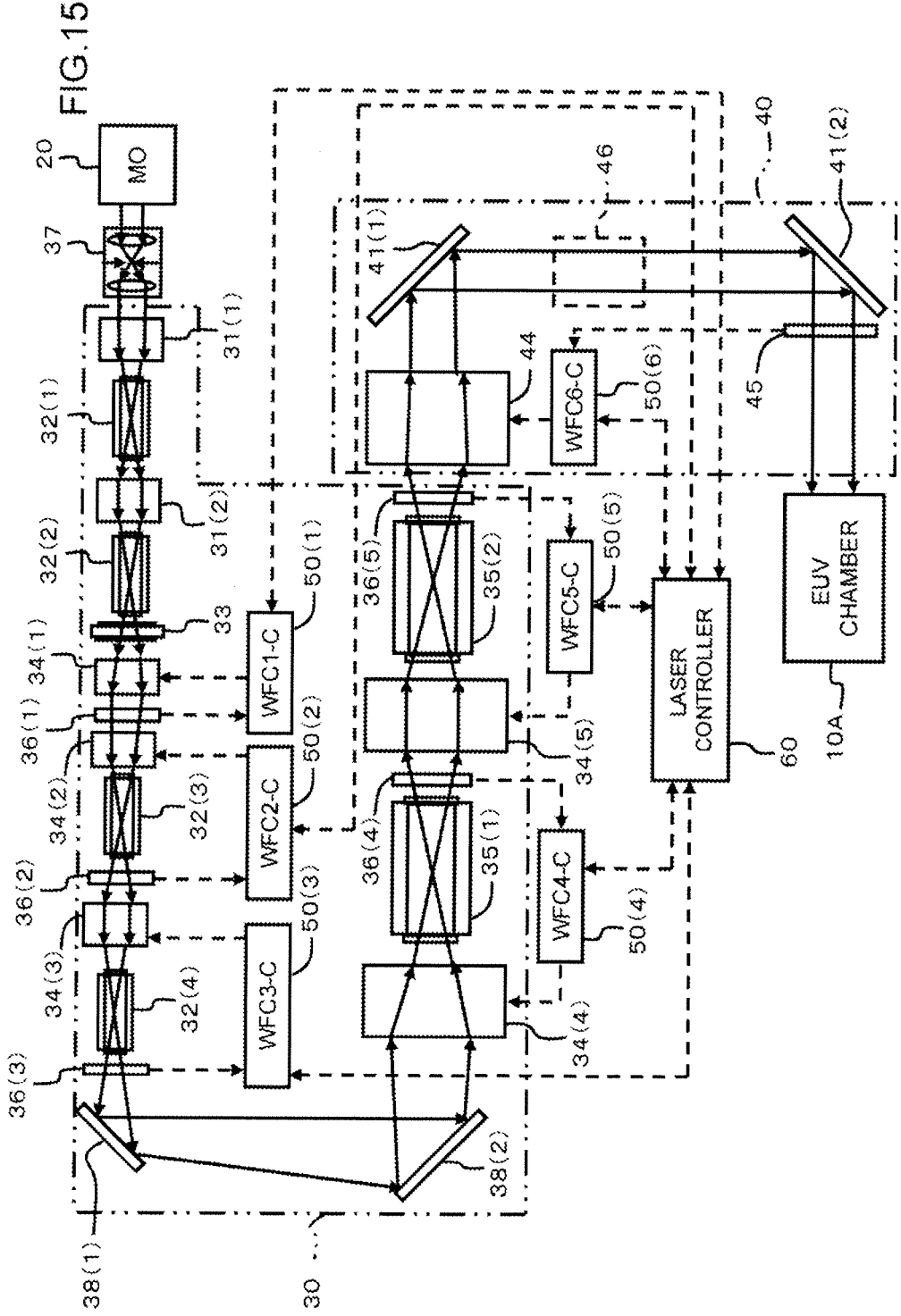
FIG. 15 is a configurational diagram of an EUV light source device according to a fourth embodiment.

A fourth embodiment will be described referring to FIG. 15. The embodiment has a total of four preamplifiers 32(1) to 32(4), and a total of two main amplifiers 35(1) and 35(2). It is noted that only one SA 33 is provided in the embodiment as compared with the third embodiment.

The amplification system according to the embodiment has a spatial filter 37, a relay optical system 31(1), a preamplifier 32(1), a relay optical system 31(2), a preamplifier 32(2), an SA 33, a wave front compensator 34(1), a sensor 36(1), a wave front compensator 34(2), a preamplifier 32(3), a sensor 36(2), a wave front compensator 34(3), a preamplifier 32(4), a sensor 36(3), a reflection mirror 38(1), a sensor 36(4), a wave front compensator 34(4), a main amplifier 35(1), a sensor 36(4), a wave front compensator 34(5), a main amplifier 35(2), and a sensor 36(5) in order from the upstream side.

The wave front compensator 34(1) compensates laser beam which passes through the two preamplifiers 32(1), 32(2), and the SA 33. The sensor 36(1) corresponding to the wave front compensator 34(1) is provided downstream of the wave front compensator 34(1). A modification of the positional relation among the wave front compensators 34, the sensors 36, and the elements (SA, preamplifiers, main amplifiers) where a change in the wave front occurs will be described later referring to FIGS. 16A to 16C and 17A and 17B.

The wave front compensator 34(2) compensates laser beam which passes through the preamplifier 32(3). Likewise, The wave front compensator 34(3) compensates laser beam which passes through the preamplifier 32(4). The wave front compensator 34(4) compensates laser beam which passes through the main amplifier 35(1). The wave front compensator 34(5) compensates laser beam which passes through the main amplifier 35(2).

The embodiment with the foregoing configuration, like the third embodiment, compensates the curvature and the angle of the wave front of laser beam using the upstream wave front compensators in order. This embodiment has also advantages similar to those of the third embodiment.

Further, according to the embodiment, the laser beam whose wave front is deformed by the two preamplifiers 32(1), 32(2) and the SA 33 on the upstream side is compensated by the single wave front compensator 34(1). Because the upstream side has a lower thermal load than the downstream side, a single wave front compensator 34(1) can be allowed to serve as a plurality of elements (32(1), 32(2), 33) which may change the wave front. This can reduce the manufacturing cost of the laser light source device 2. Hereinafter, the elements which may change the wave front are occasionally called "wave front change generating unit".

Fifth Embodiment

A fifth embodiment will be described referring to FIGS. 16A to 16C and FIGS. 17A and 17B. A modification of the positional relation among the wave front compensator 34, the sensor 36, and the wave front change generating unit (32, 35, 33, etc.) will be discussed in the description of the embodiment. While wave front compensators include the wave front compensator 34 in the amplification system 30 and the wave front compensator 44 in the focusing system 40, the wave front compensator 34 will be described below as a representing compensator.

The wave front change generating units which may cause a thermal-load originated change in the wave front include the preamplifier 32, the main amplifier 35, the SA 33, the relay optical system 31, the reflection mirror, a polarizer, a retarder, and other various optical elements. For the sake of descriptive convenience, mainly, the preamplifier 32, the main amplifier 35 and the SA 33 will be described as the wave front change generating units by way of example.

Figure 16:
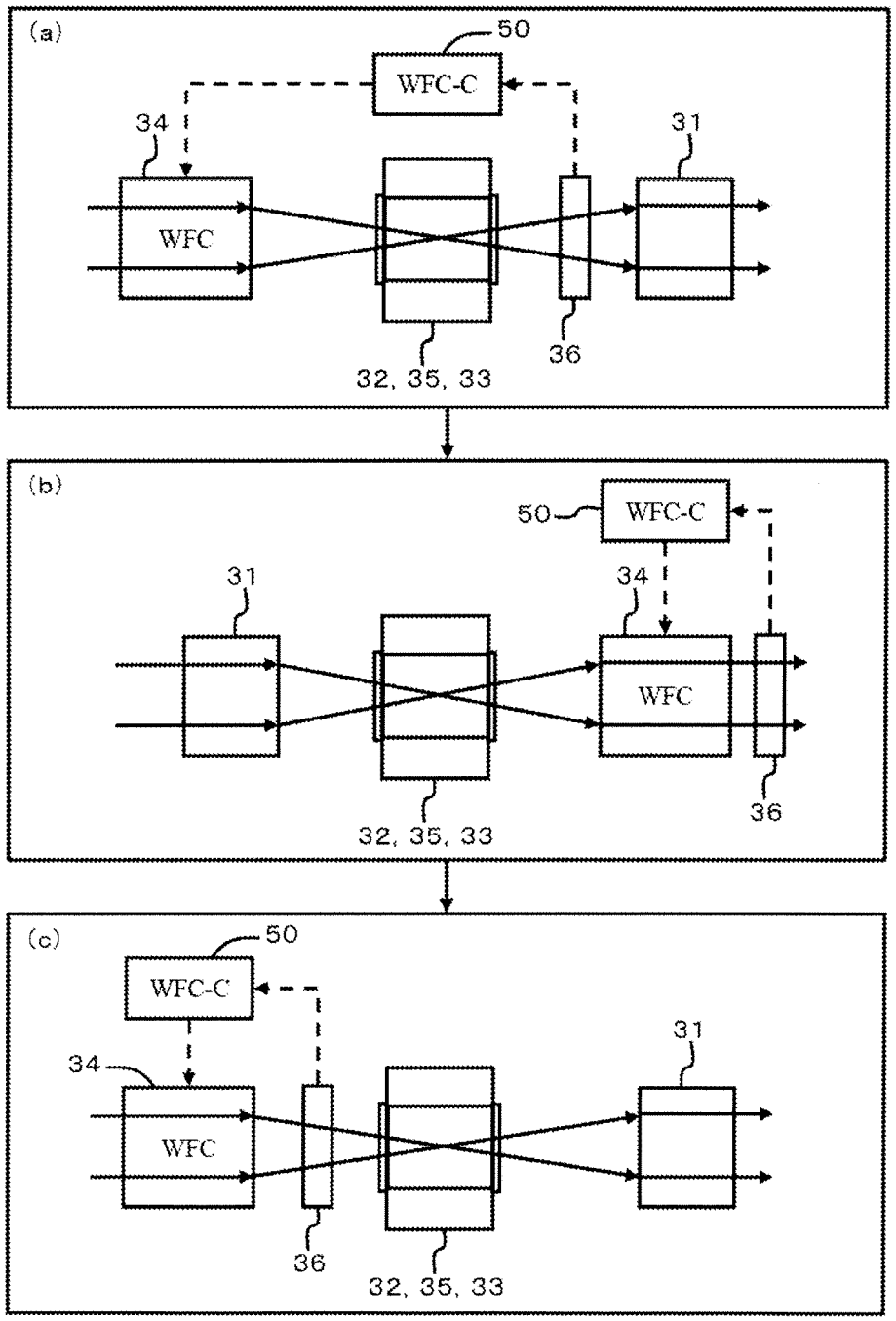
FIGS. 16A to 16C are explanatory diagrams showing how to arrange a wave front compensator according to a fifth embodiment.

FIG. 16A shows a configuration where the wave front compensator 34 is disposed upstream of the wave front change generating unit 32, 35, 33, and the sensor 36 is disposed downstream of the wave front change generating unit 32, 35, 33. Laser beam is compensated by the wave front compensator 34, and then input to the sensor 36. The wave front compensation controller 50 controls the wave front compensator 34 in such a way that the characteristics (curvature and angle of the wave front) of laser beam to be measured by the sensor 36 become predetermined characteristics.

FIG. 16B shows a configuration where the wave front compensator 34 and the sensor 36 are disposed downstream of the wave front change generating unit 32, 35, 33. The wave front compensator 34 is provided between the wave front change generating unit 32, 35, 33 and the sensor 36.

Laser beam is input to the wave front compensator 34 after passing the relay optical system 31 and the wave front change generating unit 32, 35, 33. The wave front compensation controller 50 controls the wave front compensator 34 in such a way that the laser beam characteristic (also called "beam characteristic") which is detected by the sensor 36 becomes a predetermined characteristic.

FIG. 16C shows a configuration where the wave front compensator 34 and the sensor 36 are disposed upstream of the wave front change generating unit 32, 35, 33. The sensor 36 is provided between the wave front compensator 34 and the wave front change generating unit 32, 35, 33. The wave front compensation controller 50 controls the wave front compensator 34 in such a way that the laser beam characteristic which is detected by the sensor 36 becomes a predetermined characteristic.

In FIG. 16C, the wave front compensation controller 50 predicts the deformation of the wave front which may be occurred in the wave front change generating unit 32, 35, 33, and controls the wave front compensator 34 in such a way that the laser beam returns to the normal wave front when passing through the wave front compensator 34 and the wave front change generating unit 32, 35, 33.

Figure 17:
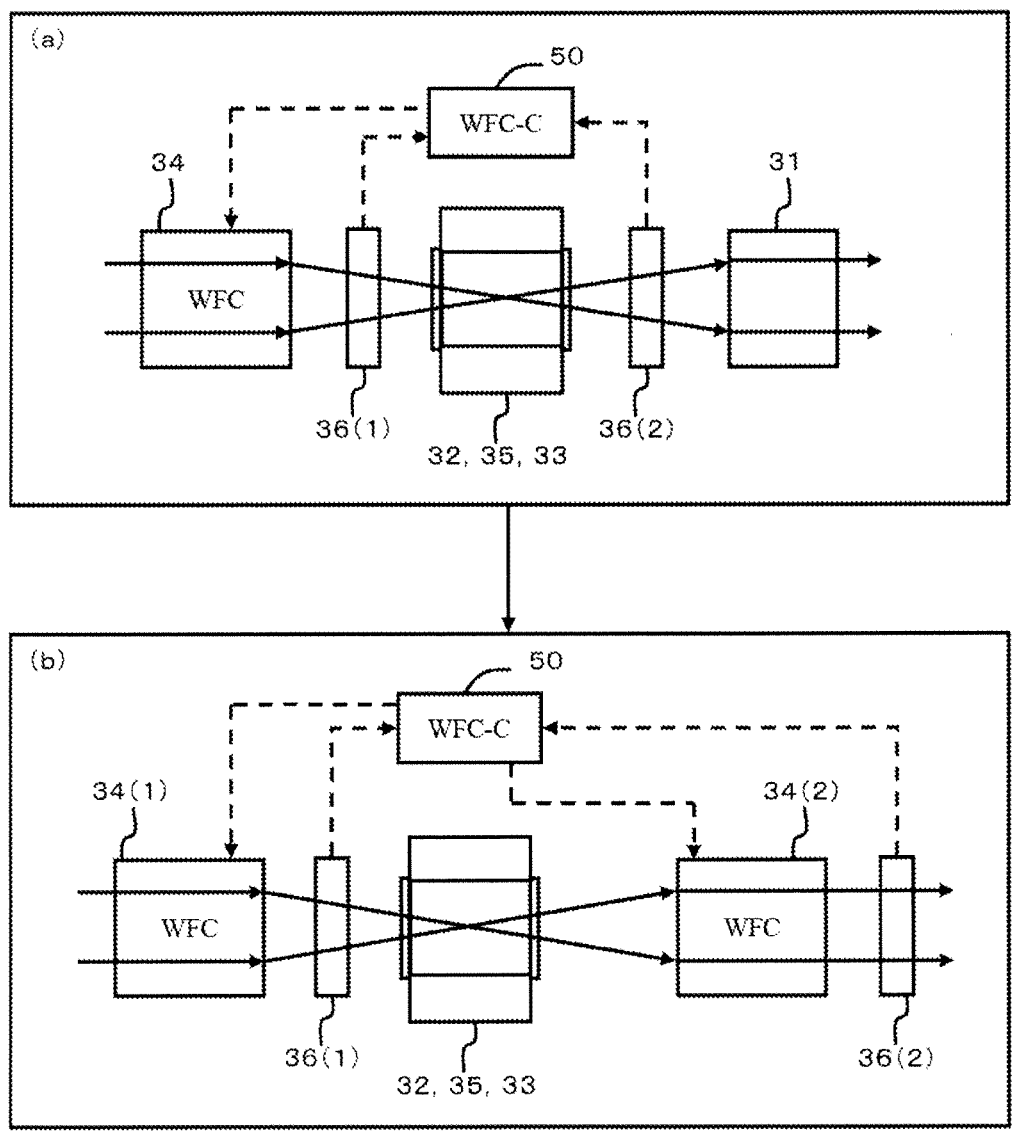
FIGS. 17A and 17B are explanatory diagrams which are a continuation of FIGS. 16A to 16C.

As shown in FIGS. 17A and 17B, a plurality of wave front compensators 34 or a plurality of sensors 36 may be provided. As shown in FIG. 17A, the sensor 36(1) and the sensor 36(2) are respectively disposed upstream and downstream of the wave front change generating unit 32, 35, 33. The wave front compensator 34(1) and the sensor 36(1) are provided upstream of the wave front change generating unit 32, 35, 33. The wave front compensator 34(2) and the sensor 36(2) are provided downstream of the wave front change generating unit 32, 35, 33.

The laser beam which has passed the sensor 36(1) is input to the wave front compensator 34(2) after transmitting through the wave front change generating unit 32, 35, 33, and is further input to the sensor 36(2) after transmitting through the wave front compensator 34(2). The wave front compensation controller 50 controls the wave front compensators 34(1), 34(2) in such a way that the laser beam characteristics measured respectively at the positions of the sensors 36(1) and 36(2) become predetermined characteristics at the respective positions.

Sixth Embodiment

A sixth embodiment will be described referring to FIGS. 18A to 18D. The description of the embodiment will be given of a case where the wave front curvature compensator 200 is constituted by a transmission optical system. As shown in FIGS. 18A to 18D, the wave front curvature compensator 200 can be constituted by using a convex lens 201 and a concave lens 202.

Figure 18:
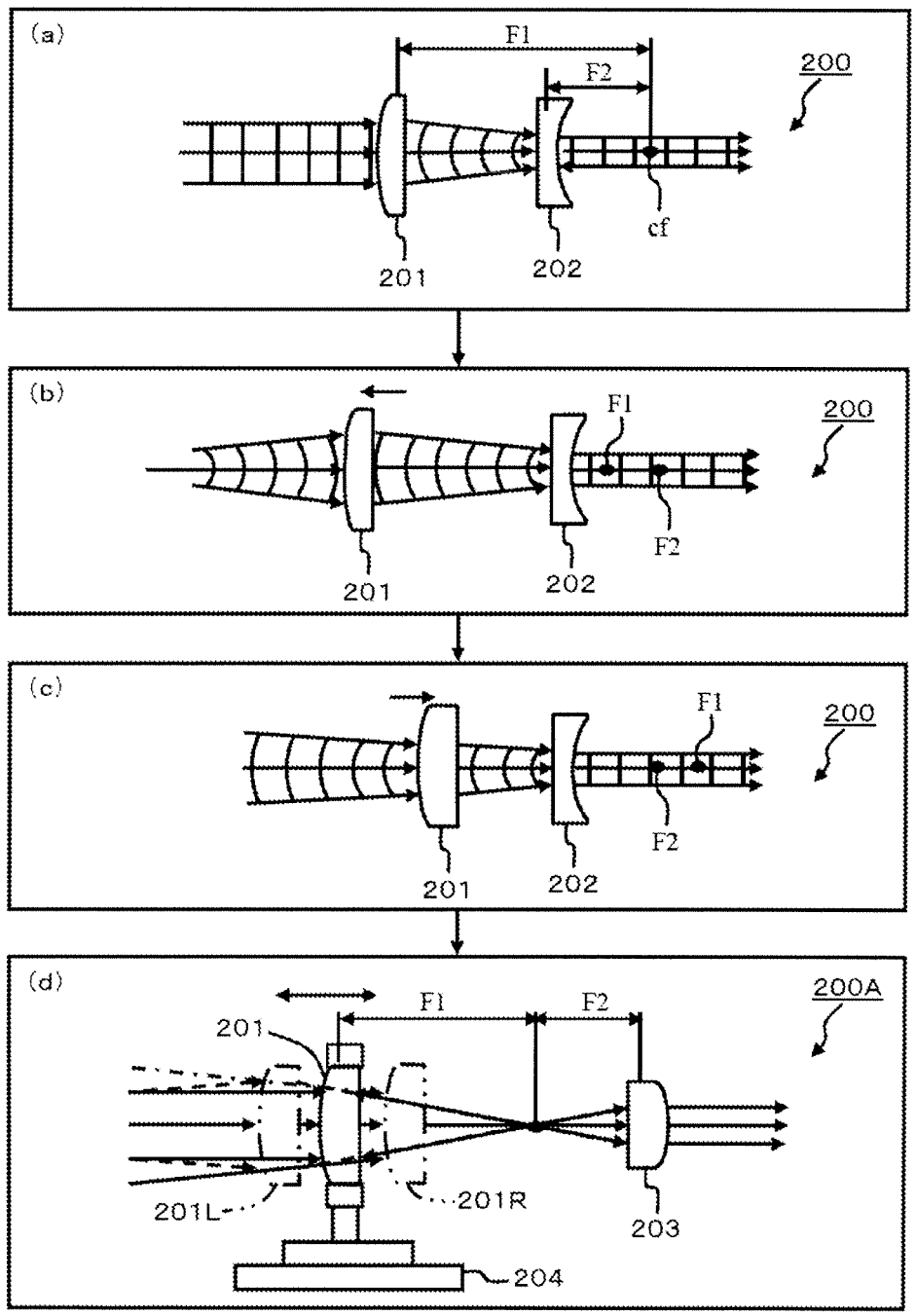
FIGS. 18A to 18D are configurational diagrams of a wave front curvature compensator according to a sixth embodiment.

FIG. 18A shows how an input plane wave is output as a plane wave. If the focal position of the convex lens 201 matches with the focal position of the concave lens 202 at a common focus cf, laser beam is converted to a concave wave when it transmits through the convex lens 201 in the state of a plane wave. The concave-wave laser beam is converted to a plane wave when it transmits through the concave lens 202.

FIG. 18B shows how to convert a convex wave to a plane wave. The convex lens 201 is shifted upstream (left side in FIG. 18A) from the position shown in FIG. 18A. A focal position F1 of the convex lens 201 and a focal position F2 of the concave lens 202 lie on the optical axis of laser beam, with the focus F1 of the convex lens 201 positioned upstream of the focus F2 of the concave lens 202.

When laser beam is changed to a convex wave due to the influence of heat in the wave front change generating unit 32, 35, 33, the laser beam is input to the convex lens 201 in the state of diverging beam, and is converted to a concave wave by the convex lens 201. The laser beam converted to the concave wave is converted to a plane wave as it transmits through the concave lens 202.

FIG. 18C shows how to convert a convex wave to a plane wave. The focal position F1 of the convex lens 201 and the focal position F2 of the concave lens 202 lie on the same optical axis, with the focus F2 positioned upstream of the focus F1. When convex-wave laser beam is input to the convex lens 201, it is converted to a concave wave. The concave-wave laser beam is converted to a plane wave as it passes the concave lens 202.

FIG. 18D shows an example where a wave front curvature compensator 200A is constituted by using two convex lenses 201, 203. The convex lens 201 can be moved leftward and rightward (optical axial direction) by a single-axis stage 204.

When laser beam input as a plane wave (parallel beam) is output as a plane wave (parallel beam), the position of the convex lens 201 is set so that the focal position of the convex lens 201 matches with the focal position of the convex lens 203.

When laser beam becomes convergent beam (concave wave) due to a thermal load, the convex lens 201 is moved to a downstream position 201R on the optical axis by the single-axis stage 204. When laser beam becomes diverging beam (convex wave), on the other hand, the convex lens 201 is moved to an upstream position 201L on the optical axis by the single-axis stage 204.

Seventh Embodiment

Figure 19:
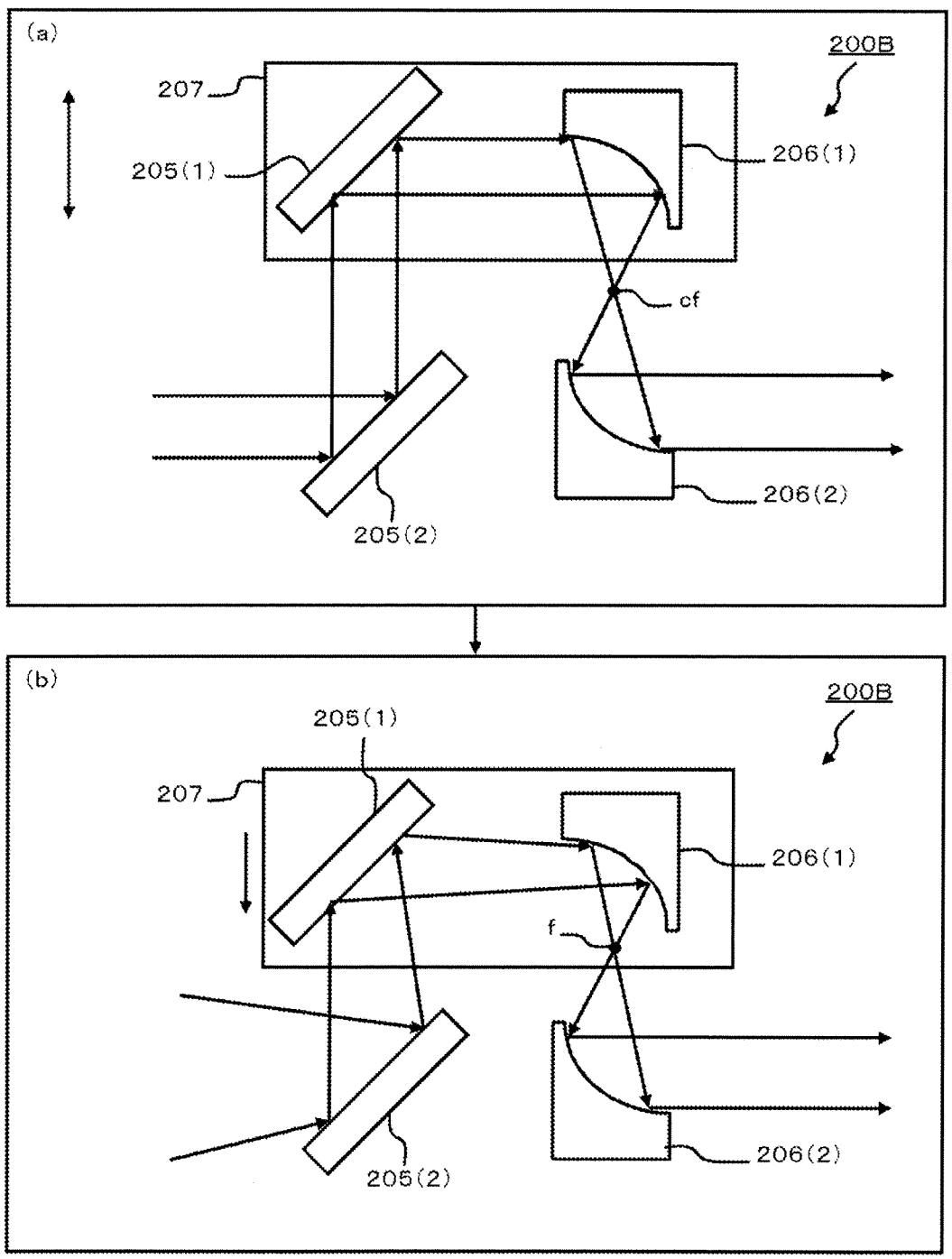
FIGS. 19A and 19B are a configurational diagram of a wave front curvature compensator according to a seventh embodiment.

A seventh embodiment will be described referring to FIGS. 19A and 19B. The description of the embodiment will be given of a case where the wave front curvature compensator 200B is configured as a reflection optical system. The wave front curvature compensator 200B has two reflection mirrors 205(1) and 205(2), and two off-axis parabolic concave mirrors 206(1) and 206(2). The reflection mirror 205(1) and the off-axis parabolic concave mirror 206(2) located on the upper side in FIGS. 19A and 19B are attached to a plate 207. The plate 207 is movable upward and downward in FIGS. 19A and 19B. Each mirror 205(1), 206(1) moves upward or downward together with the plate 207.

FIG. 19A shows the arrangement in a case where laser beam input as parallel beam (plane wave) is output as parallel beam (plane wave). In this case, the focal position of the off-axis parabolic concave mirror 206(1) and the focal position of the off-axis parabolic concave mirror 206(2) are matched with each other to be the common focus cf.

The laser beam is input to the reflection mirror 205(2) from the left side (upstream side) in FIGS. 19A and 19B and reflected, and is input to the other reflection mirror 205(1). The laser beam reflected by the reflection mirror 205(1) is input to the off-axis parabolic concave mirror 206(1). The laser beam is reflected at a reflection angle of 45 degrees by the off-axis parabolic concave mirror 206(1) to be focused at the common focus cf. The laser beam spreads from the common focus cf and is input to the off-axis parabolic concave mirror 206(2) to be reflected at a reflection angle of 45 degrees.

FIG. 19B shows the arrangement in a case where laser beam input as convergent beam (concave wave) is converted to parallel beam (plane wave) before being output. In this case, the plate 207 is moved downstream to shift the focal position of the off-axis parabolic concave mirror 206(1) downstream on the optical axis. As a result, the focal position of the off-axis parabolic concave mirror 206(1) and the focal position of the off-axis parabolic concave mirror 206(2) are matched with each other on the optical axis.

It is noted that when laser beam is input as diverging beam (convex wave), the plate 207 is moved upstream in FIGS. 19A and 19B.

In the wave front curvature compensator 200B configured in the above manner, the reflection mirror 205(1) and the off-axis parabolic concave mirror 206(1) are fixed to the plate 207, and both mirrors 205(1) and 206(1) are simultaneously moved onto the optical axis (in the upward and downward directions in FIGS. 19A and 19B). According to the embodiment, therefore, the curvature of the wave front can be compensated by matching the optical axis of the input beam with the optical axis of the output beam.

Further, because the wave front curvature compensator 200B according to the embodiment is configured as a reflection optical system, a heat-originated change in the wave front can be made smaller even when laser beam transmits through the wave front curvature compensator 200B. This can compensate the curvature of the wave front even when high-power laser beam is used.

Eighth Embodiment

Figure 20:
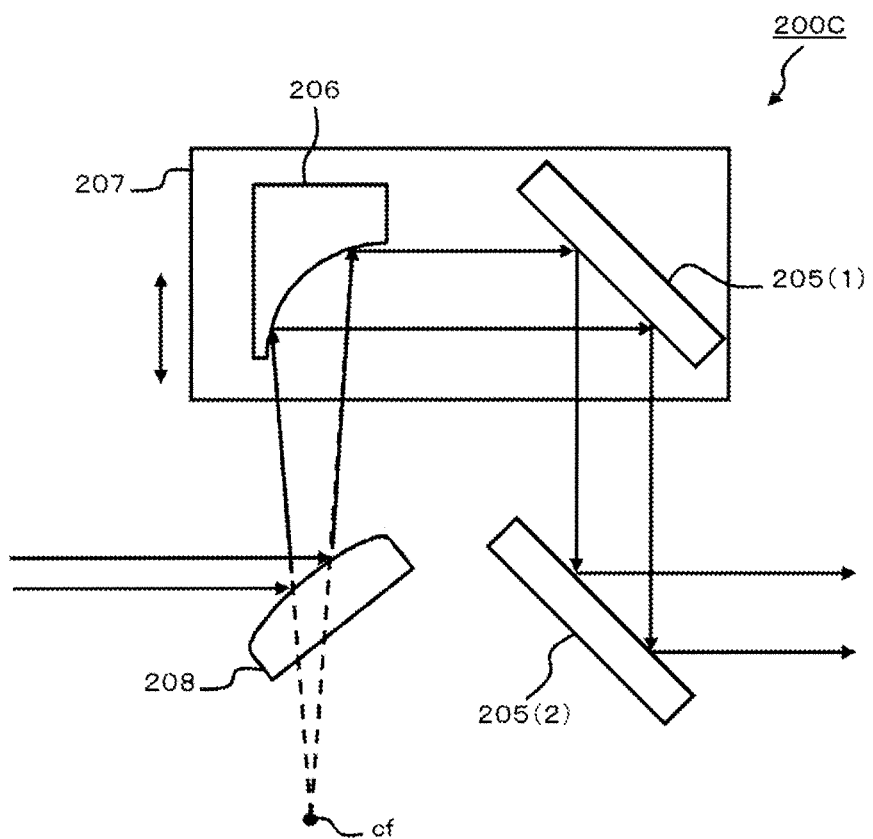
FIG. 20 is a configurational diagram of a wave front curvature compensator according to an eighth embodiment.

An eighth embodiment will be described referring to FIG. 20. A wave front curvature compensator 200C according to the embodiment is constituted by a reflection optical system including an off-axis parabolic concave mirror 206, an off-axis parabolic convex mirror 208, and two reflection mirrors 205(1) and 205(2).

The off-axis parabolic concave mirror 206 and the reflection mirror 205(1) are mounted to a plate 207 movable up and down. Further, the focal position of the off-axis parabolic convex mirror 208 and the focal position of the off-axis parabolic concave mirror 206 are arranged so as to coincide with each other at the common focus cf.

Laser beam with a parallel wave front is reflected by the off-axis parabolic convex mirror 208, and is input to the off-axis parabolic concave mirror 206 as diverging beam, and is converted to a plane wave. The laser beam with a parallel wave front is reflected by each reflection mirror 205(1), 205(2), and output. As the plate 207 is moved up or down, the wave front of the input laser beam can be compensated to a plane wave and output, as per the seventh embodiment.

The embodiment with the foregoing configuration also has advantages similar to those of the seventh embodiment. Further, according to the embodiment, the combination of the off-axis parabolic concave mirror 206 and the off-axis parabolic convex mirror 208 can shorten the distance between both off-axis parabolic mirrors. Therefore, the overall size can be made smaller as compared with the seventh embodiment.

Ninth Embodiment

A ninth embodiment will be described referring to FIGS. 21 and 22. In this embodiment, a wave front curvature compensator 200D, 200E is constituted by arranging a single convex mirror 209 and a single concave mirror 210 in a Z pattern.

Figure 21:
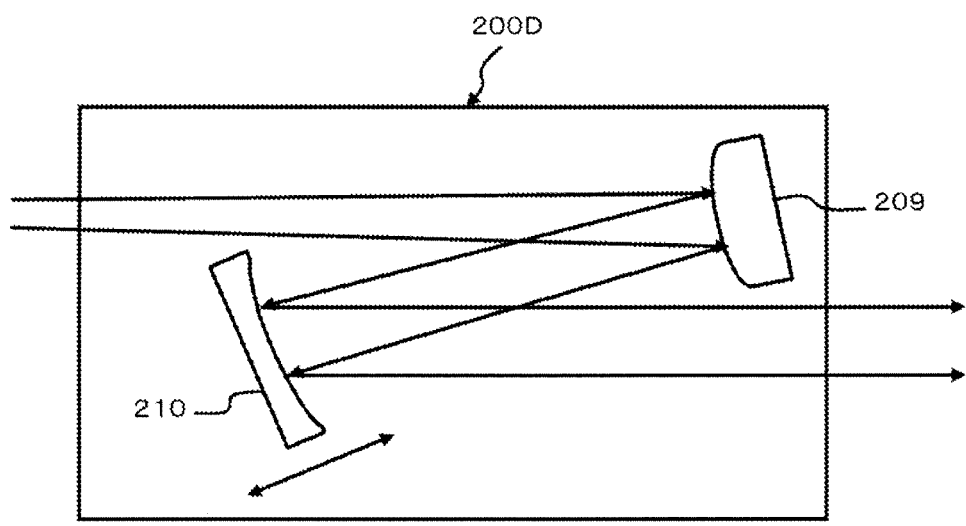
FIG. 21 is a configurational diagram of a wave front curvature compensator according to a ninth embodiment.

FIG. 21 shows the wave front curvature compensator 200D constituted by arranging the upstream convex mirror 209 and the downstream concave mirror 210 in a Z pattern. When diverging laser beam (convex wave) is input to the convex mirror 209, for example, the convex mirror 209 reflects the laser beam at a small incident angle α equal to or lower than 3 degrees or so. The reflected laser beam is input to the concave mirror 210 at the incident angle α, and is converted to parallel beam (plane wave) to be output.

For example, as the position of the concave mirror 210 is moved along the reflection optical axis of the convex mirror 209 as indicated by an arrow in FIG. 21, the wave front of the laser beam can be converted to a plane wave.

Figure 22:
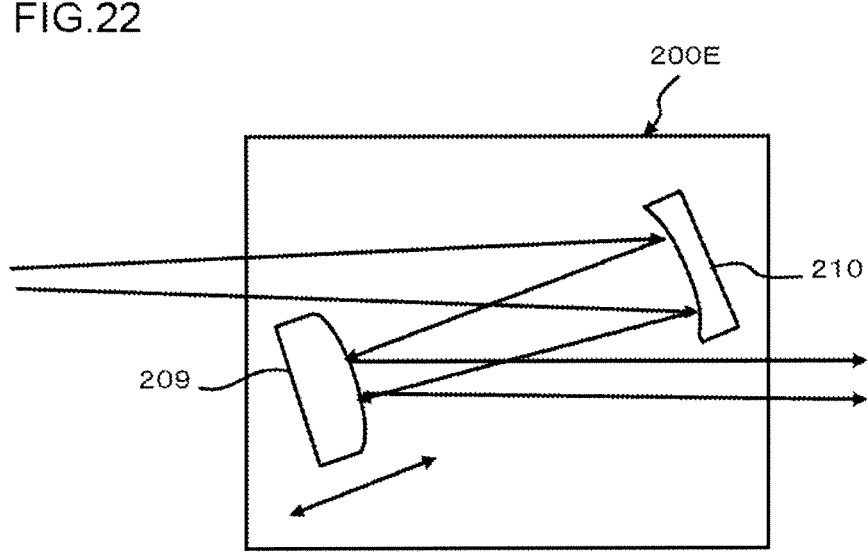
FIG. 22 is a configurational diagram which is a continuation of FIG. 21.

FIG. 22 shows the wave front curvature compensator 200E constituted by arranging the upstream concave mirror 210 and the downstream convex mirror 209 in a Z pattern. When diverging laser beam (convex wave) is input to the concave mirror 210, for example, the concave mirror 210 reflects the laser beam at a small incident angle α (e.g., equal to or lower than 3 degrees). The reflected laser beam is input to the convex mirror 209 at the incident angle α, and is converted to parallel beam (plane wave). For example, as the position of the convex mirror 209 is moved along the reflection optical axis of the concave mirror 210, the wave front of the laser beam can be converted to a plane wave.

According to the embodiment, the convex mirror 209 and the concave mirror 210 can constitute the wave front curvature compensator, thus reducing the manufacturing cost. In addition, the reflection optical system can reduce a change in wave front which occurs when laser beam passes the wave front curvature compensator.

According to the embodiment, the optical axis of laser beam to be output is moved in parallel from the optical axis of laser beam to be input. Therefore, an optical system which matches the optical axis of output beam with the optical axis of input beam may be added to the embodiment.

Tenth Embodiment

A tenth embodiment will be described referring to FIGS. 23 and 24. The description of the embodiment will be given of a case where a wave front curvature compensator 200F, 200G is constituted by a lens and a mirror.

Figure 23:
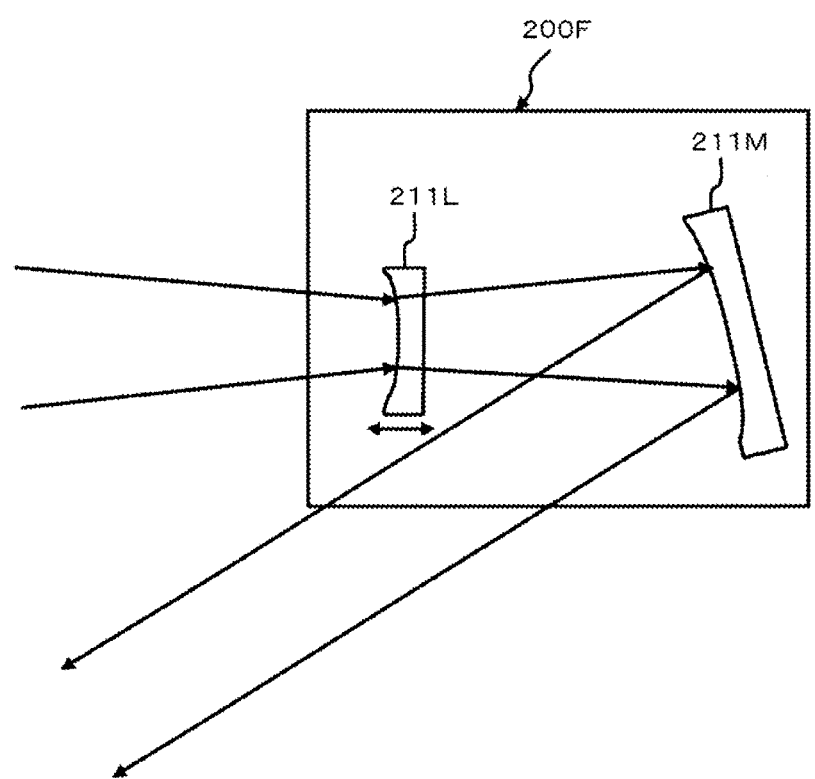
FIG. 23 is a configurational diagram of a wave front curvature compensator according to a tenth embodiment.

FIG. 23 shows a case where a concave lens 211L and a concave mirror 211M constitute the wave front curvature compensator 200F. When convergent laser beam (concave wave) is input to the concave lens 211L, for example, the laser beam is converted to diverging beam (convex wave). The diverging laser beam is input to the concave mirror 211M to be reflected as parallel beam.

When the concave mirror 211M is an off-axis parabolic concave mirror, the incident angle is set to the incident angle of the off-axis parabolic concave mirror. When the concave mirror 211M is a spherical mirror, the incident angle is set to a small angle (equal to or lower than 5 degrees) in order to reduce the wave front aberration. As the concave lens 211L is moved along the optical axis, the wave front of the input laser beam can be compensated.

Figure 24:
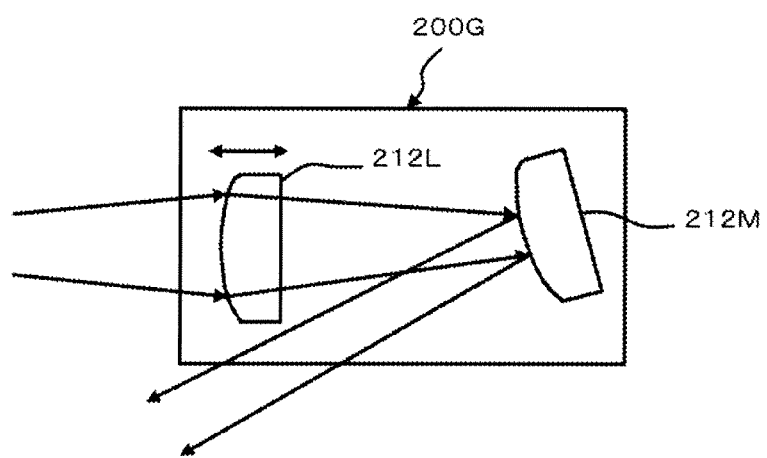
FIG. 24 is a configurational diagram which is a continuation of FIG. 23.

FIG. 24 shows a case where a convex lens 212L and a convex mirror 212M constitute the wave front curvature compensator 200G. When diverging laser beam (convex wave) is input to the convex lens 212L, the laser beam becomes convergent beam (concave wave) to be input to the convex mirror 212M. The laser beam is reflected as parallel beam by the convex mirror 212M.

When the convex mirror 212M is an off-axis parabolic convex mirror, the incident angle is set to the incident angle of the off-axis parabolic convex mirror. When the convex mirror 212M is a spherical mirror, the incident angle is set to a small angle (equal to or lower than 5 degrees) in order to reduce the wave front aberration. As the convex lens 212L is moved along the optical axis, the curvature of the wave front of the laser beam can be compensated.

According to the embodiment with the foregoing configuration, the optical axis of the input laser beam matches with the optical axis of the output laser beam, which is advantageous over the ninth embodiment. Further, according to the embodiment, the use of a single lens which is a transmission optical element can make a heat-originated change in wave front as compared with the sixth embodiment (FIGS. 18A to 18D) which uses two lenses.

Eleventh Embodiment

Figure 25:
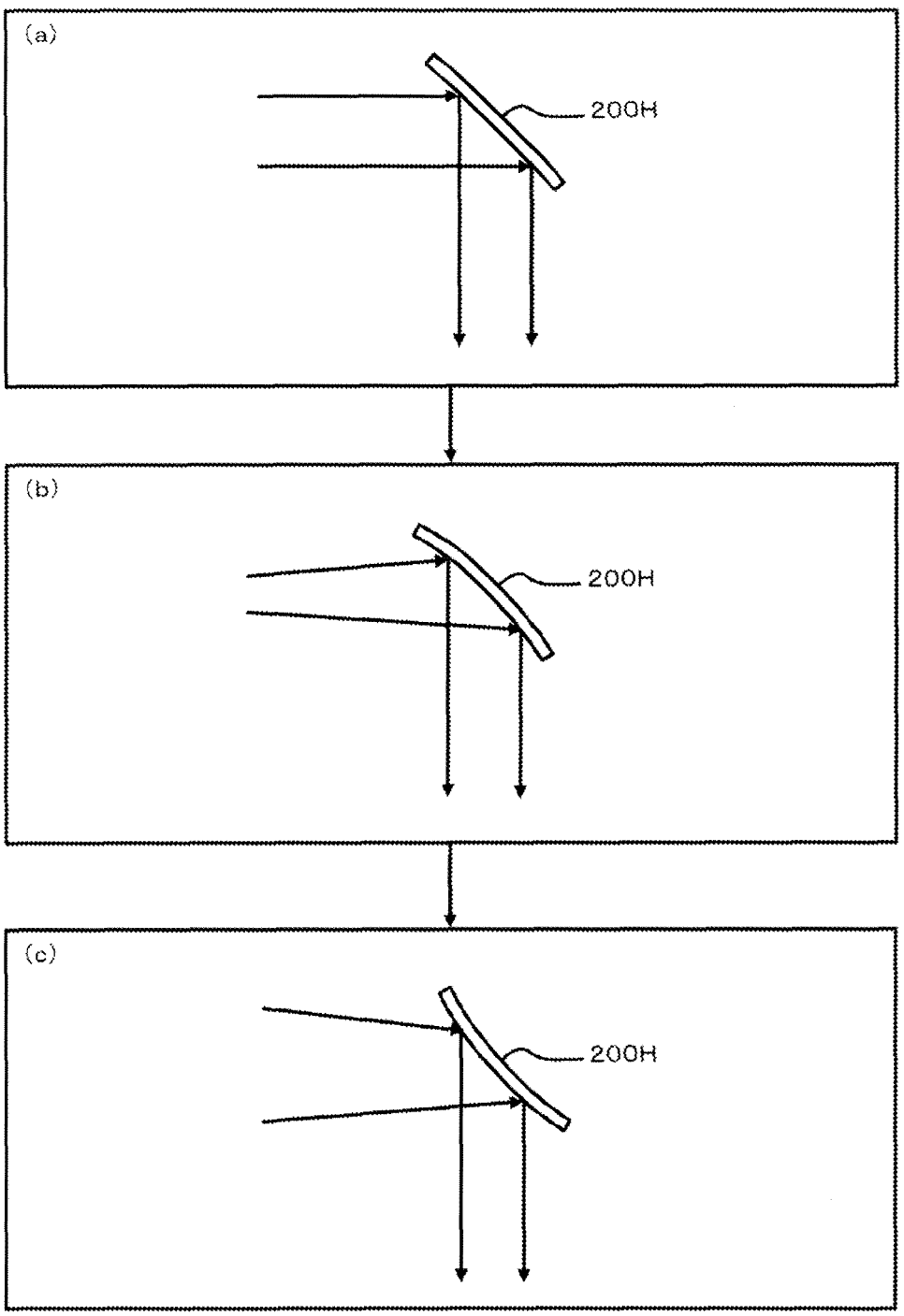
FIGS. 25A to 25C are configurational diagrams of a wave front curvature compensator according to an eleventh embodiment.
Figure 26:
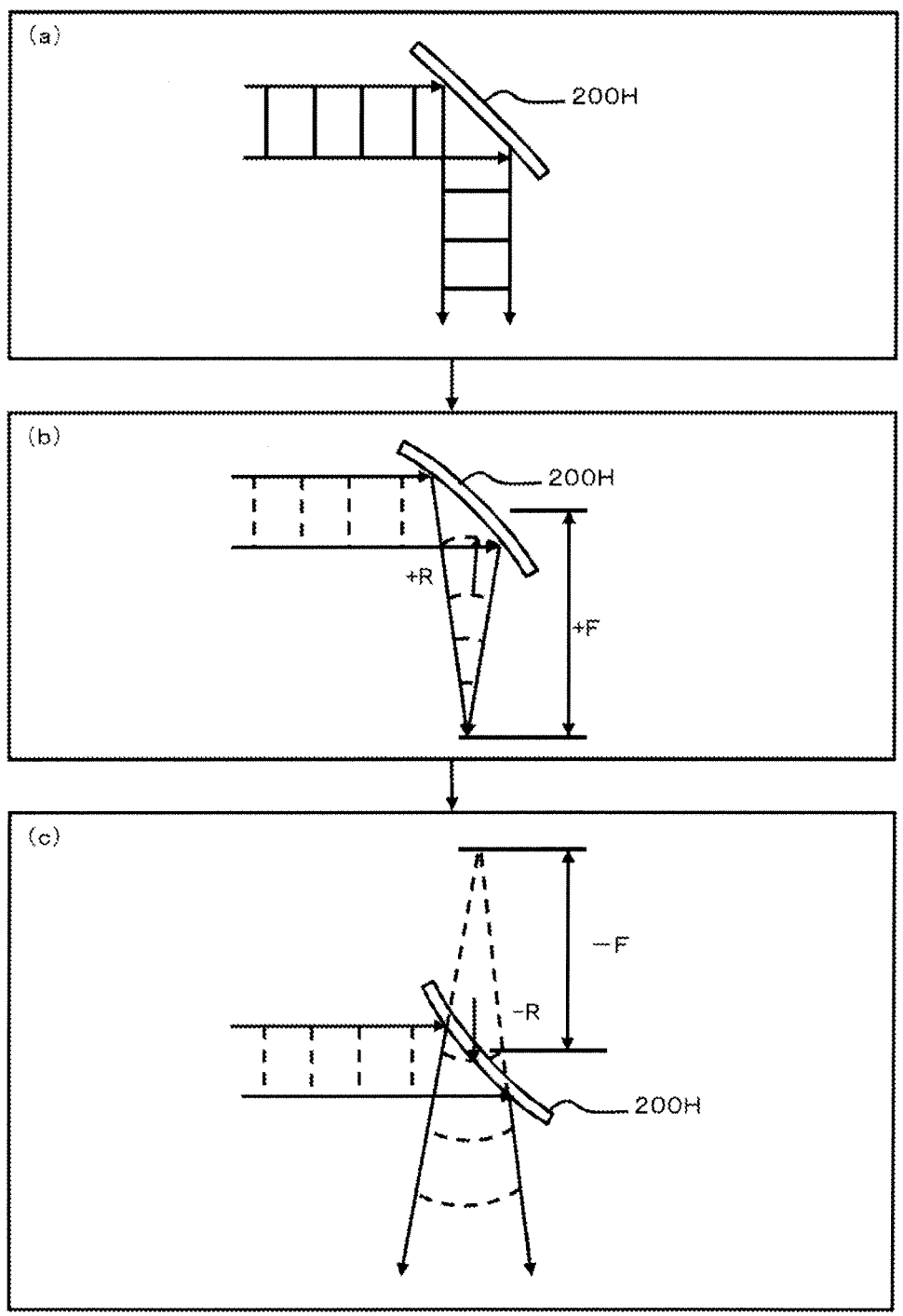
FIGS. 26A to 26C are configurational diagrams which are a continuation of FIGS. 25A to 25C.
Figure 27:
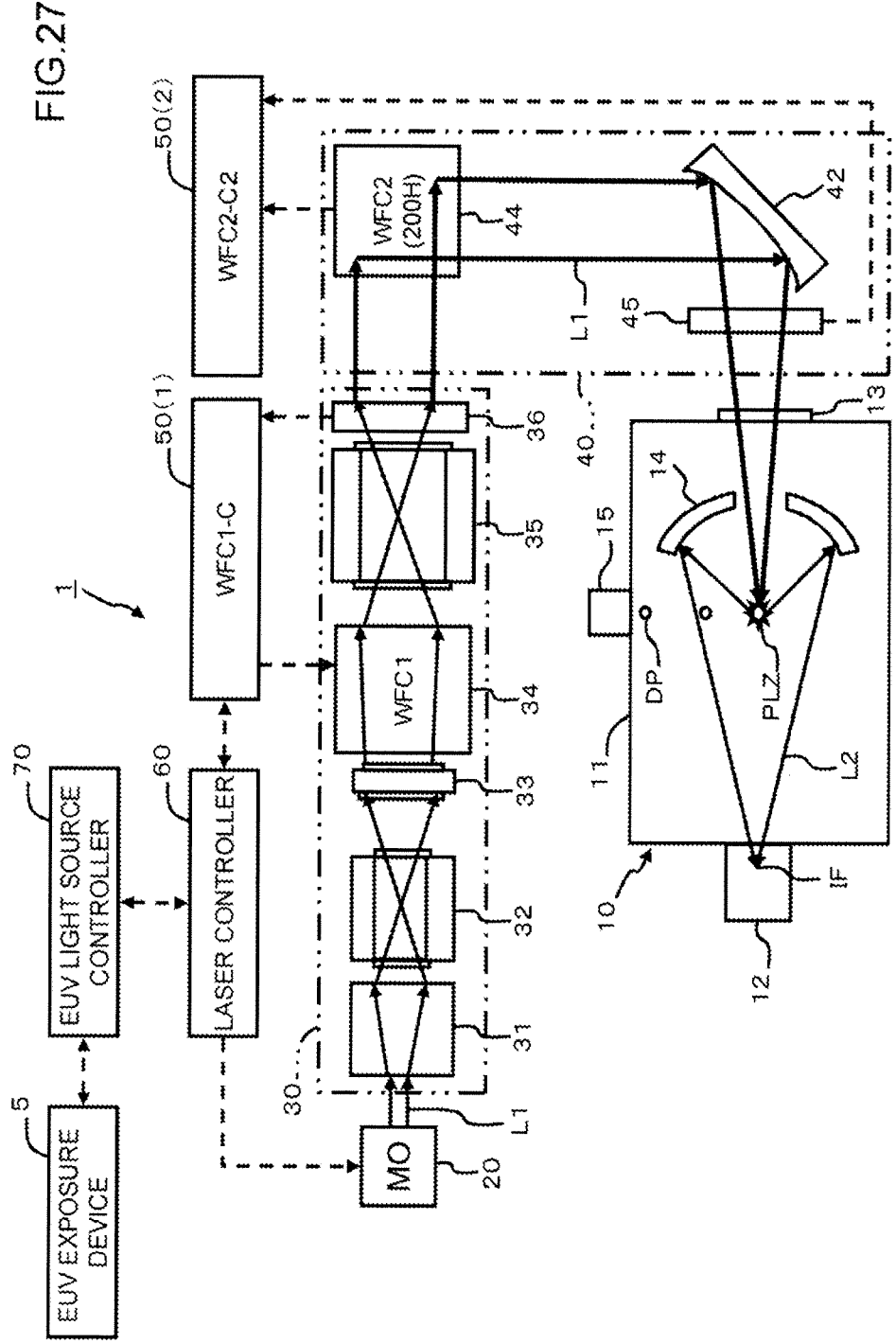
FIG. 27 is a general configurational diagram of an EUV light source device.

An eleventh embodiment will be described referring to FIGS. 25 to 27. This embodiment uses a variable mirror which can variably control the curvature of the reflection surface according to a control signal from the wave front compensation controller 50. Such a variable mirror is called "VRWM" (Variable Radius Wave front Mirror) in the embodiment.

A wave front curvature compensator 200H according to the embodiment is constituted by a VRWM. FIG. 25A and FIG. 26A show a case where laser beam input as a plane wave (parallel beam) is output as a plane wave (parallel beam). In case of converting a plane wave to a plane wave, the VRWM is controlled so that the top surface of the VRWM becomes flat.

FIG. 25B shows a case where laser beam with a convex surface (diverging beam) is converted to a plane wave (parallel beam). In this case, the shape of the VRWM is controlled so that the VRWM has a concave surface.

FIG. 25C shows a case where laser beam with a concave surface (convergent beam) is converted to a plane wave (parallel beam). In this case, the shape of the VRWM is controlled so that the VRWM has a convex surface.

FIG. 26B shows a case where a plane wave is converted to a concave spherical wave. To convert a plane wave to a concave spherical wave, the top surface of the VRWM is controlled so as to have a concave troidal shape (in case of the incident angle of 45 degrees or so). Accordingly, laser beam reflected by the VRWM is focused at the focal distance F. The spherical wave immediately after being reflected at the troidal VRWM top surface becomes a concave spherical wave with a curvature radius R. The focal distance F is equal to the curvature radius R of the spherical wave.

FIG. 26C shows a case where a plane wave is converted to a convex spherical wave. To convert a plane wave to a convex spherical wave, the top surface of the VRWM is controlled so as to have a convex troidal shape (in case of the incident angle of 45 degrees or so). The convex wave reflected by the VRWM becomes a wave front which is emitted from a point light source at the position of a focal distance −(minus)F. The spherical wave immediately after being reflected at the troidal VRWM top surface becomes a spherical wave with a curvature radius −(minus)R. The focal distance −F is equal to the curvature radius −(minus)R of the spherical wave.

Because the wave front curvature compensator 200H can be constituted by the VRWM alone according to the embodiment with the foregoing configuration, the number of parts can be reduced to make the wave front curvature compensator 200H compact, and compensation can be carried out in single reflection, thus resulting in high efficiency.

The wave front curvature compensator 200H according to the embodiment can output input laser beam with the optical axis thereof being changed to 45 degrees. As shown in FIG. 27, therefore, the wave front curvature compensator 200H can be used at the position where the optical path of the laser beam is changed by 45 degrees. In this case, the reflection mirror 41 can be omitted, thus making it possible to simplify the configuration and reduce the manufacturing cost.

Twelfth Embodiment

A twelfth embodiment will be described referring to FIGS. 28A to 28C. In this embodiment, a wave front curvature compensator 200J is constituted by arranging a VRWM 213 and a reflection mirror 214 in a Z pattern.

Figure 28:
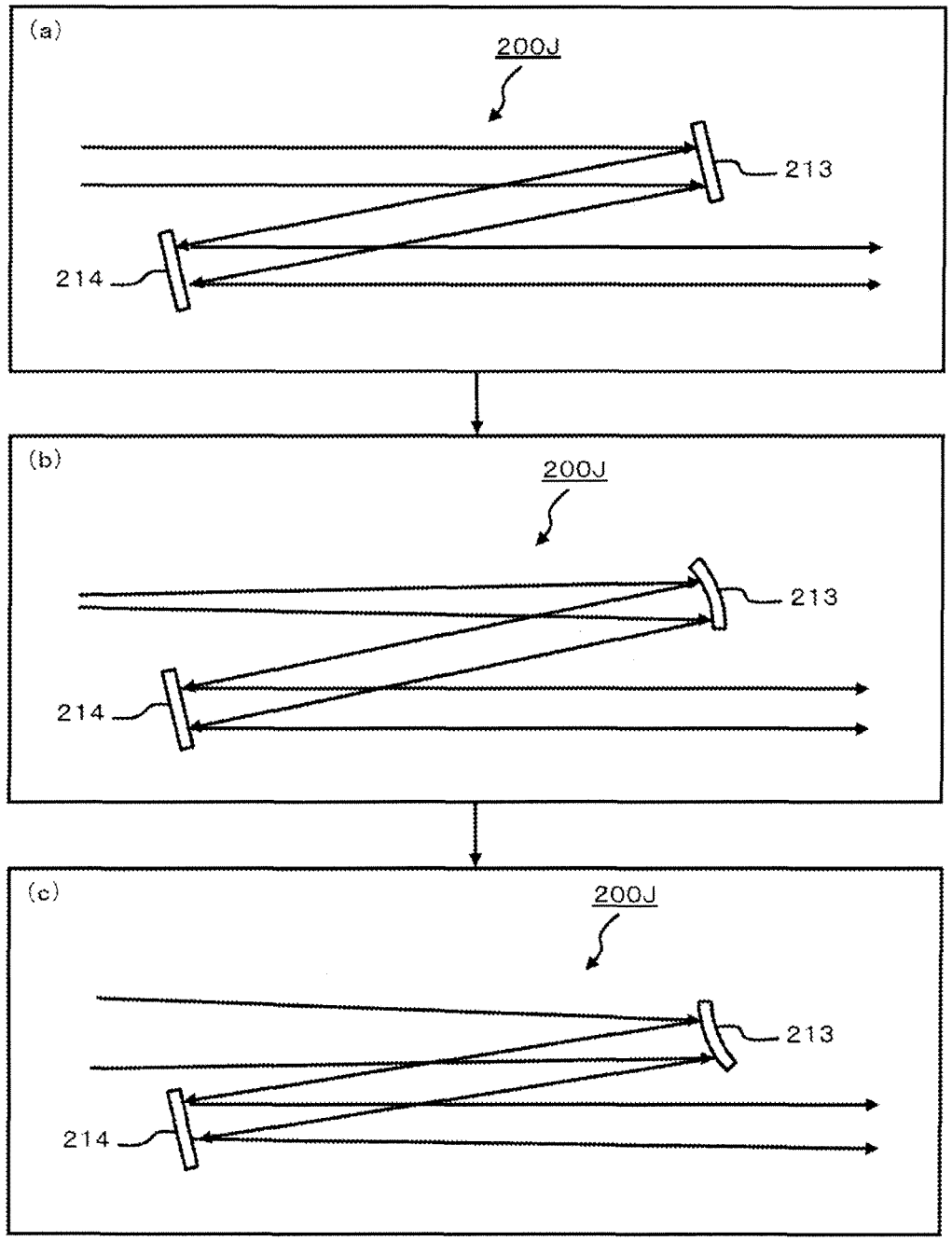
FIGS. 28A to 28C are configurational diagrams of a wave front curvature compensator according to a twelfth embodiment.

When laser beam input to the VRWM as a plane wave is output as a plane wave, as shown in FIG. 28A, the VRWM 213 is controlled so as to become flat. When laser beam input to the VRWM as a convex wave is converted to a plane wave, as shown in FIG. 28B, the shape of the VRWM 213 is set to a concave spherical surface. When laser beam input to the VRWM as a concave wave is converted to a plane wave, as shown in FIG. 28C, the shape of the VRWM 213 is set to a convex spherical surface.

The embodiment with this configuration also has advantages similar to those of the eleventh embodiment. It is noted that according to the embodiment, the input optical axis and the output optical axis of laser beam are shifted in parallel to each other, and do not coincide with each other. Therefore, an optical system may be added to the embodiment to return the optical axis to the original state.

Thirteenth Embodiment

Figure 29:
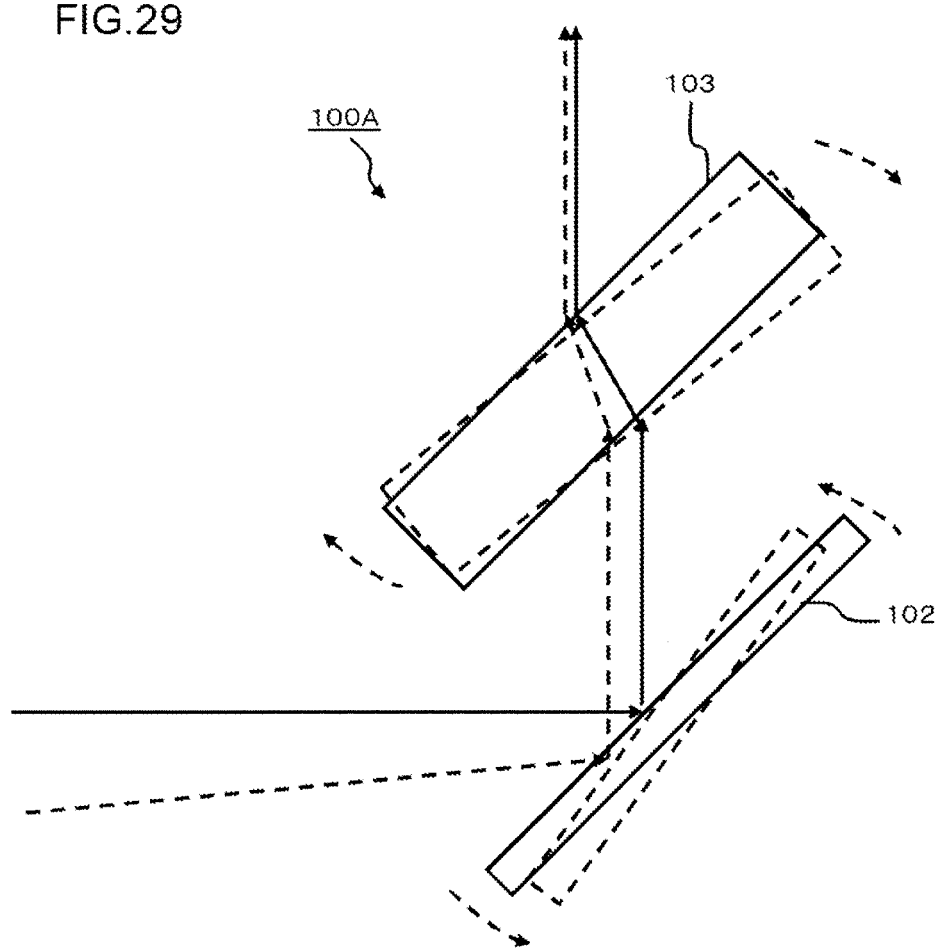
FIG. 29 is a configurational diagram of an angle compensator according to a thirteenth embodiment.

A thirteenth embodiment will be described referring to FIG. 29. In this embodiment, a single reflection mirror 102 and a single plane parallel window 103 constitute an angle compensator 100A. The reflection mirror 102 and the plane parallel window 103 are rotatable in both clockwise and counterclockwise in FIG. 29.

As indicated by a solid-line arrow in the diagram, laser beam input to the reflection mirror 102 is reflected by the reflection mirror 102 to be input to the window 103, and transmits through the window 103 to be output. The optical axis indicated by the solid-line arrow is a reference optical axis.

When laser beam is input askew to the reflection mirror 102 as indicated by a broken-line arrow, by way of contrast, the tilt angle of the reflection mirror 102 is adjusted. Accordingly, the optical axis of the laser beam reflected by the reflection mirror 102 is set in parallel to the reference optical axis.

The laser beam parallel to the reference optical axis is input to the plane parallel window 103. The optical axis of the laser beam transmitting through the plane parallel window 103 can be matched with the reference optical axis by adjusting the tilt angle of the plane parallel window 103.

Fourteenth Embodiment

A fourteenth embodiment will be described referring to FIGS. 30A and 30B. The description of the embodiment will be given of a wave front compensator 34A which can serve as an angle compensator and a wave front compensator. The wave front compensator 34A includes a VRWM 110 and a reflection mirror 111.

Figure 30:
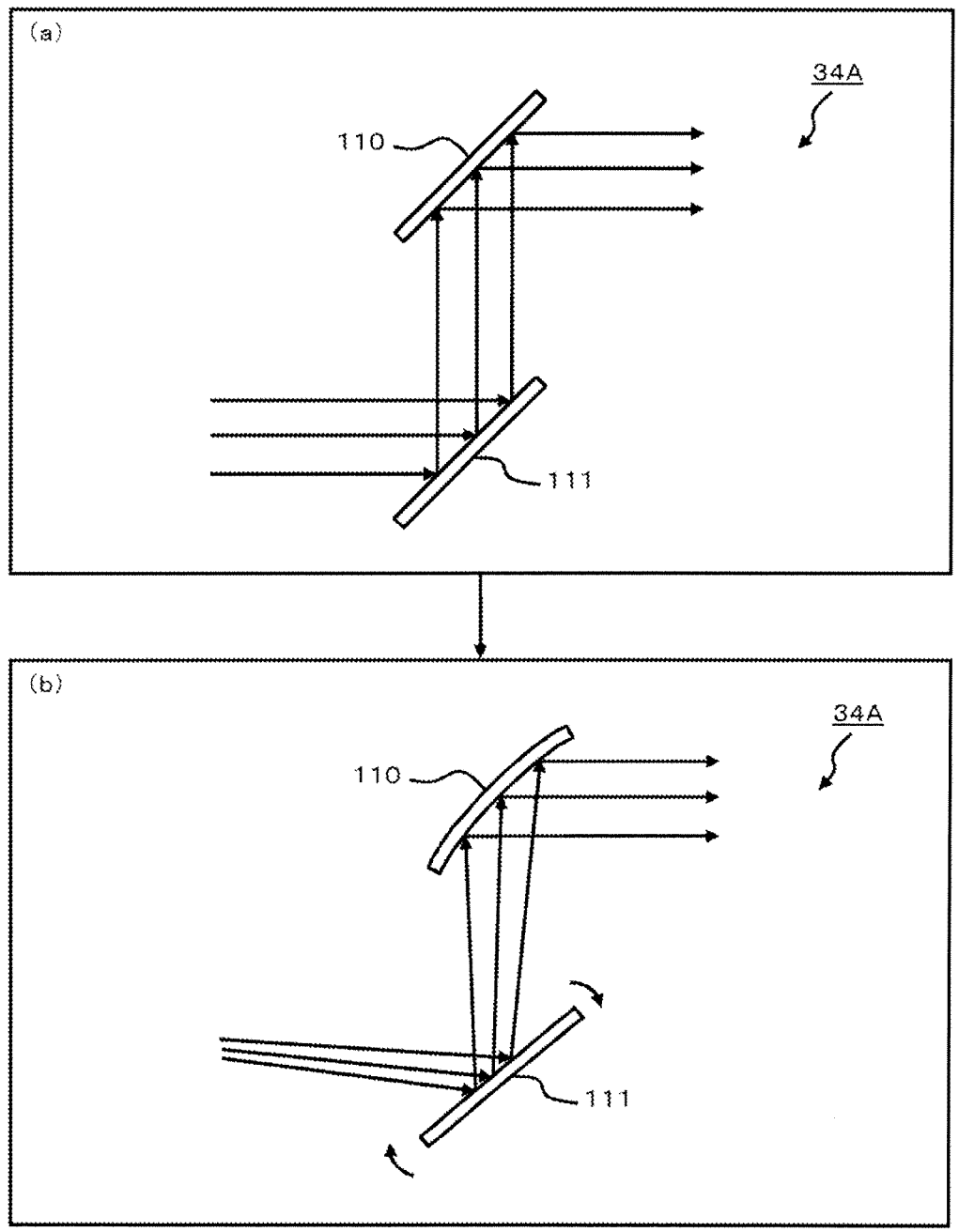
FIGS. 30A and 30B are configurational diagrams of a wave front compensator according to a fourteenth embodiment.

FIG. 30A shows a case where the thermal load is low. Plane-wave laser beam is input to the reflection mirror 111 at 45 degrees and is reflected by the reflection mirror 111 to be input to the VRWM 110 at an incident angle of 45 degrees. The VRWM 110 is controlled so as to have a flat shape. The laser beam is reflected at the flat mirror surface of the VRWM 110 to be output in the state of a plane wave.

The compensation is not limited to the case of converting plane-wave input radiation to plane-wave output radiation. The focal distance of the VRWM can be controlled to a constant value so that the laser beam input as diverging beam (convex wave) is output as laser beam whose wave front has a desired curvature.

FIG. 30B shows a case where the angle (direction) of laser beam and the curvature of the wave front thereof are changed.

Suppose that the direction of the input laser beam is tilted downward in FIGS. 30A and 30B due to the influence of the thermal load, changing the wave front to diverging beam (convex wave). In this case, the angle of the reflection mirror 111 is controlled in such a way that the optical axis of laser beam to be reflected by the reflection mirror 111 matches with the reference optical axis.

The laser beam reflected by the reflection mirror 111 is input to the VRWM 110 at the incident angle of 45 degrees. The shape of the VRWM 110 is set to a concave wave in such a way that the laser beam to be reflected by the reflection mirror 110 becomes a plane wave.

The description has been given of the case of converting convex-wave laser beam to a plane wave, which is not restrictive. Concave-wave laser beam can be converted to a plane wave, or convex-wave or concave-wave input radiation can be converted to output radiation whose wave front has a desired curvature.

In case where the tilt angle lies within the allowable aberration, for example, the optical axis of the output beam may be matched with the reference optical axis by controlling the angles of the horizontal and vertical axes of the VRWM 110 (controlling the tilt and roll).

Fifteenth Embodiment

A fifteenth embodiment will be described referring to FIGS. 31A and 31B. In this embodiment, a wave front compensator 34B serving as an angle compensator and a wave front compensator is constituted by arranging a reflection mirror 113 and a VRWM 112 in a Z pattern. The incident angle is a small angle of 3 degrees or less. That is, the incident angle is set to an angle which does not cause aberration.

Figure 31:
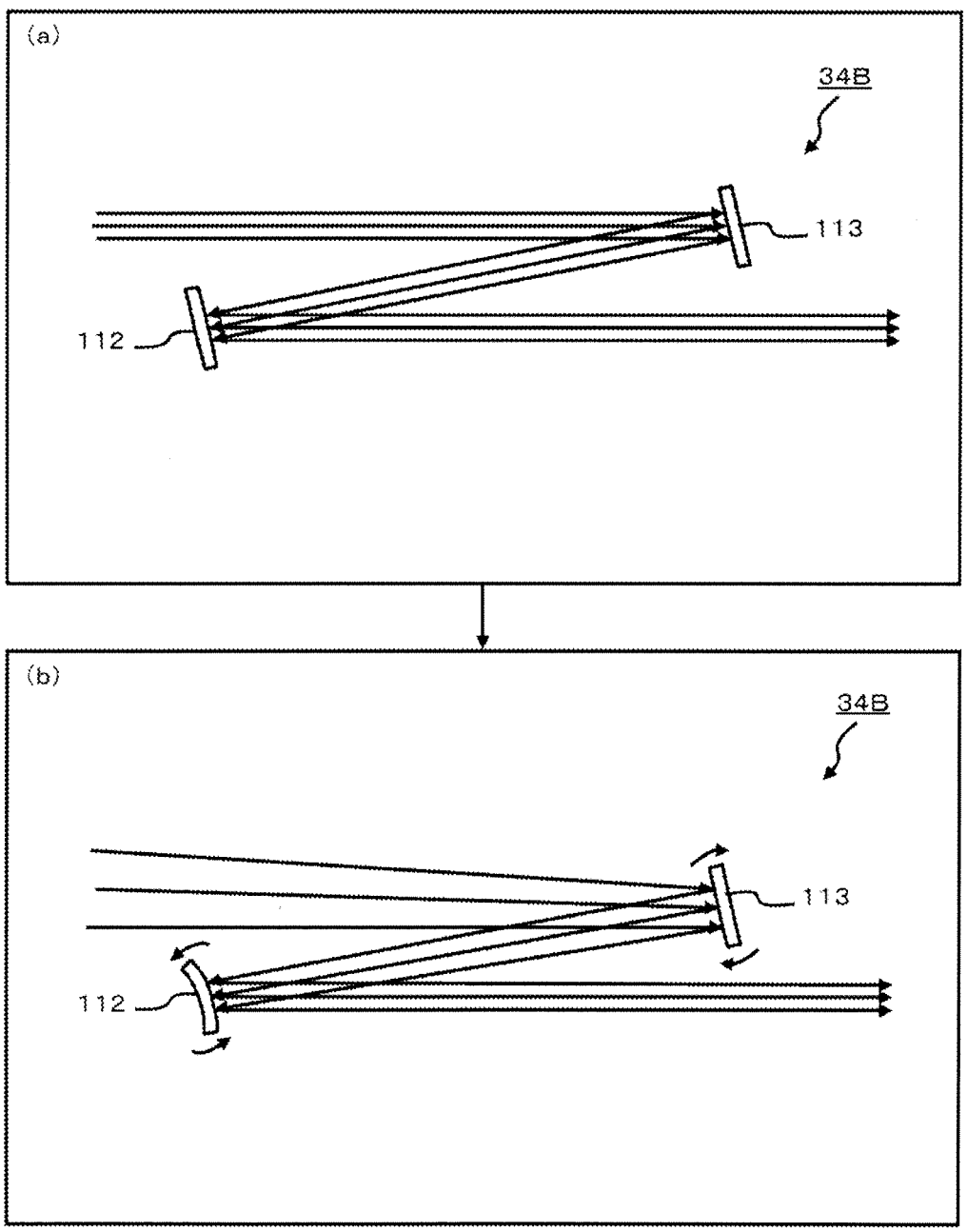
FIGS. 31A and 31B are configurational diagrams of a wave front compensator according to a fifteenth embodiment.

FIG. 31A shows a case where the thermal load is low. Plane-wave laser beam is input to the reflection mirror 113 at an incident angle of 3 degrees or less to be reflected. The reflected laser beam is input to the VRWM 112 at an incident angle of 3 degrees or less. The shape of the VRWM 110 is controlled so as to be flat, and reflects laser beam in the state of a plane wave. The description has been given of the case of a plane wave, which is not restrictive. Even when a convex wave or a concave wave is input, for example, it can be output as laser beam whose wave front has a desired curvature by changing the shape of the VRWM 112.

FIG. 31B shows a case where the thermal load is high. A description will now be given of a case where the angle of the input laser beam is tilted downward in FIG. 31B and the wave front of the laser beam becomes a convex wave. In this case, the angle of the reflection mirror 113 is changed to match the optical axis of laser beam to be reflected by the reflection mirror 113 with the reference optical axis (optical axis shown in FIG. 31A).

The laser beam reflected by the reflection mirror 113 is input to the VRWM 112 at an incident angle of 3 degrees or less. The shape of the VRWM 112 is changed to a convex wave and the angle of the VRWM 112 is adjusted in such a way that the laser beam reflected by the reflection mirror 110 becomes a plane wave. The compensation is not limited to the case of converting input beam to a plane wave, and a concave wave or a convex wave can be converted to a wave front having a desired curvature to be output. The same is true of the following embodiments.

Sixteenth Embodiment

A sixteenth embodiment will be described referring to FIGS. 32A and 32B. In this embodiment, a wave front compensator 34C serving as an angle compensator and a wave front compensator is constituted by using two convex lenses 114 and 115. The convex lens 115 is provided on a movable stage 117 for adjusting the position in a direction orthogonal to the optical axis (up and down direction in FIGS. 32A and 32B). Further, the movable stage 117 is provided on another movable stage 118 for adjusting the position in the optical axial direction. Therefore, the convex lens 115 can be moved in either one of the optical axial direction and the direction orthogonal to the optical axis. Reference numeral "119" denotes a point (focal point) where beam having passed the convex lens 114 is focused.

Figure 32:
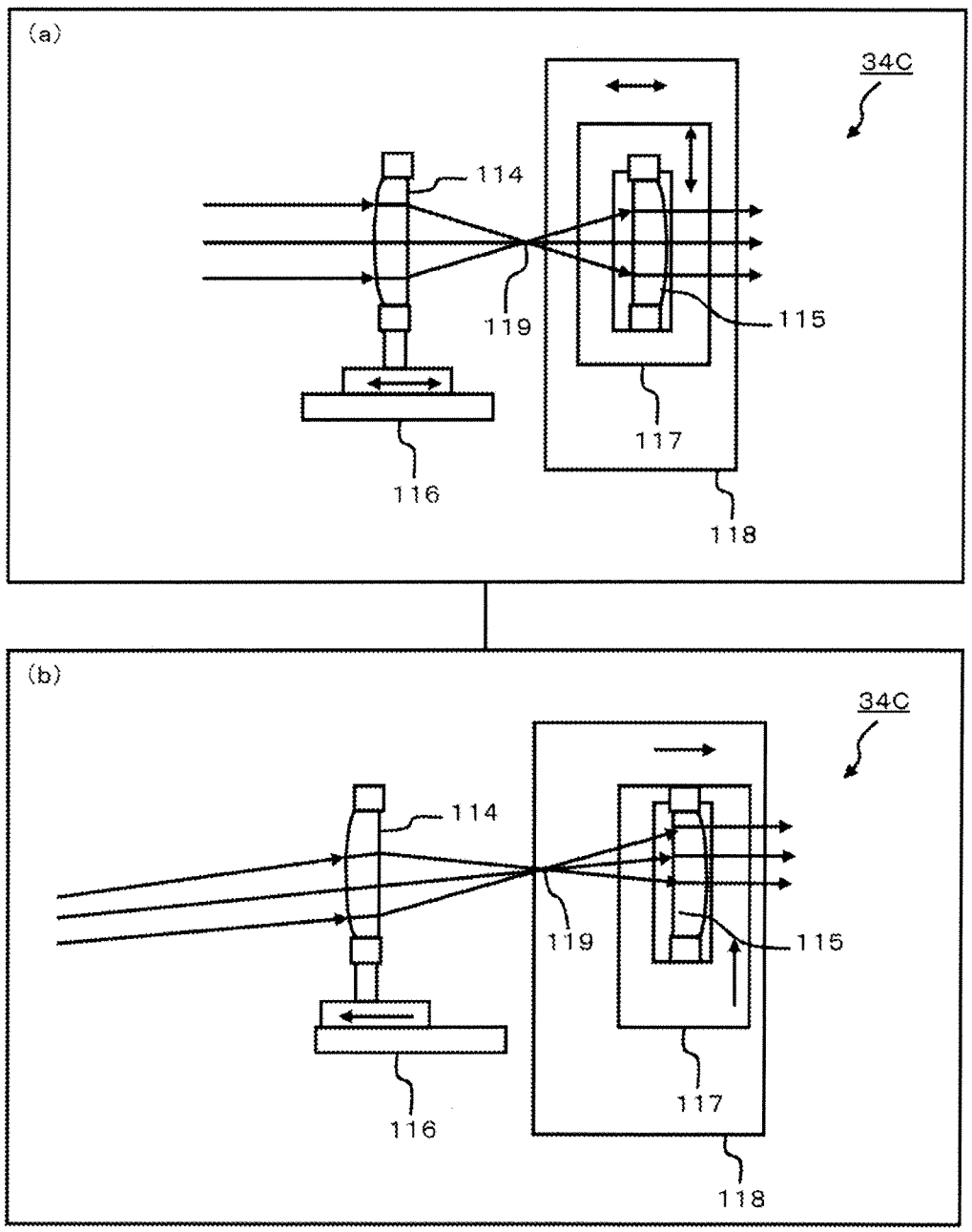
FIGS. 32A and 32B are configurational diagrams of a wave front compensator according to a sixteenth embodiment.

FIG. 32A shows a case where the thermal load is low. Plane-wave laser beam transmits through the convex lens 114 to be focused at the focal position. The convex lens 115 is disposed in such a way that its focal position matches with the focal position of the convex lens 114 on the same optical axis. The beam focused at the position becomes diverging beam to be input to the convex lens 115, and is converted to a plane wave input to be output by the convex lens 115.

The compensation is not limited to the case of converting plane-wave input beam to plane-wave output beam. The focal distance of the VRWM can be controlled to a constant value so that the laser beam input as diverging beam (convex wave) is output as laser beam whose wave front has a desired curvature.

FIG. 32B shows a case where the thermal load is high. The input direction of the laser beam is tilted obliquely upward and becomes diverging beam (convex wave) due to the influence of the thermal load. This diverging beam is focused at a position farther than the focal position of the convex lens 114. The position of the convex lens 114 is moved in the optical axial direction (left and right direction in FIGS. 32A and 32B) in such a way that the focusing point matches with the focus of the convex lens 115. Further, the convex lens 115 is moved in the direction orthogonal to the optical axis (up and down direction in FIGS. 32A and 32B). This causes the output direction of the laser beam to match with the reference optical axis. The laser beam which has passed the convex lens 114 is input to the convex lens 115 to be converted to a plane wave, which is output along the reference optical axis.

It is noted that while achievement of the wave front compensator 34 which executes angle compensation and compensation of the curvature of the wave front is not limited to the coupling of the convex lens 114 and the convex lens 115, the wave front compensator 34 which executes angle compensation and wave front curvature compensation may be configured by coupling a single convex lens 114 to a single concave wave.

Seventeenth Embodiment

A seventeenth embodiment will be described referring to FIG. 33. In this embodiment, a wave front compensator 34D serving as an angle compensator and a wave front compensator is constituted by using a deformable mirror 120 and a reflection mirror 121.

Figure 33:
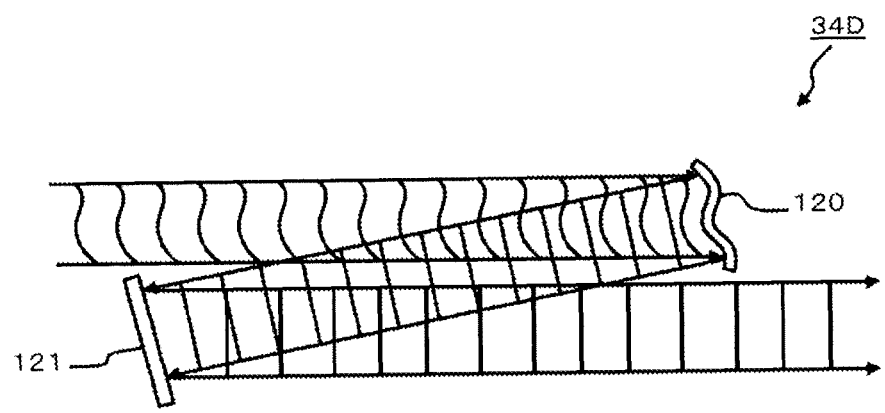
FIG. 33 is a configurational diagram of a wave front compensator according to a seventeenth embodiment.

As shown in FIG. 33, the deformable mirror 120 and the reflection mirror 121 are arranged in a Z pattern. The shape of the reflection surface of the deformable mirror 120 is controlled variably according to a control signal. The deformable mirror 120 is disposed before the preamplifier or between the preamplifier and the main amplifier. Accordingly, laser beam before being turned into high-power laser beam is input to the deformable mirror 120.

When laser beam with a deformed wave front is input to the deformable mirror 120, the shape of the reflection surface of the deformable mirror 120 is adjusted according to the input wave front. The deformable mirror 120 compensates the wave front of the input laser beam to a plane wave before reflecting the laser beam. The laser beam compensated to a plane wave is reflected by the reflection mirror 121 to be output.

The use of the deformable mirror 120 can allow even a wave front which is not a spherical wave, e.g., an S-shaped wave front, to be converted to a plane wave or a desired spherical wave. In addition, the direction of laser beam can be compensated by a small angle. Further, the direction of laser beam can be adjusted by performing tilt and roll controls on each of the reflection mirror 121 and the deformable mirror 120. The same is true of an eighteenth embodiment to be described next.

According to the embodiment, the deformable mirror 120 is disposed before (upstream of) the main amplifier, so that the wave front of laser beam with relatively low power can be compensated. According to the art described in JP-A-2003-270551 mentioned above, by way of contrast, high-power laser beam is input to the deformable mirror, so that the deformable mirror is likely to be damaged by the heat of laser beam, and thus has lower reliability. Because the deformable mirror is constituted as a set of multiple micro-actuators, it is difficult to effectively cool the deformable mirror. When high-power laser beam is input to the deformable mirror, therefore, the deformable mirror is likely to be damaged by heat.

Eighteenth Embodiment

An eighteenth embodiment will be described referring to FIG. 34. In this embodiment, a deformable mirror 120 is combined with polarization control to constitute a wave front compensator 34E. The wave front compensator 34E has the deformable mirror 120, a beam splitter 122, and a λ/4 plate 123. A wave front change generating unit 32, 35, 33 can be disposed between the beam splitter 122 and λ/4 plate 123.

For example, a coating to isolate P polarized light and S polarized light is provided. Laser beam with P polarization (polarized wave front including the surface of a sheet) is input to the beam splitter 122. It is assumed that the wave front of the laser beam is input to the beam splitter 122 in the state of a plane wave. It is however assumed that the laser beam travels from the beam splitter 122 and passes through the wave front change generating unit 32, 35, 33, thus deforming the wave front in the S shape.

The laser beam having passed through the wave front change generating unit 32, 35, 33 transmits through the λ/4 plate 123 to become circularly polarized light. The wave front compensator 34 deformed in the S shape is compensated to a predetermined wave front by the deformable mirror 120 adjusted to an appropriate shape.

The laser beam with compensated wave front transmits through the λ/4 plate 123 again to be converted to S polarized light. The S polarized laser beam transmits through the wave front change generating unit 32, 35, 33 to be converted from the predetermined wave front to a plane wave. The laser beam converted to the plane wave is input to the beam splitter 122. The S polarized laser beam is reflected by the beam splitter 122, and output as a plane wave. The laser beam can be output in a wave front shape other than a plane wave by adjusting the shape of the top surface of the beam splitter 122.

Nineteenth Embodiment

Figure 35:
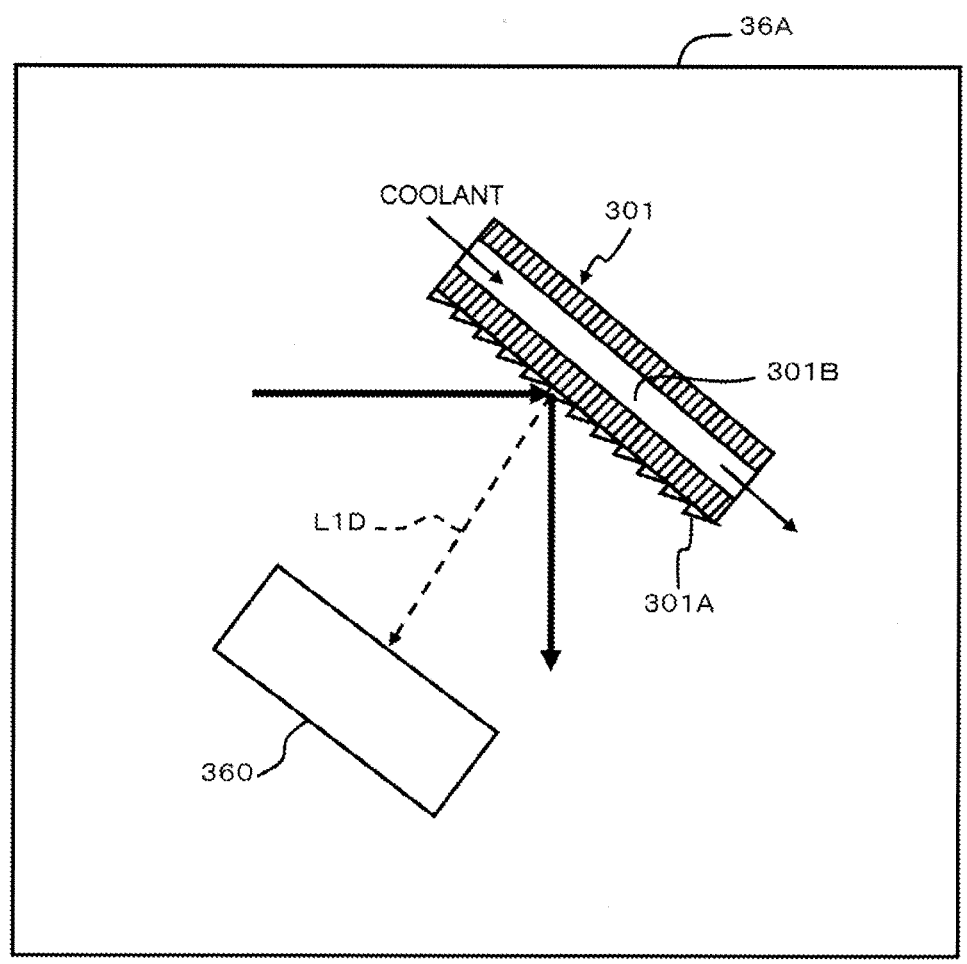
FIG. 35 is a configurational diagram of a sensor according to a nineteenth embodiment.

A nineteenth embodiment will be described referring to FIG. 35. In this embodiment, a sensor 36A is constituted by using a diffraction mirror 301. A grating 301A is formed on the top surface of the diffraction mirror 301. The diffraction mirror 301 is provided with a coolant passage 301B through which a coolant circulates.

The diffraction mirror 301 reflects input laser beam at an angle of 45 degrees. This reflected beam is the 0th order light which has the highest intensity. The negative primary order light acquired by diffraction has a low intensity. The optical sensor unit 360 receives the negative primary order light, and measures the characteristic of the laser beam.

Twentieth Embodiment

Figure 36:
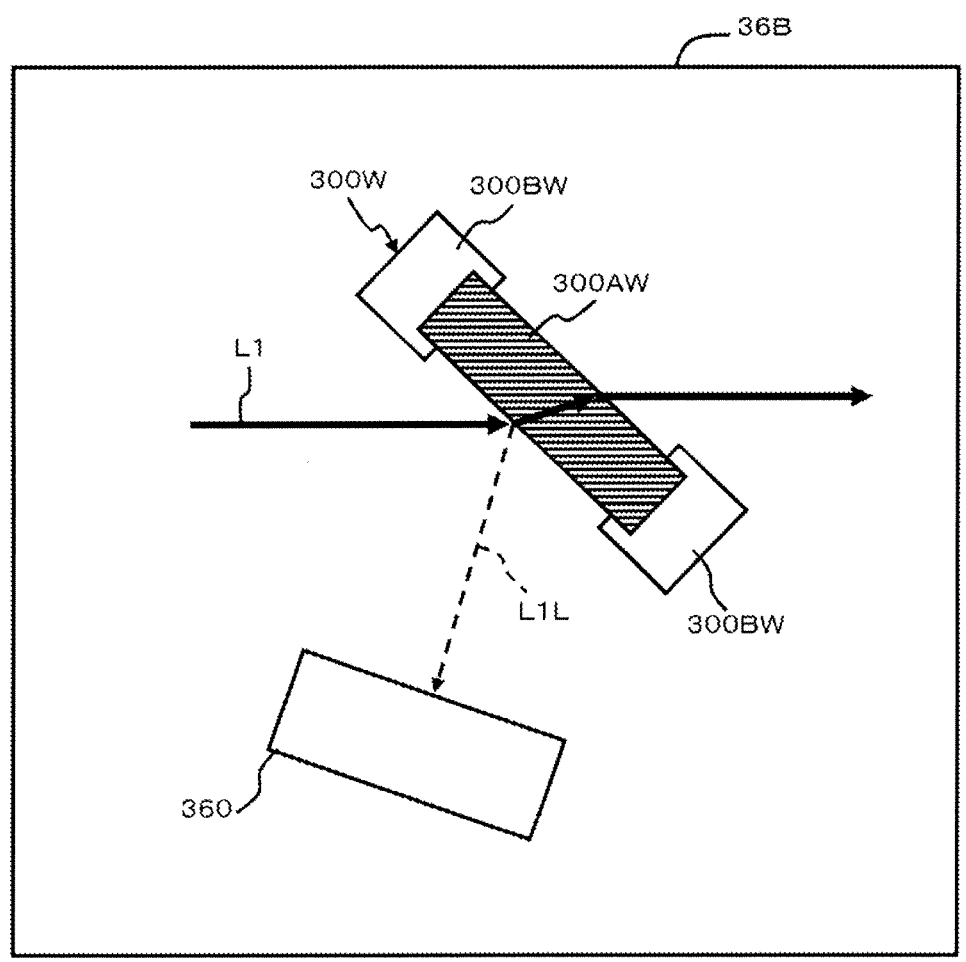
FIG. 36 is a configurational diagram of a sensor according to a twentieth embodiment.

A twentieth embodiment will be described referring to FIG. 36. In this embodiment, a sensor 36B is constituted by using a window 300W. The window 300W has a window substrate 300AW and a holder 300BW for holding the window substrate 300AW. The holder 300BW has an unillustrated water cooling jacket.

The holder 300BW is disposed tilted in the optical axis of laser beam. Slight laser beam reflected at the top surface of the window 300W is input to the optical sensor unit 360 as sample radiation.

As the window 300W, for example, the window of the amplifier 32, 35, or the window 13 of the EUV chamber 10 can be used. In this case, it is unnecessary to provide a window only for the purpose of acquiring sample radiation for measurement, thus reducing the manufacturing cost. The window substrate 300AW is made of a material which, like diamond, passes $CO_2$ laser beam and has high thermal conductivity.

Laser beam is slightly reflected at both the top surface and bottom surface of the plane parallel window 300W, and is input to the optical sensor unit 360 as sample radiation. Therefore, the plane parallel window 300W is not suitable for measuring the beam profile. However, it is possible to focus the sample radiation to the focal position by means of a collector lens to measure the position of the focused image and measure the direction of laser beam. In addition, the duty and power of the laser beam line can be measured adequately.

Twenty-First Embodiment

Figure 37:
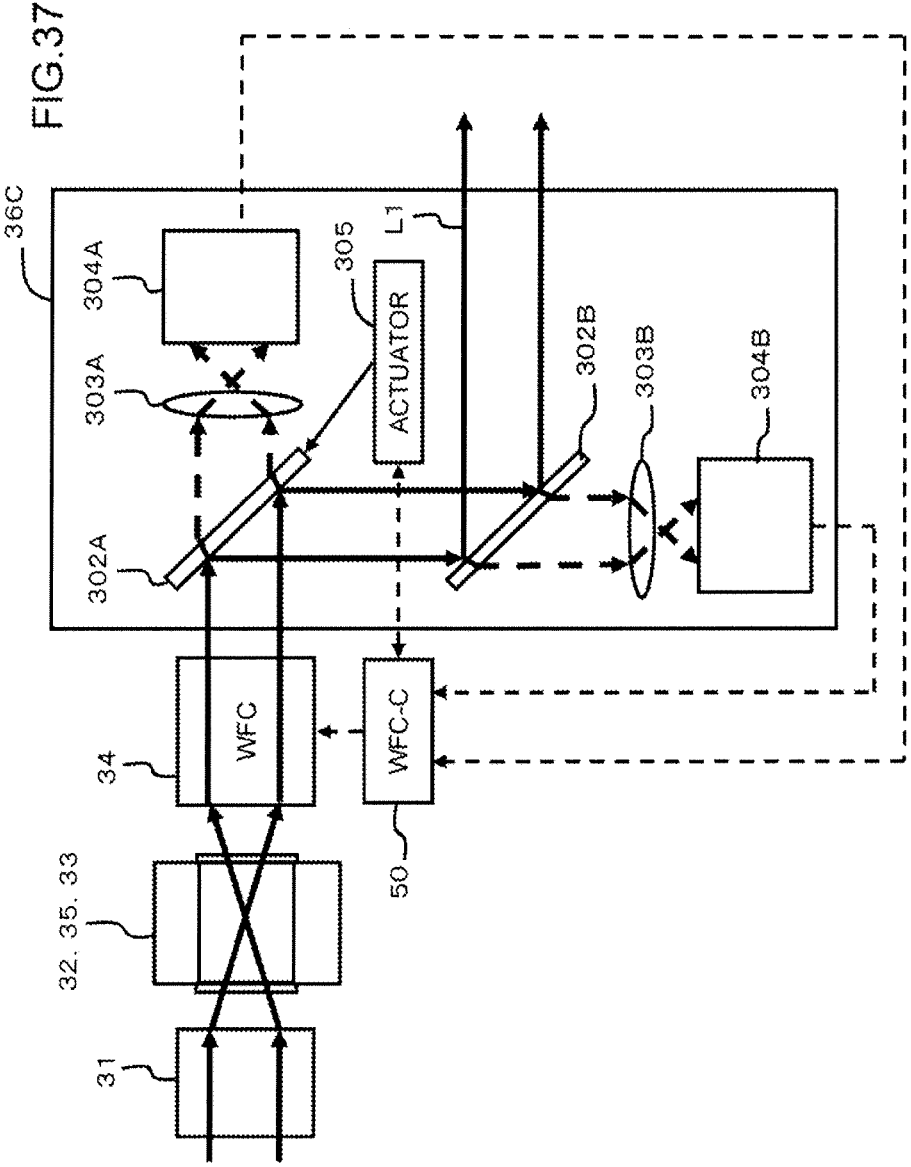
FIG. 37 is a configurational diagram of a sensor according to a twenty-first embodiment.

A twenty-first embodiment will be described referring to FIG. 37. In this embodiment, a sensor 36C is constituted by using beam profilers 304A and 304B. According to the embodiment, beam transmitted through a reflection mirror 302A is detected by the beam profiler 304A, and radiation transmitted through a reflection mirror 302B is detected by the beam profiler 304B. The angle of the reflection mirror 302A is adjusted according to the measurement results from the beam profilers.

A lens 303A is provided between the rear side of the reflection mirror 302A and the beam profiler 304A. Likewise, a lens 303B is provided between the rear side of the reflection mirror 302B and the beam profiler 304B.

As plane-wave laser beam transmits through the relay optical system 31, and transmits through the wave front change generating unit 32, 35, 33, the direction of laser beam and the curvature of the wave front thereof are changed. The laser beam with the changed direction and the changed curvature of the wave front is input to the wave front compensator 34. The wave front compensator 34 compensates the curvature of the wave front and the direction of the laser beam, and outputs resultant laser beam.

The laser beam compensated by the wave front compensator 34 is reflected by the reflection mirror 302A, and is input to the reflection mirror 302B. Meanwhile, a transfer lens 303A transfers sample radiation which has slightly transmitted through the reflection mirror 302A onto the two-dimensional sensor of the beam profiler 304A. The two-dimensional sensor measures the beam shape and position of the laser beam.

The measurement data from the beam profiler 304A is input to the wave front compensation controller 50. The wave front compensation controller 50 transmits a control signal to the wave front compensator 34 to control the wave front compensator 34 so that the position of the laser beam becomes a reference position.

Meanwhile, a transfer lens 303B transfers the radiation which has slightly transmitted through the reflection mirror 302B onto the two-dimensional sensor of the beam profiler 304B. The two-dimensional sensor measures the beam shape and position of the laser beam.

The data measured by the beam profiler 304B is input to the wave front compensation controller 50. The wave front compensation controller 50 sends a control signal to an actuator 305 for adjusting the angle of the reflection mirror 302A, and controls the angle of the reflection mirror 302A so that the position of the laser beam to be measured by the beam profiler 304B becomes a reference position. Further, to control the curvature of the wave front of the laser beam, the wave front compensation controller 50 sends a control signal to the WFC 34 so that the beam shape of the laser beam has a predetermined value.

According to the embodiment with this configuration, the beam profiler 304A, 304B is disposed on that side (rear side of the reflection mirror) where laser beam transmits through the reflection mirror 302A, 302B, the sensor 36C can be configured compact. Further, it is possible to suppress the influence of a measurement optical system shown in FIG. 37 on the wave front of the driver laser beam.

Twenty-Second Embodiment

Figure 38:
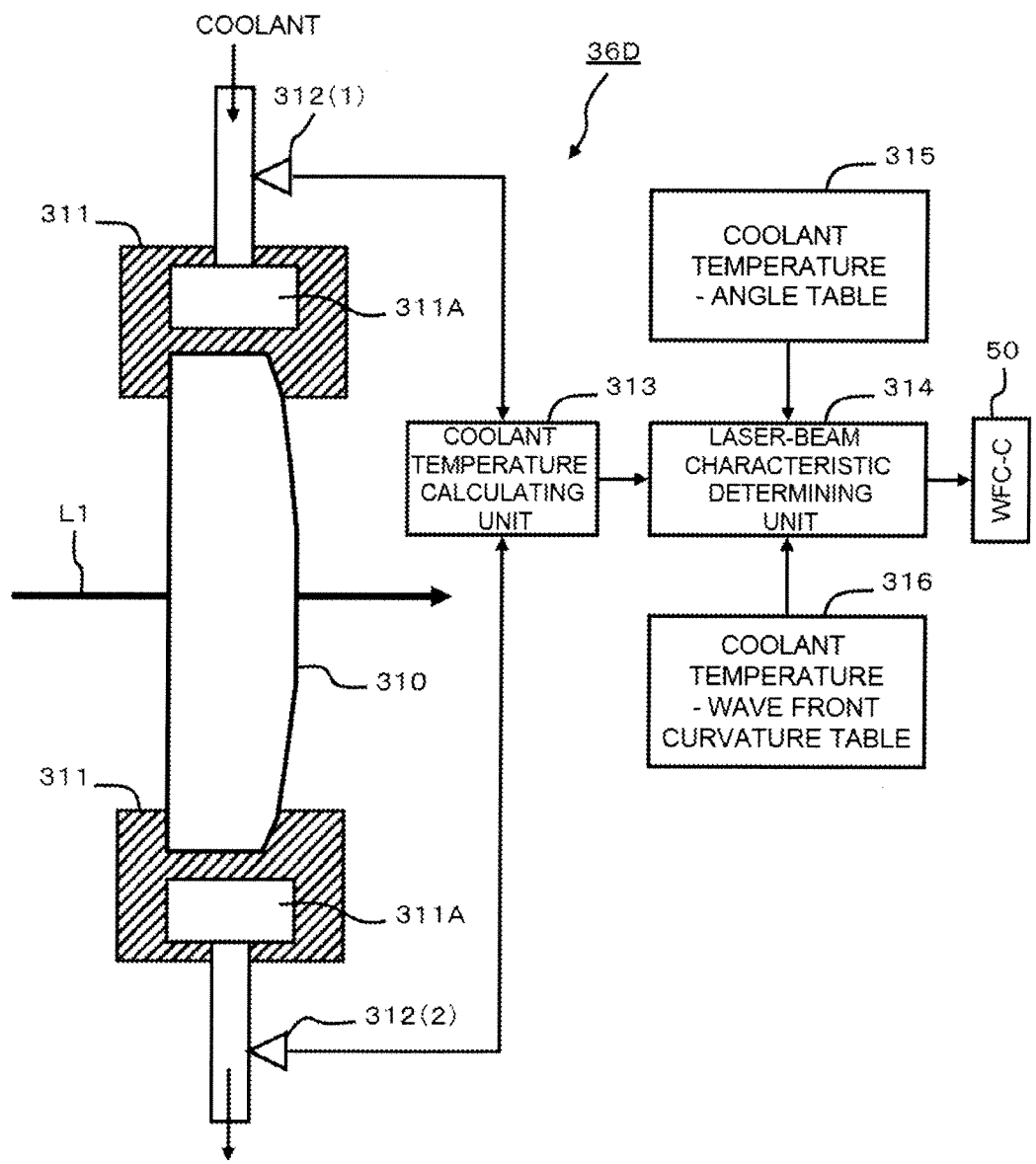
FIG. 38 is a configurational diagram of a sensor according to a twenty-second embodiment.

A twenty-second embodiment will be described referring to FIG. 38. In this embodiment, changes in the direction of laser beam and the curvature of the wave front thereof are predicted based on a temperature change in the optical element through which the laser beam transmits.

A measurement optical system 310 is a window or lens, or a mirror through which laser beam transmits. The measurement optical system 310 is mounted to a holder 311. The holder 311 is provided with a passage 311A through which a coolant flows.

A temperature sensor 312(1), such as a platinum resistance thermometer sensor or a thermistor, is provided on the coolant flow-in side. The temperature sensor 312(1) detects the temperature of the coolant and outputs a detection signal. A temperature sensor 312(2) is likewise provided on the coolant downstream side.

A coolant temperature calculating unit 313 calculates the difference between the coolant temperature on the upstream side and the coolant temperature on the downstream side, and outputs the difference to a laser beam characteristic determining unit 314. The temperature difference is proportional to a heat quantity Q used to cool the measurement optical system 310 if the flow rate of the coolant is constant.

The laser beam characteristic determining unit 314 predicts the direction of laser beam which transmits through the measurement optical system 310, and the curvature of the wave front using a table 315 showing the relation between the coolant temperature and the direction of laser beam and a table 316 showing the relation between the coolant temperature and the curvature of the wave front. The prediction result is input to the wave front compensation controller 50.

The table 315 is generated by measuring a temperature-difference originated change in the direction of laser beam beforehand, for example, empirically or through simulation. The table 316 is likewise generated by measuring a temperature-difference originated change in the curvature of the wave front beforehand, for example, empirically or through simulation.

According to the embodiment, a temperature change in the measurement optical system 310 is detected as a difference in coolant temperature, a change in the wave front of laser beam (angle (direction) and curvature of the wave front) can be predicted easily. The configuration may be modified so that a temperature change in the measurement optical system 310 is measured directly by using a radiation thermometer.

Twenty-Third Embodiment

Figure 39:
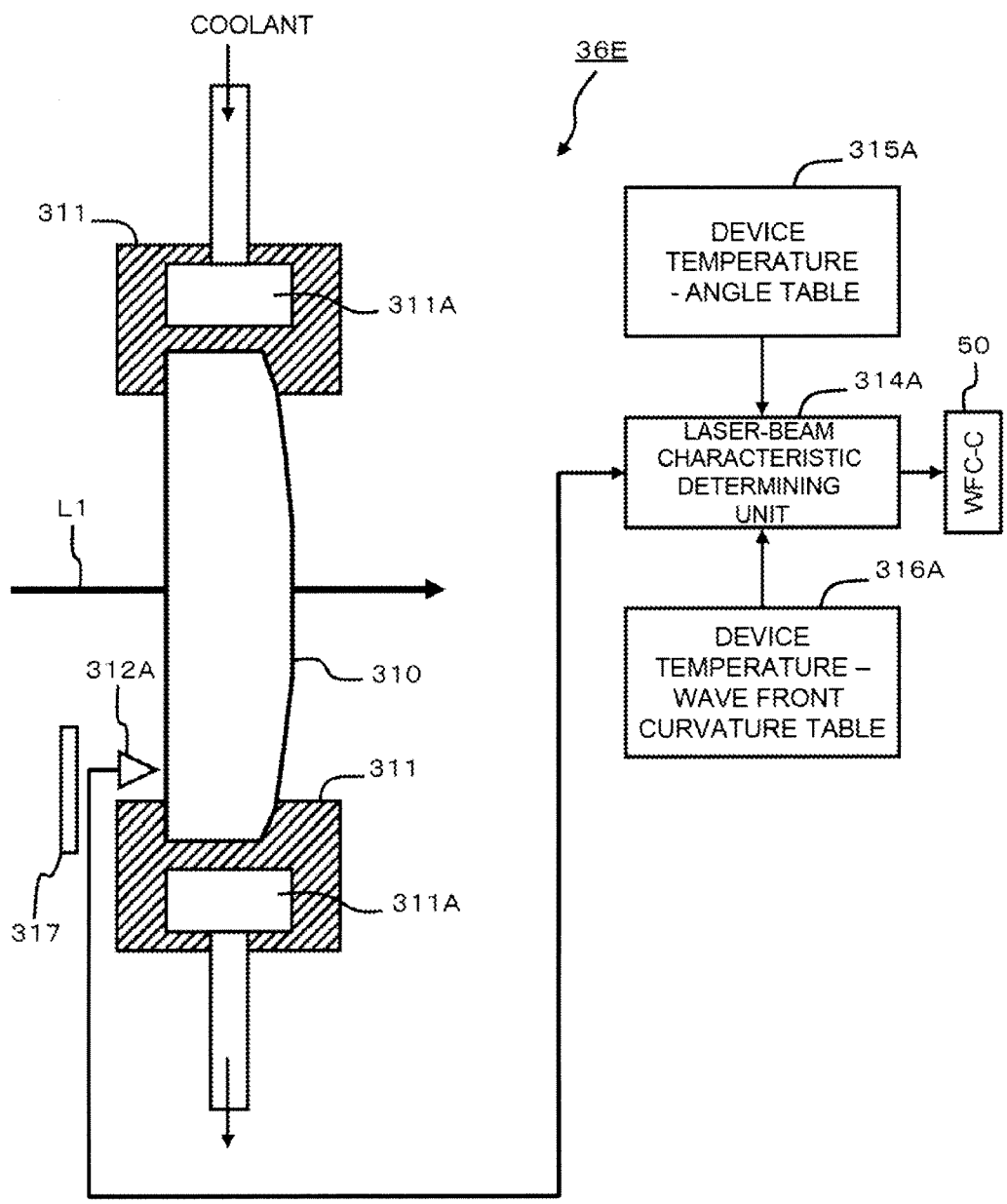
FIG. 39 is a configurational diagram of a sensor according to a twenty-third embodiment.

A twenty-third embodiment will be described referring to FIG. 39. In this embodiment, the temperature of the measurement optical system 310 is detected directly by a temperature sensor 312A. The temperature sensor 312A is covered with a light shielding plate 317 for protection against laser beam.

Based on the temperature detected by the temperature sensor 312A, a laser beam characteristic determining unit 314A predicts a change in the direction of laser beam which transmits through the measurement optical system 310 and a change in the curvature of the wave front by referring to tables 315A and 316A.

The relation between the temperature of the measurement optical system 310 and the direction of laser beam is preset in the table 315A through, for example, empirically or through simulation. Likewise, the relation between the temperature of the measurement optical system 310 and the curvature of the wave front of laser beam is preset in the table 316A, for example, empirically or through simulation.

Twenty-Fourth Embodiment

Figure 40:
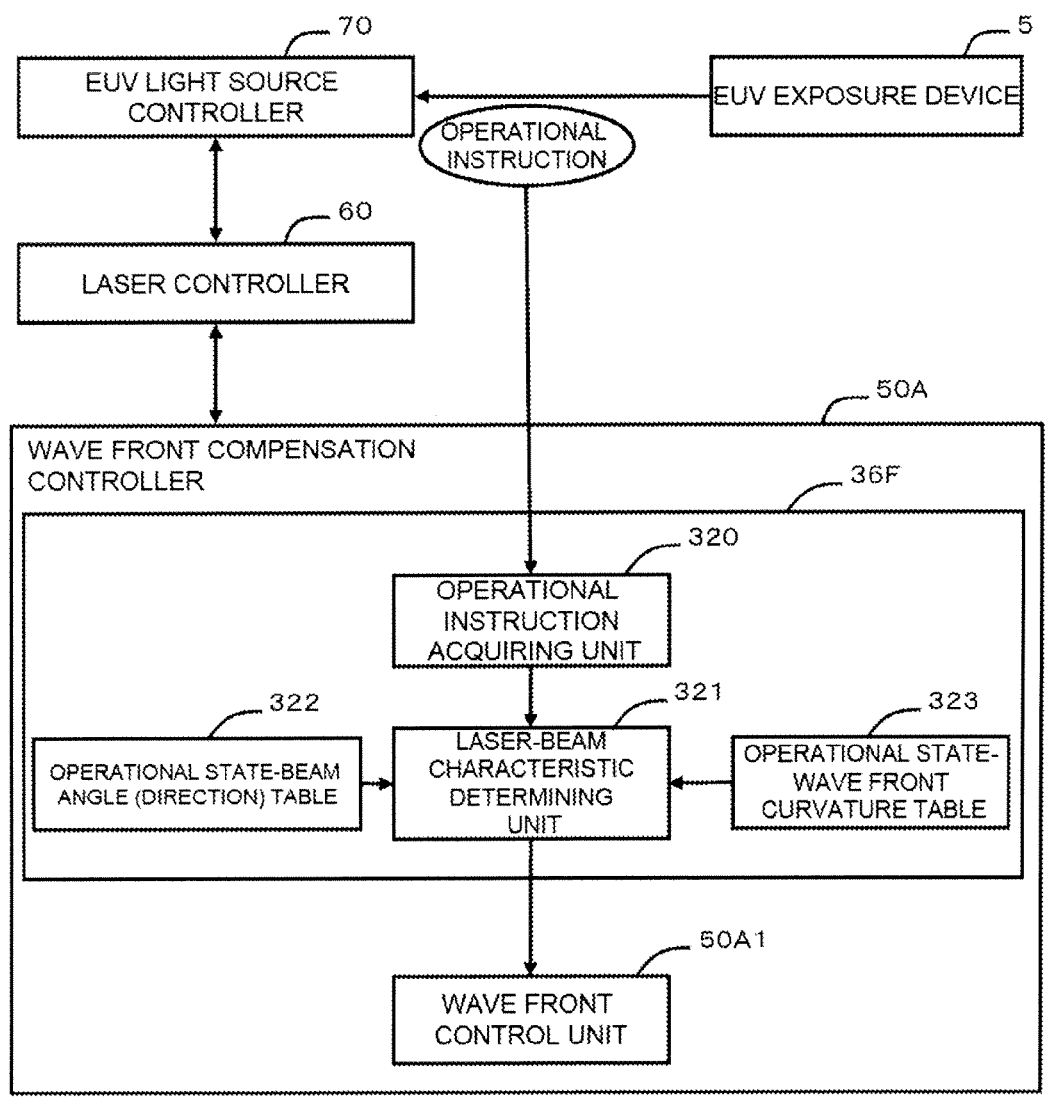
FIG. 40 is a block diagram of a wave front compensation controller according to a twenty-fourth embodiment.

A twenty-fourth embodiment will be described referring to FIG. 40. In this embodiment, based on an operational instruction from the EUV exposure device 5, the influence of the thermal load which is generated by driver laser beam is predicted, and wave front compensation is carried out in such a way as to cancel the predicted influence of the thermal load.

The EUV exposure device 5 gives the operational instruction to the EUV light source controller 70. The operational instruction includes, for example, pulse energy Eeuv of EUV radiation and the repeating frequency f (or external trigger signal). The EUV light source controller 70 outputs a control signal to the laser controller 60 to supply EUV radiation demanded by the EUV exposure device 5.

Suppose that, for example, the EUV energy Eeuv and driver laser energy Eco2 satisfies a proportional relation Eco2=K·Eeuv. (It is however preferable that because the relation is actually non-linear, the relation between Eeuv and Eco2 should be acquired empirically and stored in a table.) If the assumption is fulfilled, the thermal load Wlaser of driver laser beam can be expressed by Wlaser=duty·K·Eeuv·f.

A wave front compensation controller 50A has a predicting unit 36F and a wave front control unit 50A1. The predicting unit 36F predicts a change in the wave front of laser beam in place of the sensor 36. The wave front control unit 50A1 controls the wave front compensator 34 based on the predicted wave front change.

The predicting unit 36F includes, for example, an operational instruction acquiring unit 320 which acquires an operational instruction, a laser beam characteristic determining unit 321, a table 322 showing the relation between the operational state and the direction of laser beam, and a table 323 showing the relation between the operational state and the curvature of the wave front of laser beam.

Based on the operational instruction from the EUV exposure device 5, the laser beam characteristic determining unit 321 predicts a change in the wave front of laser beam by referring the tables 322, 323. The wave front control unit 50A1 controls the wave front compensator 34 in such a way as to cancel the predicted wave front change.

Twenty-Fifth Embodiment

Figure 41:
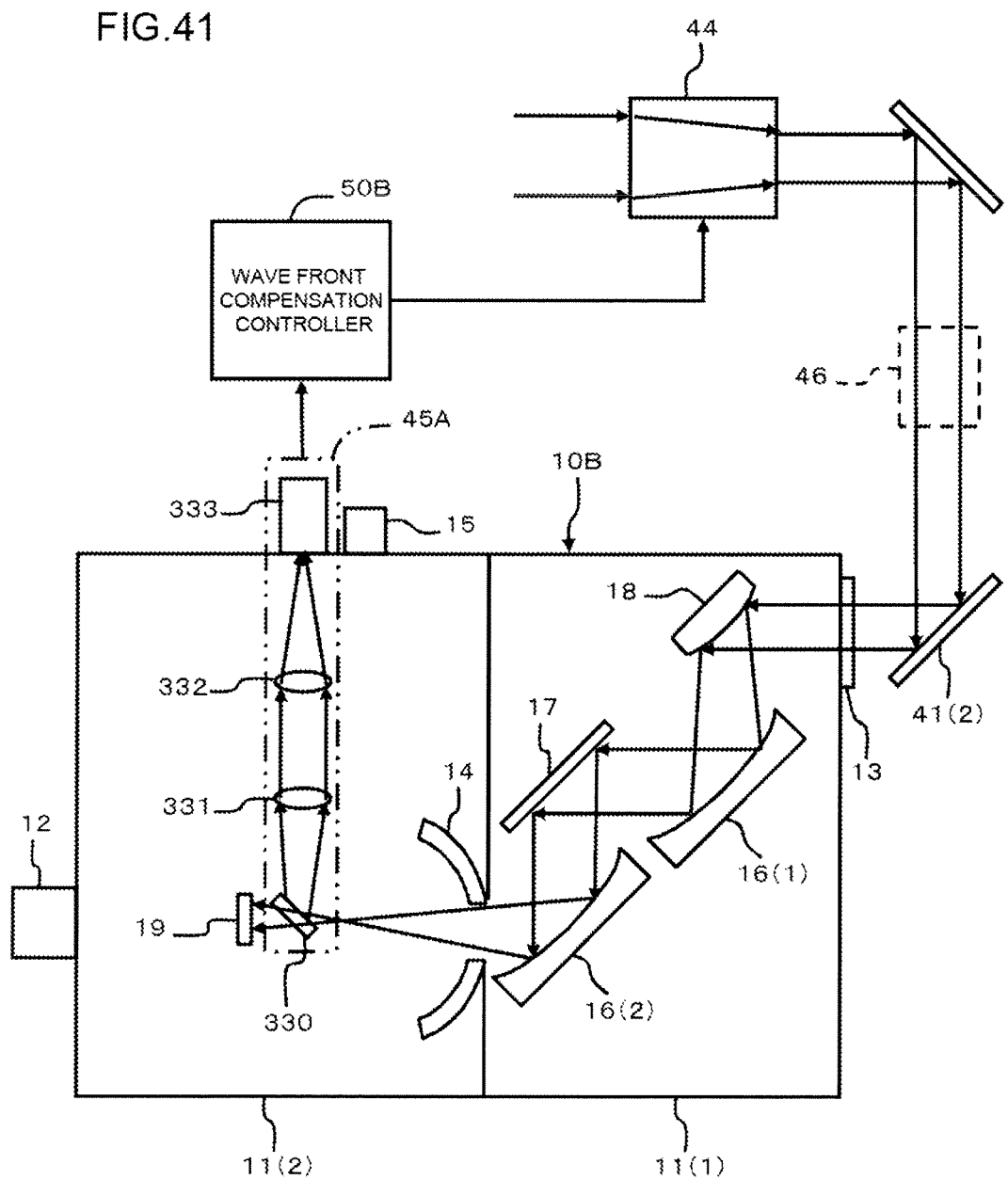
FIG. 41 is an explanatory diagram showing the essential portions of a chamber to a twenty-fifth embodiment.

A twenty-fifth embodiment will be described referring to FIG. 41. In this embodiment, the actual image of the focused driver laser beam in an EUV chamber 10B is measured to control the wave front compensator 44.

A sensor 45A is provided at the EUV emission area 11(2) of the chamber 10B. The sensor 45A includes, for example, a beam splitter 330, transfer lenses 331 and 332, and an imaging unit 333. The imaging unit 333 is constituted by, for example, a CCD (Charge Coupled Device) for infrared.

The beam splitter 330 reflects a part of driver laser beam, focused at a predetermined position, toward the transfer lenses 331, 332. The remaining part of the driver laser beam is absorbed and turned into heat by a dumper 19.

A wave front compensation controller 50B outputs a convergence unit to the wave front compensator 44 in such a way that the shape and position of the laser beam focused in the chamber 10B become a predetermined shape and a predetermined position.

The configuration may be modified so that the wave front of driver laser beam is compensated by adjusting the position and posture of each mirror 16(1), 16(2), 17, 18 in the focusing area 11(1), not by the wave front compensator 44.

According to the embodiment, because the final focusing result of driver laser beam is measured to control the wave front of the driver laser beam, the focusing characteristic can be made stable with high accuracy.

Twenty-Sixth Embodiment

A twenty-sixth embodiment will be described referring to FIG. 42. In this embodiment, a Shack-Hartmann sensor is used as an optical sensor unit 360A. The Shack-Hartmann sensor 360A includes, for example, a microlens array 361 having multiple microlenses, and an imaging device 362, such as CCD for infrared.

A majority of laser beam is reflected by the reflection mirror 300. Laser beam which slightly transmits through the reflection mirror 300 is input to the microlens array 361. Images at the focusing points of the individual microlenses are measured by the imaging device 362. The wave front of laser beam can be measured by analyzing the positions of the focusing points of the individual microlenses.

According to the embodiment, the deformation and angle (direction) of the wave front of laser beam can be measured at the same time. A pin hole array, a Fresnel lens array or the like may be used instead of the microlens array.

Twenty-Seventh Embodiment

A twenty-seventh embodiment will be described referring to FIGS. 43 and 44A to 44C. In this embodiment, the characteristic of laser beam is measured based on the interference fringes acquired by a wedge substrate 363. An optical sensor unit 360B includes the wedge substrate 363 and an infrared sensor 364. The wedge substrate 363 allows carbon dioxide gas laser beam to transmit therethrough.

A majority of laser beam is reflected by the reflection mirror 300. Laser beam which slightly transmits through the reflection mirror 300 is input to the wedge substrate 363, and is reflected at both of the front surface and rear surface of the wedge substrate 363.

Figure 44:
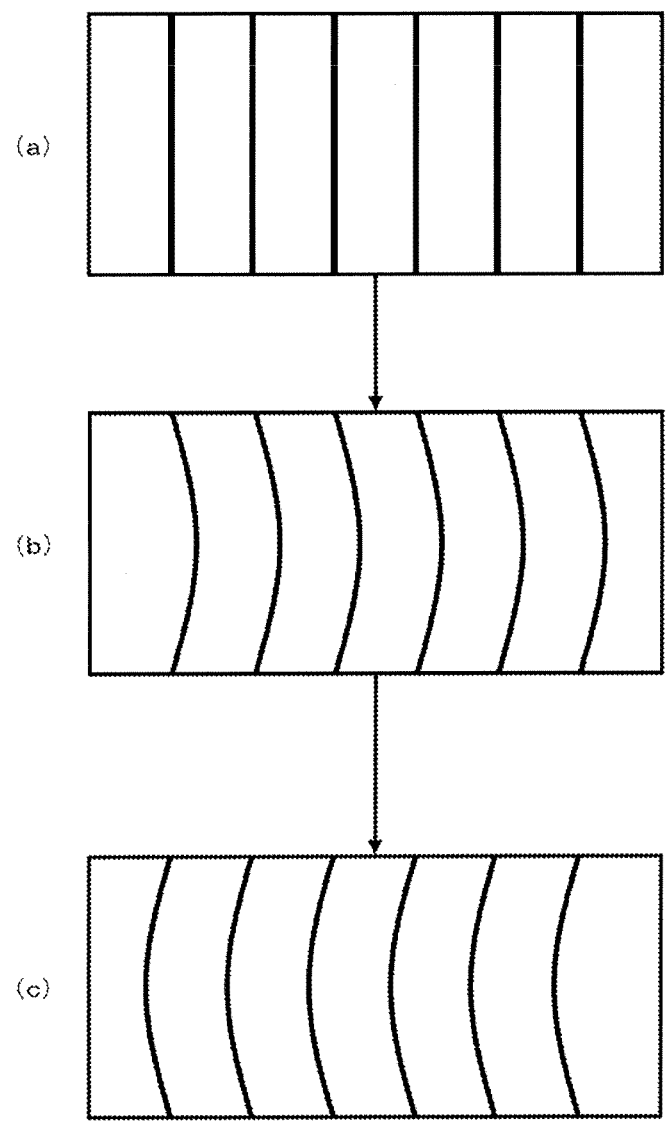
FIGS. 44A to 44C are explanatory diagrams showing interference fringes.

Interference fringes are produced by overlapping the laser beam reflected at the front surface and rear surface of the wedge substrate 363 at a predetermined angle. FIG. 44A shows interference fringes when laser beam input to the wedge substrate 363 is a plane wave. FIG. 44B shows interference fringes when laser beam input to the wedge substrate 363 is a convex wave. FIG. 44C shows interference fringes when laser beam input to the wedge substrate 363 is a concave wave.

The interference fringes acquired by the wedge substrate 363 are detected by the infrared sensor 364. A change in the wave front of the laser beam can be detected based on how the interference fringes are curved. Further, the direction of the laser beam can be detected based on the flow direction of the interference fringes.

According to the embodiment, the deformation and direction of laser beam can be measured at the same time. It is noted that it is difficult to expect the high accuracy as provided by the Shack-Hartmann sensor. A beam profile, beam pointing, energy meter or the like may be used instead of the infrared sensor 364.

Twenty-Eighth Embodiment

A twenty-eighth embodiment will be described referring to FIG. 45. An optical sensor unit 360C in this embodiment measures a beam profile and beam pointing.

Laser beam which has transmitted through the reflection mirror 300 is separated into reflected radiation and transmitted radiation by a beam splitter 363A. The transmitted radiation is focused onto a two-dimensional infrared sensor 366(1) by a focusing lens 365(1) to measure the focusing performance and direction (pointing state). The reflected beam is transferred onto a two-dimensional infrared sensor 366(2) to form an image thereon by a transfer lens 365(2) to measure the beam profile.

Twenty-Ninth Embodiment

A twenty-ninth embodiment will be described referring to FIGS. 46, 47 and 48A to 48C. In this embodiment, an optical sensor unit 360D is constituted by using a cylindrical lens 367 having a cylindrical convex surface, a cylindrical lens 368 having a cylindrical convex surface, and a quadrant light receiving element 369. The buses of both cylindrical lenses are arranged orthogonal to each other. The definition of "bus" will be given later.

Figure 47:
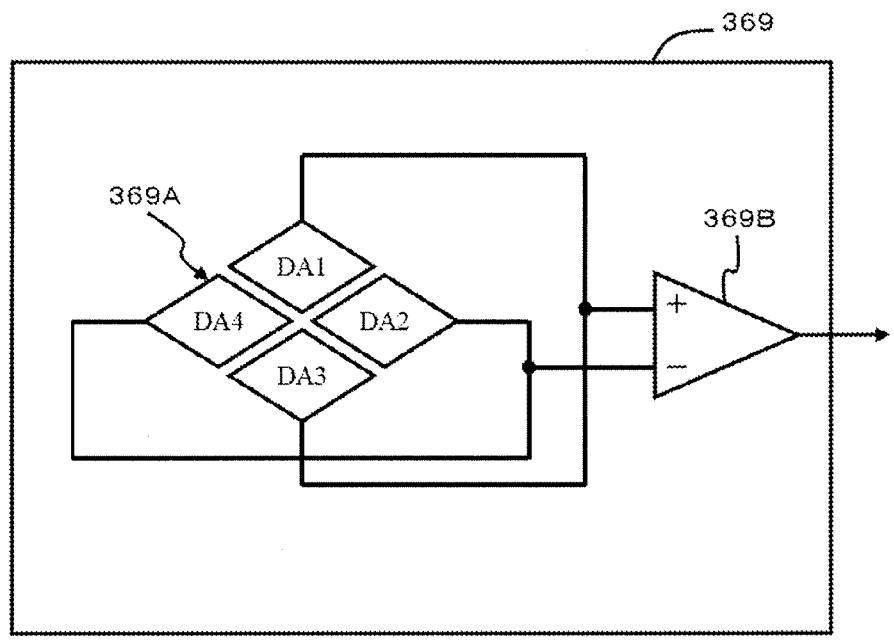
FIG. 47 is a configurational diagram of a light receiving element.

As shown in FIG. 47, a light receiving surface 369A of the light receiving element 369 is separated into four diamond-shaped areas DA1 to DA4. The outputs of the upper and lower light receiving surfaces DA1 and DA3 are compared with the outputs of the right and left light receiving surfaces DA2 and DA4, arranged orthogonal to the light receiving surfaces DA1 and DA3, by an operational amplifier 369B, and the comparison result is output.

Figure 48:
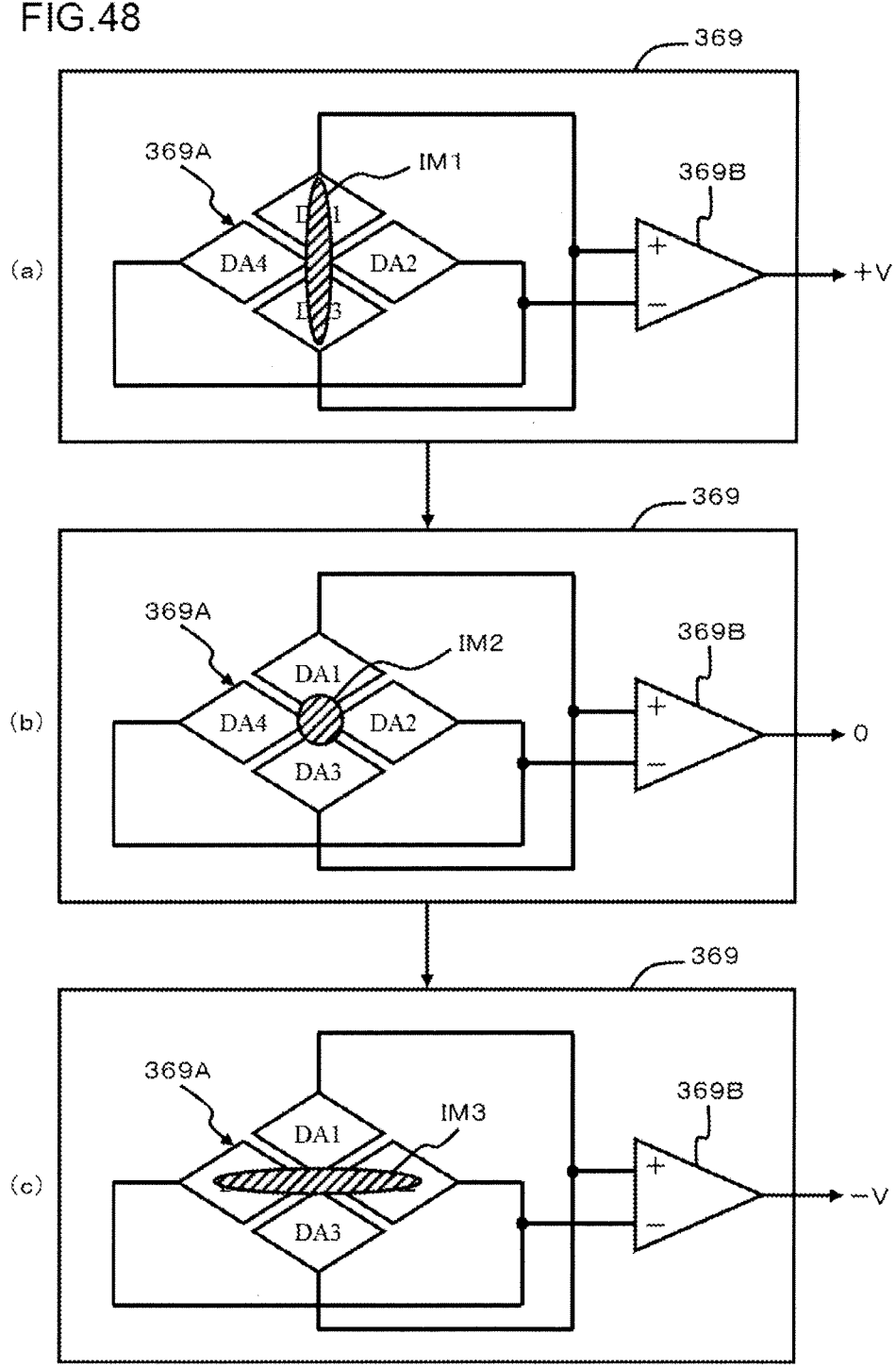
FIGS. 48A to 48C are explanatory diagrams showing the relationship between the beam shape of laser beam and the output of the light receiving element.

When convex-wave laser beam transmits through the lenses 367, 368, as shown in FIG. 48A, it becomes laser beam elongated in the vertical direction, which is input to the light receiving element 369. The light receiving element 369 outputs a positive voltage.

When concave-wave laser beam transmits through the lenses 367, 368, as shown in FIG. 48C, it becomes laser beam elongated in the horizontal direction, which is input to the light receiving element 369. The light receiving element 369 outputs a negative voltage.

When plane-wave laser beam transmits through the lenses 367, 368, as shown in FIG. 48B, it becomes approximately circular laser beam, which is input to the light receiving element 369. The output of the light receiving element 369 becomes 0. A two-dimensional sensor may be used instead of the light receiving element 369.

Thirtieth Embodiment

A thirtieth embodiment will be described referring to FIGS. 49A, 49B, 50A, 50B, 51A and 51B. An optical sensor unit 360E in this embodiment has two cylindrical lenses 368(1) and 368(2) having the same focal distances disposed on the optical axis of laser beam with their buses being orthogonal to each other. The "bus" of the cylindrical lens is a line connecting the vertexes of a convex surface. Each cylindrical lens 368(1), 368(2) is constituted as a cylindrical lens having a cylindrical convex surface.

A light receiving element is disposed at an intermediate position D between the focal distance, F1, of the cylindrical lens 368(1) and the focal distance, F2, of the cylindrical lens 368(2). As the light receiving element, the quadrant light receiving element shown in FIG. 47, a two-dimensional imaging device or the like can be used. Hereinafter, the position D where the light receiving element is disposed is called "sensor position D".

Figure 49:
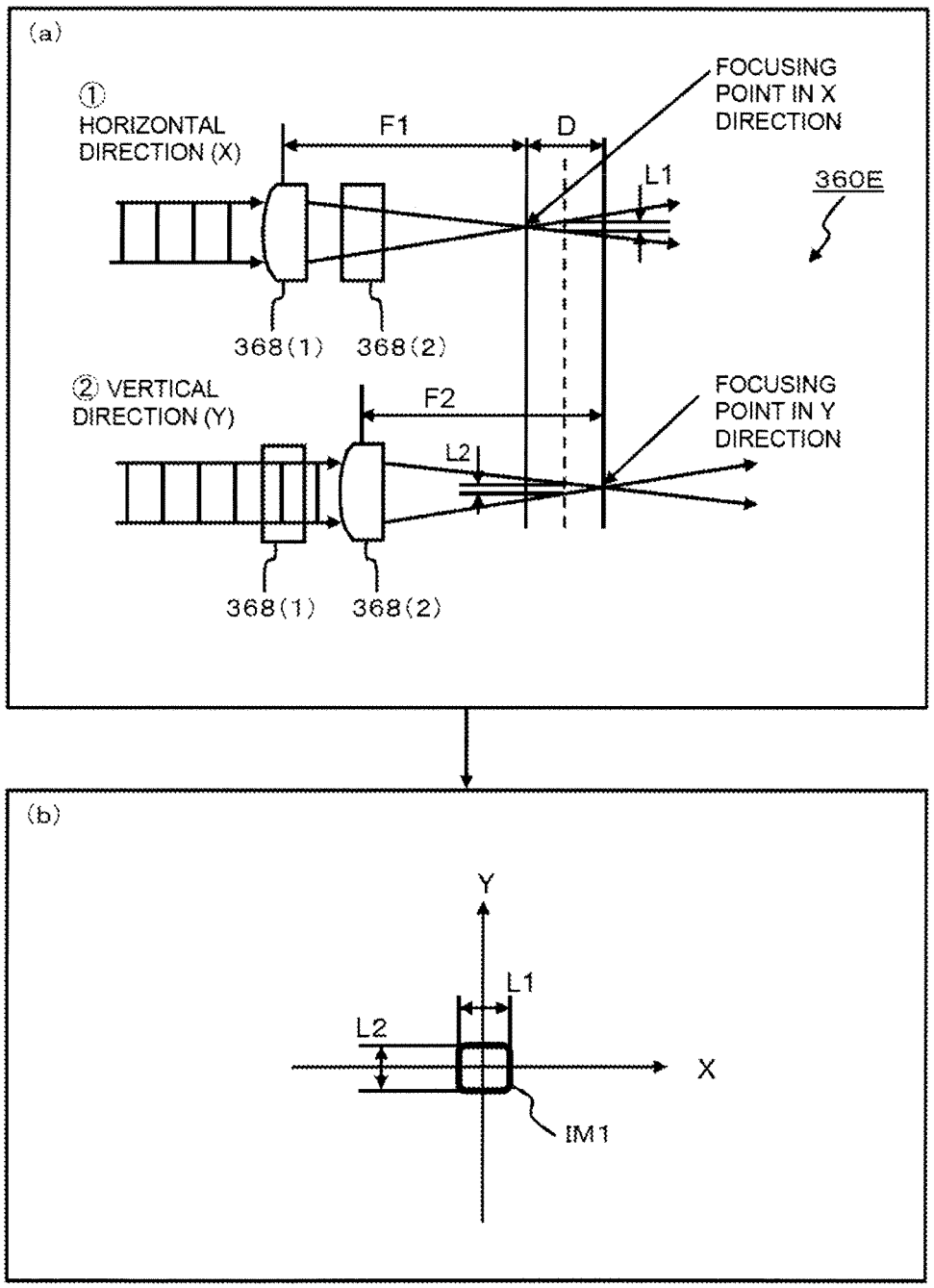
FIGS. 49A and 49B are explanatory diagrams of an optical sensor unit according to a thirtieth embodiment.

FIG. 49A shows the focused states of laser beam as seen from the horizontal direction (X) and the vertical direction (Y) when plane-wave laser beam has transmitted through the two cylindrical lenses 368(1), 368(2).

The upper side of FIG. 49A shows the state of laser beam when the bus of the first cylindrical lens 368(1) is perpendicular to the horizontal direction (X), and the bus of the second cylindrical lens 368(2) is in parallel to the horizontal direction (X). In this case, with regard to the X direction, the first cylindrical lens 368(1) serves as a convex lens, and the second cylindrical lens 368(2) serves as a window.

Therefore, at the focal position F1 of the cylindrical lens 368(1), laser beam is focused in a line parallel to the direction perpendicularly orthogonal to the X direction, and then spreads as diverging beam. At the sensor position D indicated by the broken line, the laser beam spreads in parallel to the X axis to a given length L1.

The lower side of FIG. 49A shows the state of laser beam when the bus of the first cylindrical lens 368(1) is in parallel to the vertical direction (Y), and the bus of the second cylindrical lens 368(2) is perpendicular to the vertical direction (Y). In this case, with regard to the Y direction, the first cylindrical lens 368(1) serves as a window, and the second cylindrical lens 368(2) serves as a convex lens.

Therefore, at the focal position F2 of the cylindrical lens 368(2), laser beam is focused in a line parallel to the direction orthogonal to the Y direction. Because the sensor position D is located before the focal position F2, laser beam having a given length L2 parallel to the Y axis is detected.

FIG. 49B shows a shape IM1 of laser beam on the XY plane, which is to be measured at the sensor position D. The cross-sectional shape IM1 of the laser beam on the XY plane is an approximately rectangular shape having a width L1 in the X direction and a width L2 in the Y direction. When the sensor position D is set in the center of each cylindrical lens 368(1), 368(2) with F1=F2 set, the cross-sectional shape IM1 of the laser beam becomes a square with L1=L2.

Figure 50:
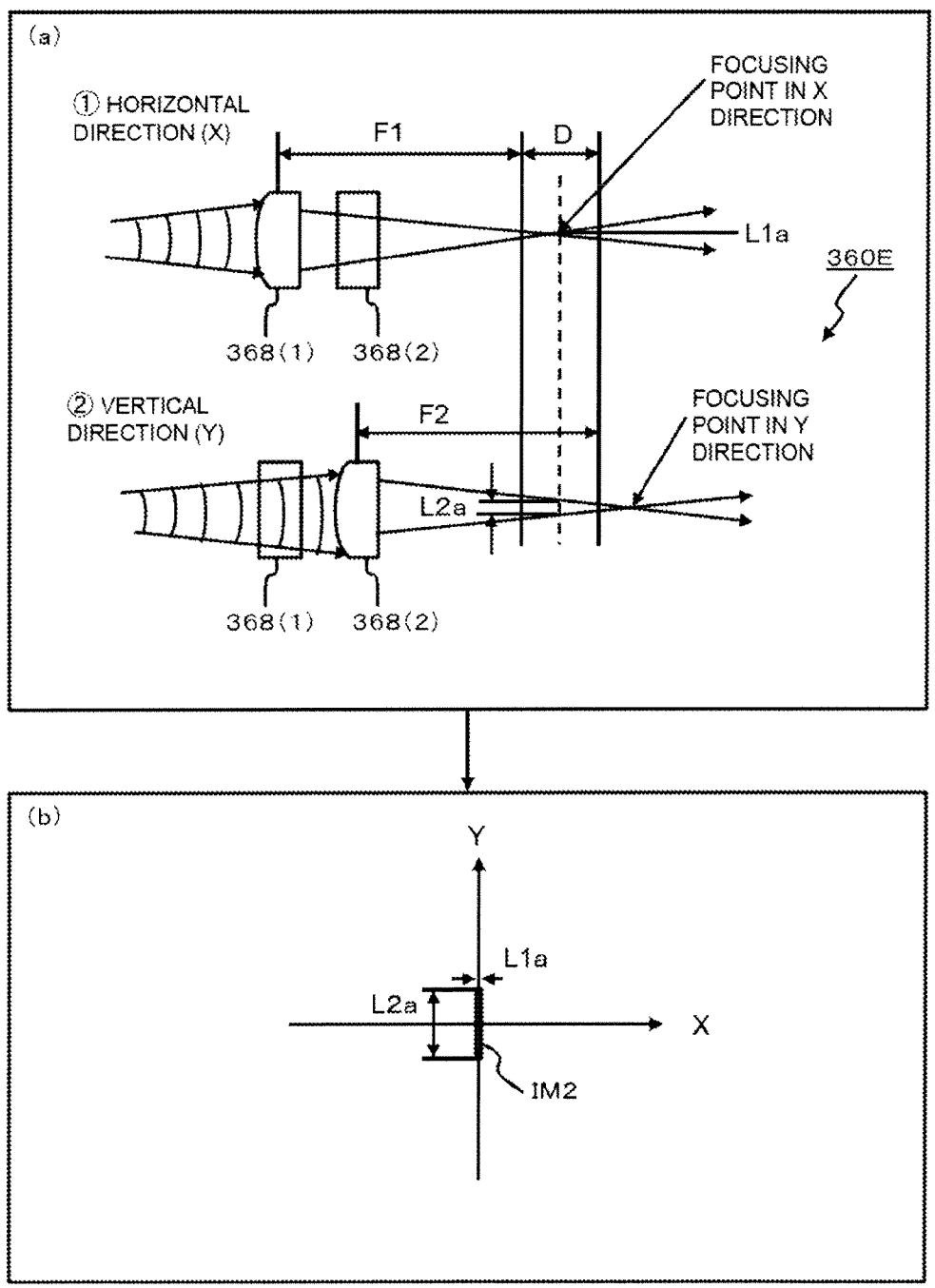
FIGS. 50A and 50B are explanatory diagrams which are a continuation of FIGS. 49A and 49B.

FIGS. 50A and 50B show the focused states of laser beam when convex-wave laser beam has transmitted through the two cylindrical lenses 368(1), 368(2). The upper side of FIG. 50A corresponds to the upper side of FIG. 49A. The lower side of FIG. 50A corresponds to the lower side of FIG. 49A. Likewise, the upper side and lower side of FIG. 51A respectively correspond to the upper side and lower side of FIG. 49A.

As shown on the upper side of FIG. 50A, the convex-wave laser beam is focused in a line at a position (right side in FIG. 50A) slightly farther than the focal position F1 of the cylindrical lens 368(1) in parallel to the direction orthogonal to the X direction. The laser beam spreads as diverging beam. At the sensor position D, the laser beam spreads to a given length L1a parallel to the X axis.

As shown on the lower side of FIG. 50A, the convex-wave laser beam is focused in a line at a position farther than the focal position F2 of the cylindrical lens 368(2) in parallel to the direction orthogonal to the Y direction. Because the sensor position D is located before the focusing point, laser beam has a given length L2a parallel to the Y axis.

FIG. 50B shows a shape IM2 of convex-wave laser beam on the XY plane. The shape IM2 of the laser beam is rectangular having a width L1a in the X direction and a width L2a in the Y direction and elongated in the Y direction.

Figure 51:
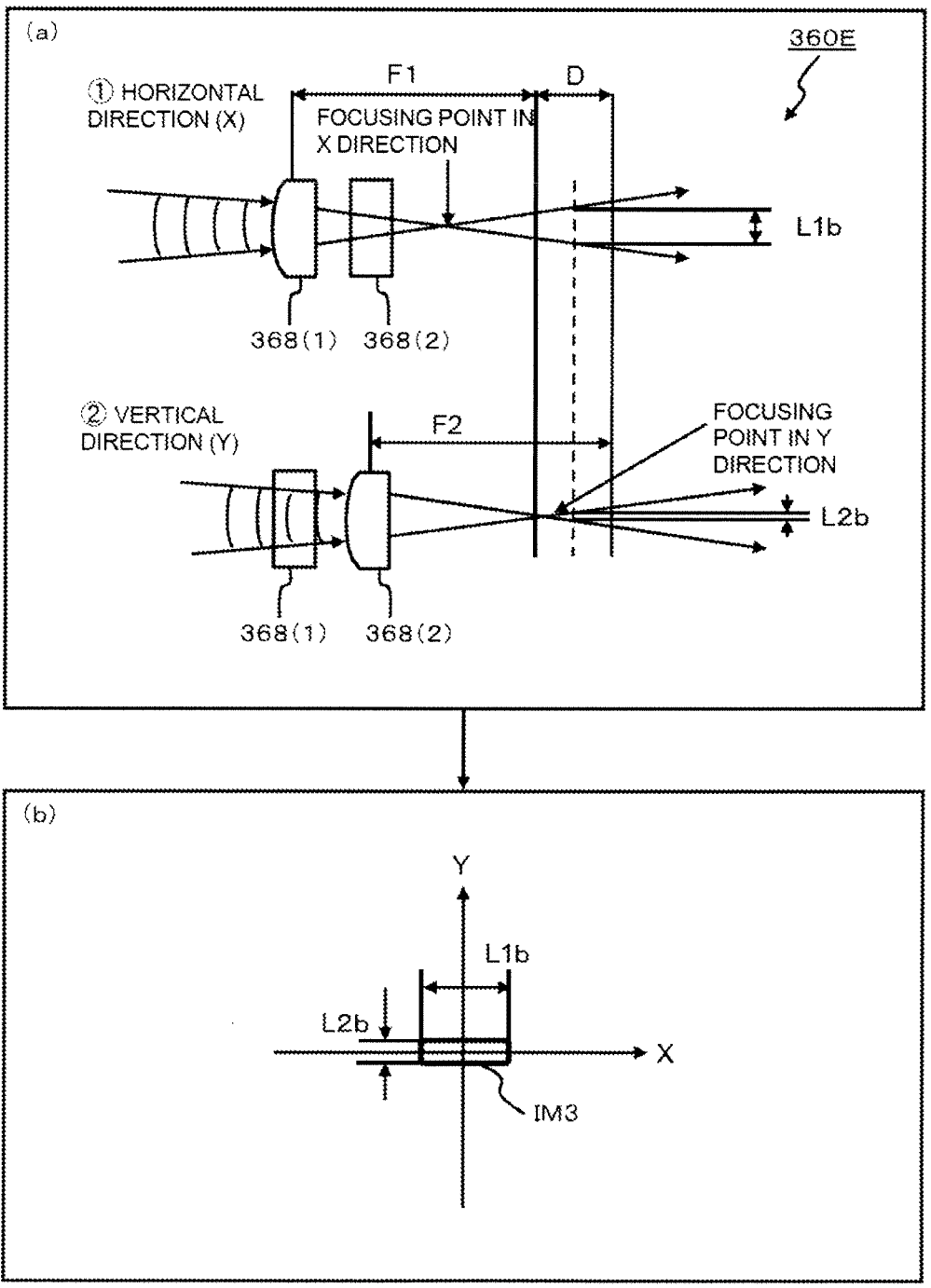
FIGS. 51A and 51B are explanatory diagrams which are a continuation of FIGS. 50A and 50B.

FIGS. 51A and 51B show the focused states of laser beam when concave-wave laser beam has transmitted through the cylindrical lenses 368(1), 368(2). As shown on the upper side of FIG. 51A, the laser beam is focused in a line at a position before the focal position F1 of the cylindrical lens 368(1) in parallel to the direction orthogonal to the X direction. The focused laser beam then spreads as diverging beam. At the sensor position D, the laser beam has a given length L1b parallel to the X axis.

As shown on the lower side of FIG. 51A, the laser beam is focused in a line at a position before the focal position F2 of the cylindrical lens 368(2) in parallel to the direction orthogonal to the Y direction. Because the sensor position D is located before the focusing point, laser beam has a given length L2b parallel to the Y axis.

FIG. 51B shows a shape IM3 of concave-wave laser beam on the XY plane. The shape IM3 of the laser beam is rectangular having a width L1b in the X direction and a width L2b in the Y direction and elongated in the Y direction.

Thirty-First Embodiment

Figure 52:
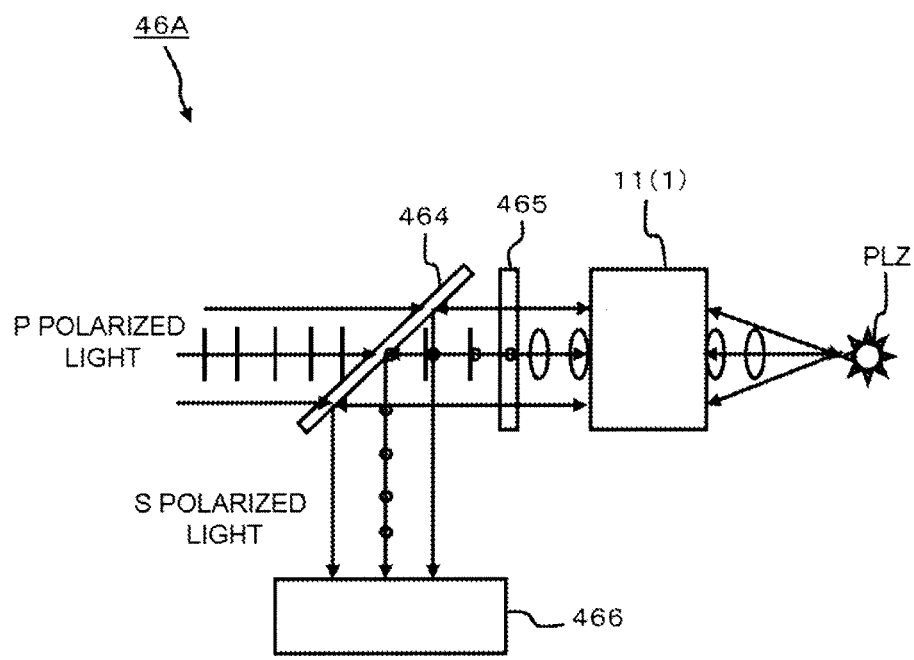
FIG. 52 is a configurational diagram of an isolator according to a thirty-first embodiment.

A thirty-first embodiment will be described referring to FIG. 52. This embodiment illustrates another example (46A) of a polarization splitting isolator.

Laser beam is input in the form of P polarized light to a beam splitter 464 for separating P polarized light and S polarized light from each other. The beam splitter 464 passes the P polarized light and reflects the S polarized light. The laser beam which has transmitted the beam splitter 464 transmits through a λ/4 plate 465 to be converted to circularly polarized light.

The laser beam is focused and irradiated on droplets via the optical system in the focusing area 11(1) which focuses the laser beam. A part of the laser beam returns in the form of circularly polarized light on the same optical path and enters the λ/4 plate 465 again. As the laser beam passes through the λ/4 plate 465, it is converted to S polarized light. Therefore, the S polarized laser beam is reflected by the beam splitter 464 and is absorbed by a dumper 466.

The invention is not limited to the foregoing individual embodiments. It is noted that those skilled in the art can made various additions, modifications and so forth within the scope of the invention. It is noted that configurations achieved by combining the foregoing embodiments are included within the scope of the invention.

A driver laser system which supplies laser beam to the EUV exposure device includes a "driver laser beam line" and a "beam delivery and focusing optical system". The "driver laser beam line" is the mechanism that compensates the wave front of a beam line from the driver laser oscillator 20 to the main amplifier 35 at the last stage. The "beam delivery and focusing optical system" is the mechanism that delivers driver laser beam to the window of the EUV chamber, and irradiates the laser beam on a target material, such as droplets, by means of the focusing optical system.

Changes in the wave front which occur in the "driver laser beam line" are classified into a wave front change caused as the laser beam transmits through the amplifiers 32, 35, and a wave front change caused when the laser beam transmits through the SA 33. It is noted that the focusing performance of the focusing optical system is changed as various optical elements, such as the reflection mirror, isolator and EUV window, are deformed by heat.

FIG. 53 shows an example for compensating a wave front change caused by radiation transmission through the amplifier, a wave front change caused by radiation transmission through the saturable absorption cell, and a wave front change caused by beam transmission through the focusing optical system.

In a first case, the wave front compensator is constituted by a reflection mirror and a VRWM with an incident angle of 45 degrees to compensate a wave front change caused by the amplifier (FIGS. 30A and 30B). Further, two beam profilers are disposed at different layout positions (FIG. 37). In the first case, to compensate a wave front change caused by the saturable absorber, the wave front compensator is constituted by a reflection mirror and a VRWM with an incident angle of 45 degrees (FIGS. 30A and 30B), and the sensor shown in FIG. 37 is used.

Figure 45:
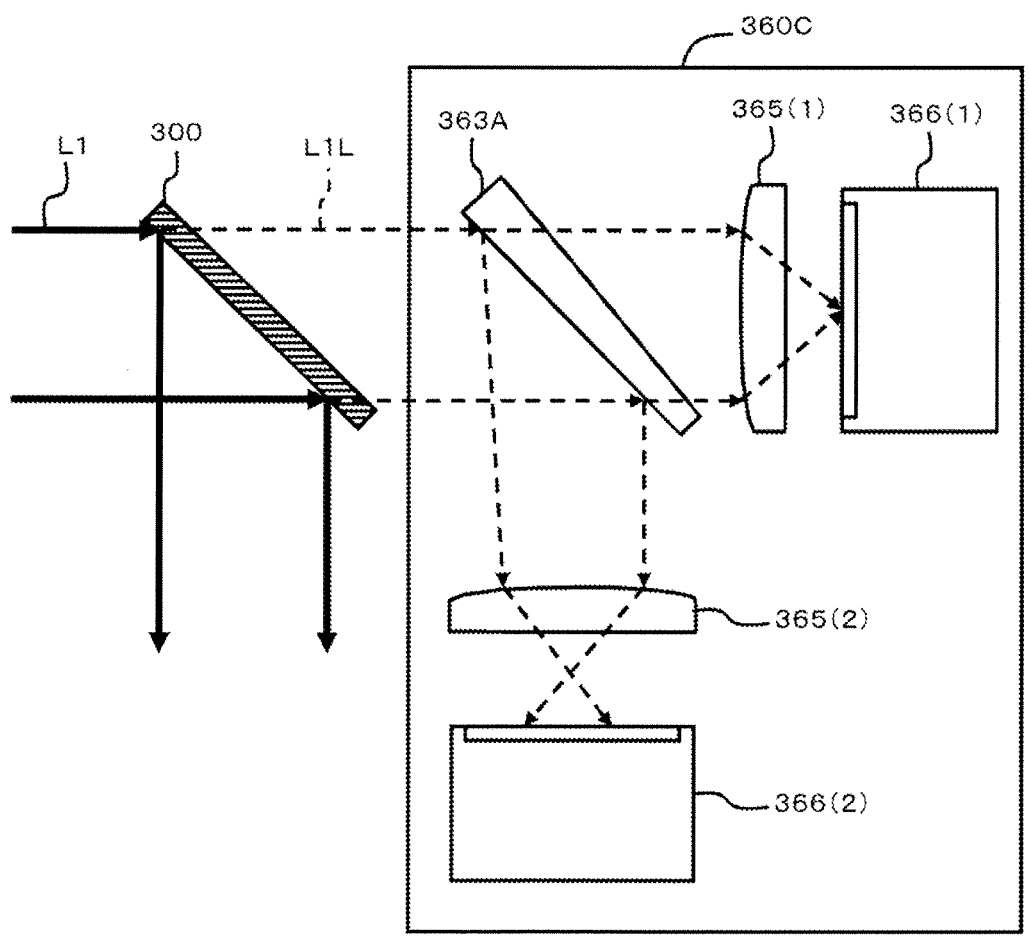
FIG. 45 is a configurational diagram of an optical sensor unit according to a twenty-eighth embodiment.

In the "beam delivery and focusing optical system" in the first case, the configuration shown in FIGS. 31A and 31B is employed as the wave front compensator, and the configuration of the pointing sensor and the beam profiler, which have been described referring to FIG. 45, is employed as the sensor. The configuration shown in FIG. 13 is employed as an isolator.

In the first case, a plurality of wave front compensators positioned on the line of driver laser beam are constituted by a reflection optical system, and the focusing optical system takes the simple configuration of a reflection optical system. Therefore, a heat-originated wave front change can be made smaller as compared with the case where the transmission optical system is employed.

Further, the use of the simple beam profiler and pointing sensor as a sensor can ensure sufficient detection of even a wavelength of 10.6 μm of a CO2 laser or the like.

A second case will be described. The configurations of a wave front compensator and a sensor to compensate a wave front change caused by the amplifier are the same as those of the first case (FIGS. 30A and 30B, FIG. 37). A deformable mirror is used for the wave front compensator to compensate a wave front change caused by the saturable absorber (FIGS. 30A and 30B, FIG. 37). Further, a wave front sensor shown in FIG. 42 is used as the sensor. Accordingly, the wave front which is changed to a complicated wave front shape by the thermal load can be compensated to a fine wave front by the deformable mirror. In addition, the wave front sensor can accurately measure the wave front of laser beam.

In the "beam delivery and focusing optical system" in the second case, the configuration including an off-axis parabolic mirror (FIGS. 19A and 19B or FIG. 20) is used. The wave front sensor shown in FIG. 42 is employed as the sensor. The configuration shown in FIG. 13 is employed as an isolator.

In the second case, the deformation of a wave front caused by the saturable absorber can be compensated with high accuracy. Further, because the wave front sensor shown in FIG. 42 is employed as the sensor in the "beam delivery and focusing optical system", laser beam can be irradiated on a target (droplets) while detecting the performance of focusing the laser beam on the target, so that the output energy of EUV radiation can be made more stable.

Figure 46:
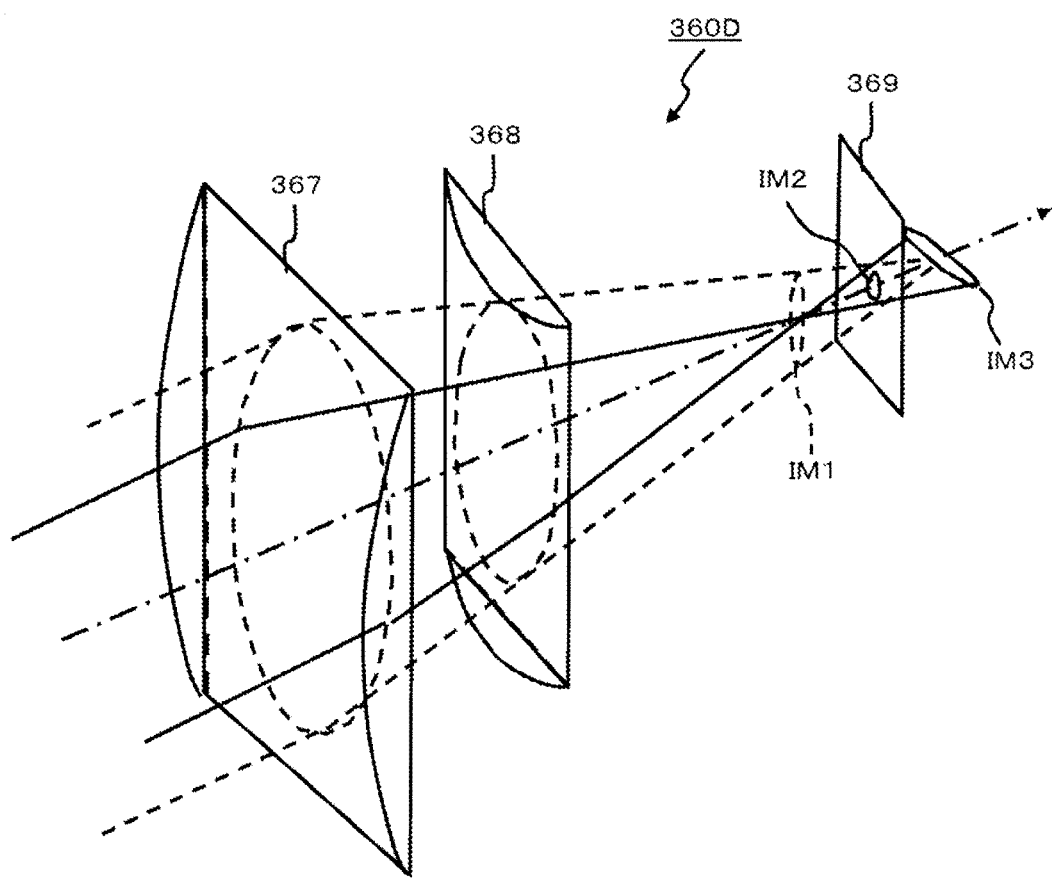
FIG. 46 is a configurational diagram of an optical sensor unit according to a twenty-ninth embodiment.

A third case will be described. The wave front compensator is constituted by a reflection mirror and a VRWM with an incident angle of 45 degrees to compensate a wave front change caused by the amplifier (FIGS. 30A and 30B). Further, two beam profilers are disposed at different layout positions (FIG. 37). The configuration shown in FIGS. 31A and 31B is used for the wave front compensator to compensate a wave front change caused by the amplifier, and the configuration shown in FIG. 46 is used for the sensor. The wave front compensator and sensor of the saturable absorber are the same as those of the second case.

Figure 34:
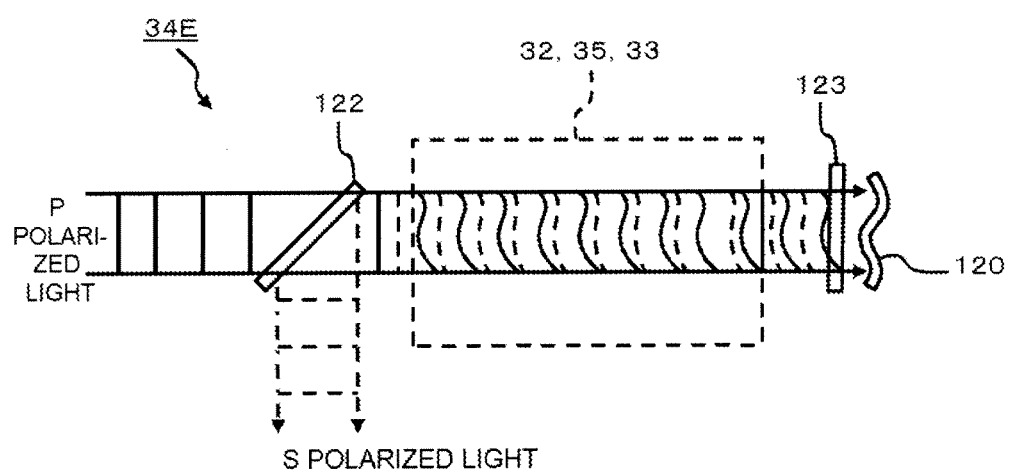
FIG. 34 is a configurational diagram of a wave front compensator according to an eighteenth embodiment.
Figure 42:
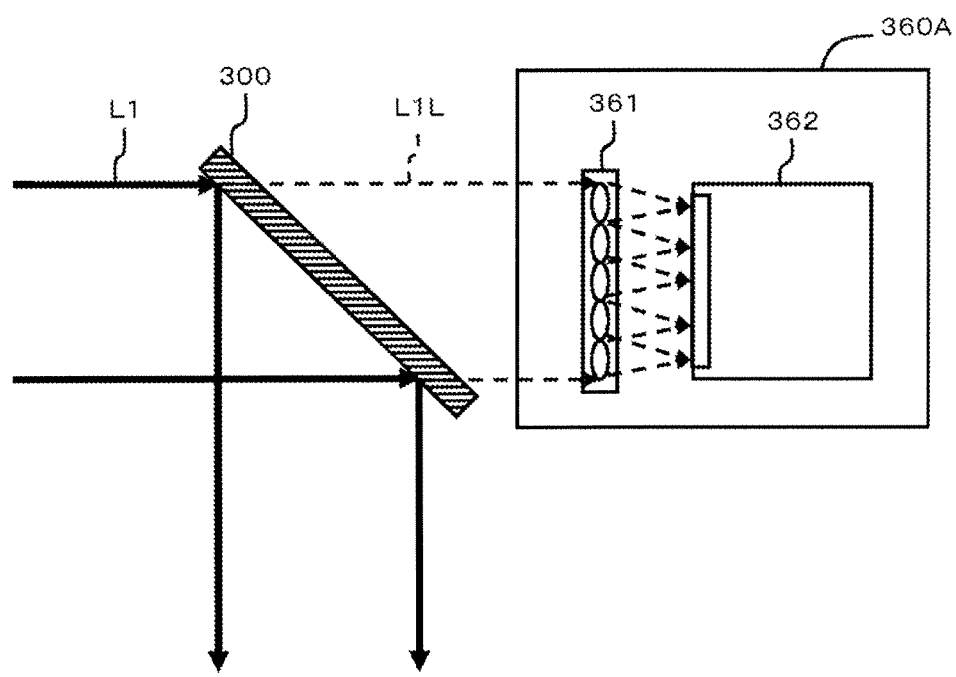
FIG. 42 is a configurational diagram of an optical sensor unit according to a twenty-sixth embodiment.
Figure 43:
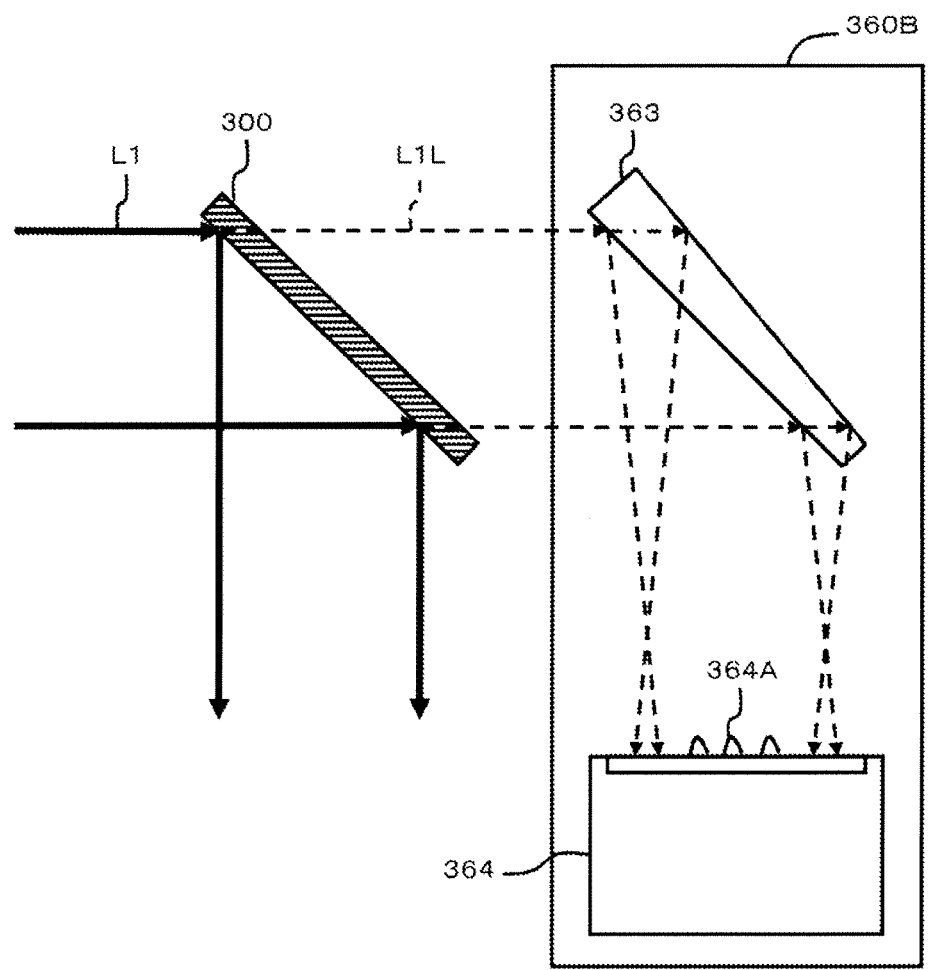
FIG. 43 is a configurational diagram of an optical sensor unit according to a twenty-seventh embodiment.

In the "beam delivery and focusing optical system" in the third case, the configuration shown in FIG. 33 or FIG. 34 is employed as the wave front compensator, and the configuration of the wave front sensor shown in FIG. 42 is employed as the sensor. The isolator and the focusing optical system are the same as those of the first case and the second case.

In the third case, the deformation of a wave front caused by the saturable absorber can be compensated with high accuracy. Further, because a deformable mirror is employed as the wave front compensator in the "beam delivery and focusing optical system", and a wave front sensor is employed as the sensor, laser beam can be irradiated on a target while detecting the performance of focusing the laser beam on the target. Therefore, the stability of the output energy of EUV radiation can be improved more than the second case.

Thirty-Second Embodiment

Figure 54:
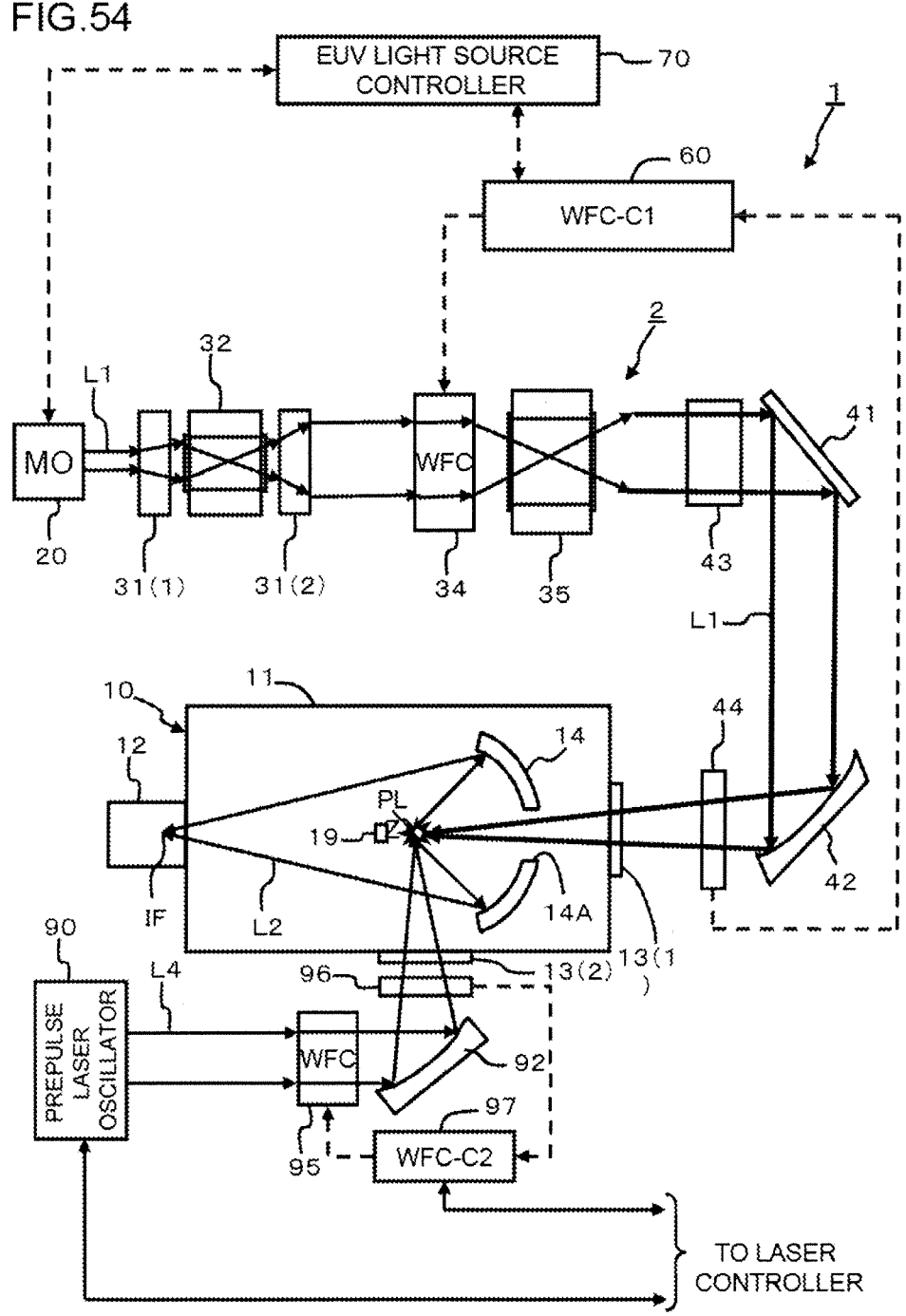
FIG. 54 is a configurational diagram of an EUV light source device according to a thirty-second embodiment.

A thirty-second embodiment will be described referring to FIG. 54. In this embodiment, the configuration of a prepulse laser and the configuration for compensating the optical characteristic of the prepulse laser are added to the configuration shown in FIG. 1. When droplets DP reach a predetermined position, prepulse laser beam L4 is irradiated on the droplets DP. As a result, the target material is expanded. Therefore, the density of the target material at the predetermined position where the driver laser beam L1 is irradiated can be lowered to a proper value, thus making it possible to increase the generation efficiency of EUV radiation.

According to the embodiment, therefore, a prepulse laser oscillator 90 and an off-axis parabolic concave mirror 92 for feeding the prepulse laser beam into the chamber 10 through a window 13(2) are provided. For example, the basic wave, second harmonics, third harmonics or fourth harmonics of a YAG laser can be used as the prepulse laser beam. Alternatively, the basic wave or harmonic radiation of a pulse-oscillating titanium sapphire laser may be used as the prepulse laser beam. According to the embodiment, for example, though not illustrated, the target material supply unit which supplies droplets DP supplies the droplets DP to the position of the prepulse laser focusing point in a direction perpendicular to the surface of a sheet.

Because the tin droplets DP have a diameter of 100 μm or less, it is necessary to control the beam shape and the focusing position with high accuracy to irradiate the prepulse laser beam on the target. According to the embodiment, therefore, a mechanism for automatically compensating the optical performance of the prepulse laser beam L4 is provided as described in the foregoing descriptions of the individual embodiments. The "optical performance" herein means the focused shape or position of radiation, or pointing thereof.

A wave front compensation unit 95 as the "third compensation unit" is provided between the prepulse laser oscillator 90 and the off-axis parabolic concave mirror 92. A sensor 96 as the "third detection unit" is provided between the off-axis parabolic concave mirror 92 and the window 13(2).

The prepulse laser beam L4 is input to the off-axis parabolic concave mirror 92 via the wave front compensation unit 95, and is reflected toward the window 13(2). The sensor 96 detects the optical performance of the prepulse laser beam L4 traveling toward the chamber 10, and outputs the detection result to a wave front compensation controller 97. Then, the wave front compensation controller 97 controls the wave front compensation unit 95 so that the optical performance of the prepulse laser beam L4 becomes a predetermined value.

According to the invention with the above configuration, the prepulse laser beam L4 is irradiated on the target material before the driver laser beam L1 is irradiated on the target material, so that the generation efficiency of EUV radiation L2 can be made higher than that achieved by the first embodiment. Further, because the curvature of the wave front of prepulse laser beam and the direction thereof can be adjusted in the embodiment, the prepulse laser beam can be irradiated on the target material more accurately, thus increasing the efficiency.

Thirty-Third Embodiment

Figure 55:
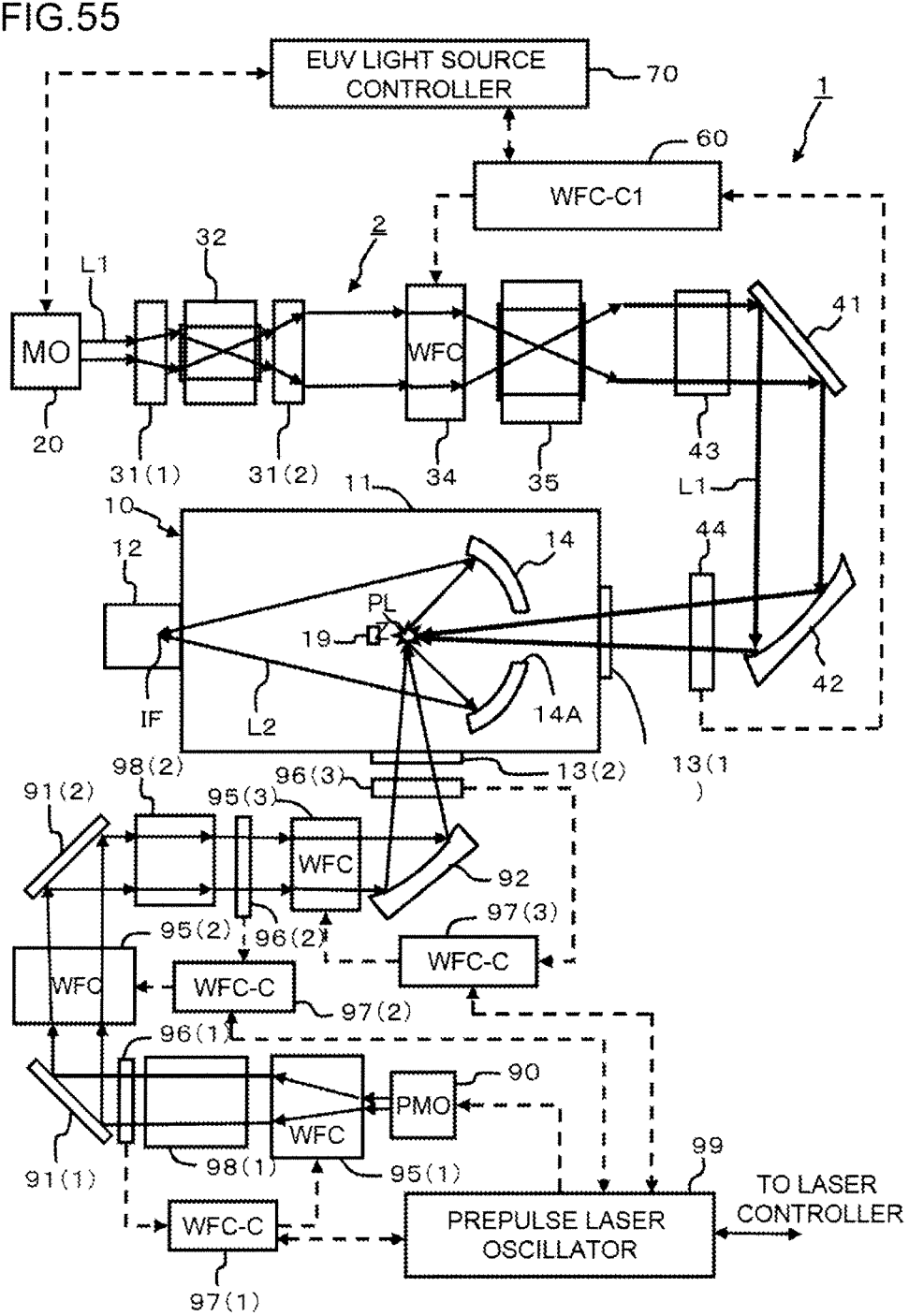
FIG. 55 is a configurational diagram of an EUV light source device according to a thirty-third embodiment.

A thirty-third embodiment will be described referring to FIG. 55. In this embodiment, prepulse laser beam is amplified by a plurality of amplifiers 98(1) and 98(2) before being supplied into the chamber 10.

The prepulse laser beam output from the prepulse laser oscillator 90 is input to the first amplifier 98(1) via a first wave front compensation unit 95(1) to be amplified. The amplified prepulse laser beam passes through a first sensor 96(1) to enter a reflection mirror 91(1) to be reflected. A first wave front compensation controller 97(1) operates the wave front compensation unit 95(1) based on a detection signal from the sensor 96(1) provided at the output side of the amplifier 98(1). Accordingly, the shape of the wave front of prepulse laser beam which passes through the amplifier 98(1) and the direction of the wave front are adjusted to desired values.

The prepulse laser beam reflected by the reflection mirror 91(1) is input to another reflection mirror 91(2) via a second wave front compensation unit 95(2), and is reflected by the reflection mirror 91(2). The prepulse laser beam reflected by the reflection mirror 91(2) passes through the second amplifier 98(2) to be amplified further. A second wave front compensation controller 97(2) operates the wave front compensation unit 95(2) based on a detection signal from a sensor 96(2) provided at the output side of the amplifier 98(2). Accordingly, the shape of the wave front of prepulse laser beam which passes through the amplifier 98(2) and the direction of the wave front are adjusted to desired values.

The prepulse laser beam amplified by the amplifier 98(2) passes through the second sensor 96(2) to be input to a third wave front compensation unit 95(3). The prepulse laser beam which has passed through the third wave front compensation unit 95(3) is input to the off-axis parabolic concave mirror 92 to be reflected. The reflected prepulse laser beam passes through the window 13(2) to be irradiated on the target material in the chamber 10. A third wave front compensation controller 97(3) operates the wave front compensation unit 95(3) based on a detection signal from a sensor 96(3) provided at the input side of the window 13(2). Accordingly, the shape of the wave front of prepulse laser beam input into the chamber 10 and the direction of the wave front are adjusted to desired values.

A prepulse laser controller 99 operates the prepulse laser oscillator 90 based on an instruction from the laser controller 60. Further, the prepulse laser controller 99 controls the individual wave front compensation controllers 97(1) to 97(3) to compensate the wave front and angle of prepulse laser beam. When wave front compensation on the prepulse laser beam is completed, the prepulse laser controller 99 notifies the laser controller 60 of the completion.

The embodiment with this configuration also has advantages similar to those of the thirty-second embodiment. Further, because prepulse laser beam is amplified multiple times using a plurality of amplifiers 98(1), 98(2) in the embodiment, prepulse laser beam with higher power can be acquired.

When the plurality of amplifiers 98(1), 98(2) are used, errors occur in the wave front and position or direction of prepulse laser beam due to the heat-originated deformation or the like of the optical system. According to the embodiment, however, the use of a plurality of wave front compensation units 95(1) to 95(3) and a plurality of sensors 96(1) to 96(3) can compensate the prepulse laser beam at plural locations. According to the embodiment, therefore, prepulse laser beam with relatively high power can be irradiated on the target material accurately and stably, thus improving the reliability and output efficiency.

Thirty-Fourth Embodiment

A thirty-fourth embodiment will be described referring to FIG. 56. The description of this embodiment will be given of a case where the unique laser light source device of the invention is adapted to a vacuum vapor deposition device 500.

Figure 56:
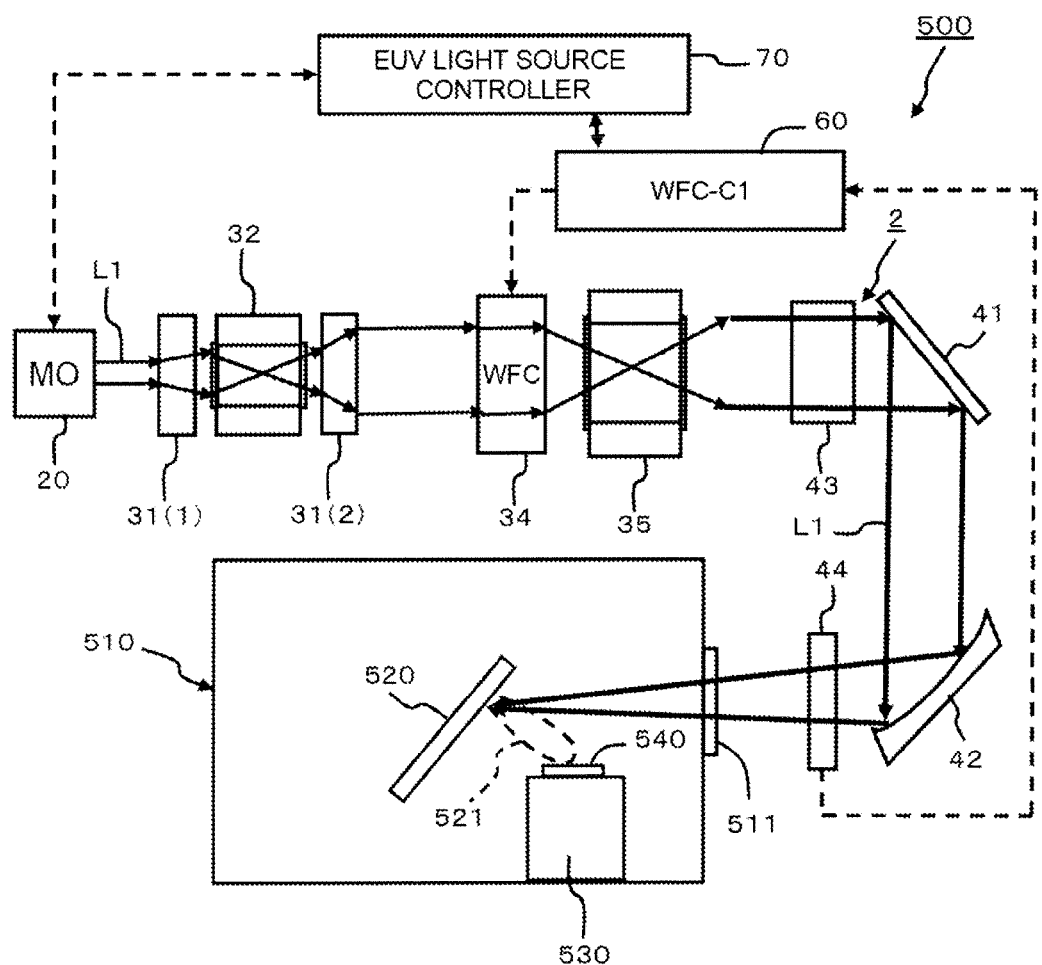
FIG. 56 is a configurational diagram of a vapor deposition device according to a thirty-fourth embodiment.

FIG. 56 is a general configurational diagram of the vacuum vapor deposition device 500. This vapor deposition device 500 has the above-described laser light source device 2. A vapor deposition chamber 510 has a window 511. A target material 520, a substrate mounting plate 530, and a substrate 540 to be subjected to vapor deposition are provided in the vapor deposition chamber 510.

Driver laser beam output from the laser light source device 2 passes through the window 511 to be input to the target material 520, causing ablation 521. A part of the target material which has caused the ablation is deposited on the top surface of the substrate 540 placed on the plate 530.

As apparent from the above, the laser light source device according to the invention can be adapted to the vacuum vapor deposition device 500 as well as the extreme ultraviolet light source device. Further, the laser light source device according to the invention can also be adapted to, for example, perforating, glass processing or the like using ablation.

Thirty-Fifth Embodiment

A thirty-fifth embodiment will be described referring to FIGS. 57 to 59. In embodiments to be described below including the thirty-fifth embodiment, a mirror 600 for inputting laser beam to an optical element (e.g., VRWM 200H) to compensate the curvature of the wave front is provided with a function of cooling the mirror surface in axial symmetry. It is noted that other mirrors than the mirror for inputting laser beam to the VRWM can also be provided with the cooling function of the embodiment to be discussed below.

Figure 57:
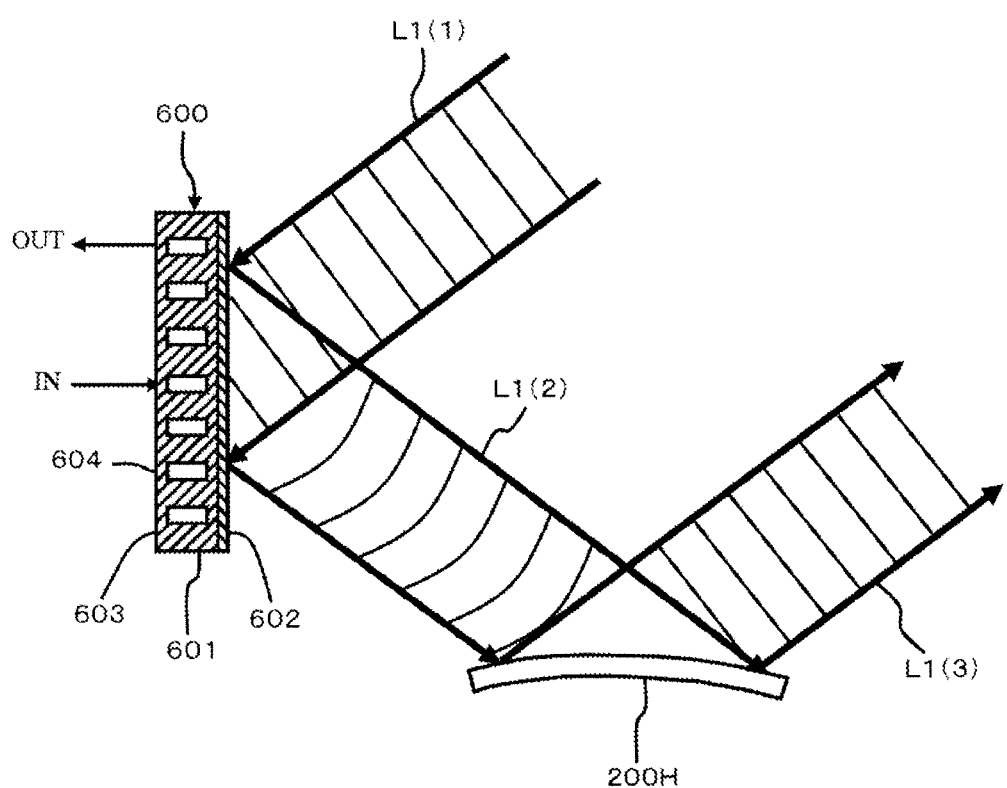
FIG. 57 is an explanatory diagram showing the relationship between a mirror and a wave front curvature compensator according to a thirty-fifth embodiment.
Figure 58:
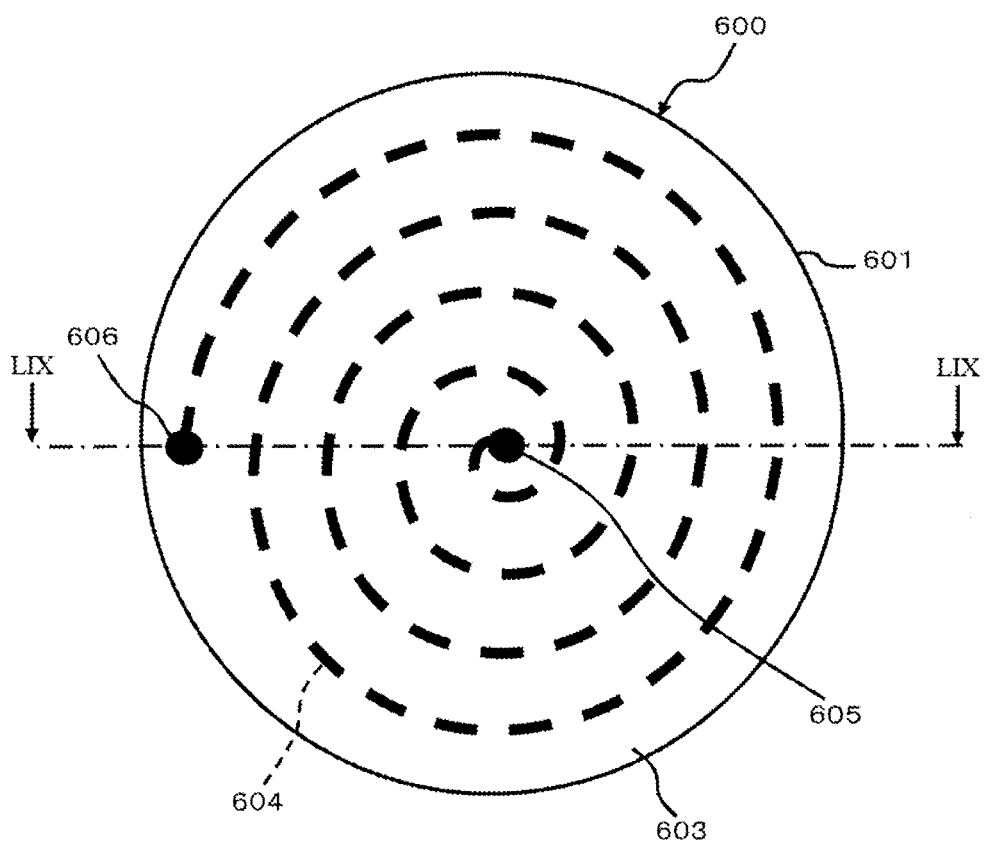
FIG. 58 is a rear view of the mirror.

FIG. 57 is an explanatory diagram showing the relationship between the VRWM 200H and a cooling-function equipped mirror (hereinafter referred to as "mirror") 600. The mirror 600 reflects input laser beam L1(1). The reflected laser beam L1(2) is input to the VRWM 200H to be reflected as laser beam L1(3).

Heat from the laser beam L1(1) is transmitted to the mirror 600. Therefore, thermal expansion or the like would cause irregular deformation on a mirror surface 602 if no measure were taken against the heat. If the mirror surface 602 is deformed irregularly, the wave front of the laser beam L1(2) reflected at the mirror surface 602 becomes an irregular shape. The irregular shape is a shape which is neither a concave wave nor a convex wave, i.e., a shape which is not axially symmetrical to the optical axis.

If the shape of the wave front of the laser beam L1(2) reflected by the mirror 600 becomes axially asymmetrical to the optical axis, the VRWM 200H cannot shape the wave front of the laser beam L1(2) to a plane wave. This is because the VRWM 200H, unlike the deformable mirror capable of coping with various wave front shapes, can cope only with a concave wave or convex wave which is symmetrical to the optical axis.

In this respect, the mirror 600 is provided with the function of cooling the mirror surface 602 in the axially symmetrical fashion, so that even when the mirror surface 602 is deformed by the heat, it is deformed in an axially symmetrical shape. Accordingly, when the plane-wave laser beam L1(1) is input to the mirror 600, the wave front of the laser beam L1(2) reflected by the mirror 600 becomes a convex shape, for example. The VRWM 200H reflects the convex-wave laser beam L1(2) to have a plane wave.

Referring to the rear view of the mirror in FIG. 58, the cooling structure of the mirror 600 will be described. A mirror body 601 of a metal material having a high thermal conductivity is formed into a disk shape. The reflection or mirror surface 602 for reflecting laser beam is formed on one side of the mirror body 601.

A spiral cooling passage 604 which stretches outward from the center is formed in the mirror body 601. One end of the cooling passage 604 communicates with a flow inlet 605 open in a rear side 603 of the mirror 600 at the center portion. The other end of the cooling passage 604 communicates with a flow outlet 606 open in the outer periphery of the rear side 603.

Figure 59:
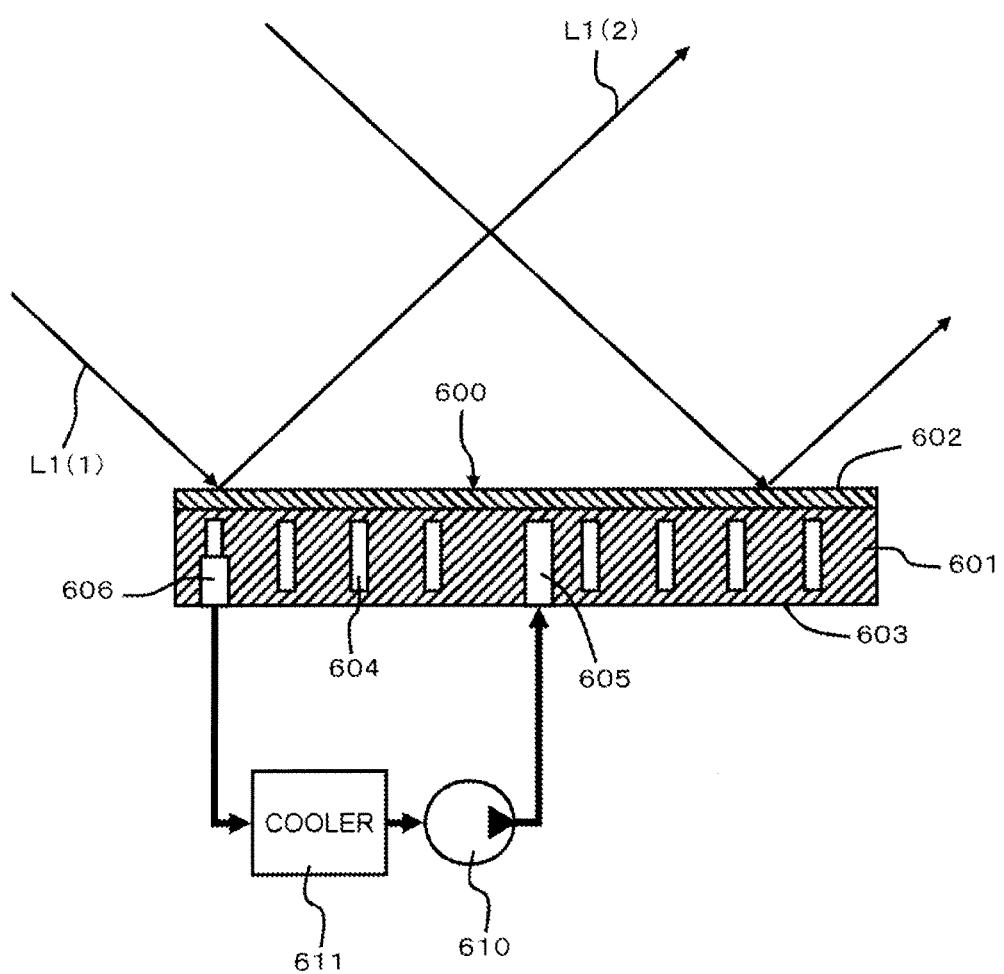
FIG. 59 is a cross-sectional view of the mirror.

FIG. 59 is a cross-sectional view of the mirror 600. A cooling pump 610 is connected to the flow inlet 605. A cooler 611 is connected to the flow outlet 606. A coolant like water which is cooled by the cooler 611 is discharged toward the flow inlet 605 from the cooling pump 610. The coolant which has flowed to the center portion of the mirror 600 cools the mirror surface 602 while flowing outward from the center. As a result, the center portion of the mirror surface 602 is cooled the most. The coolant flows spirally to cool the mirror surface 602 in such a way that the temperature of the mirror surface 602 shows an axially symmetrical distribution. While water is used as the coolant by way of example, a substance other than water may be used as well. Subsidiary structures, such as a cooling tank and filter, are not shown.

According to the embodiment with this configuration, the mirror 600 which input laser beam to the element 200H for compensating the wave front is provided with the cooling function to cool the mirror surface 602 in such a way that the temperature distribution of the mirror surface 602 becomes axially symmetrical. Even when the mirror surface 602 is deformed by heat, therefore, the mirror surface 602 can be deformed axially symmetrically, so that the wave front of laser beam can be compensated by the VRWM 200H.

Thirty-Sixth Embodiment

Figure 60:
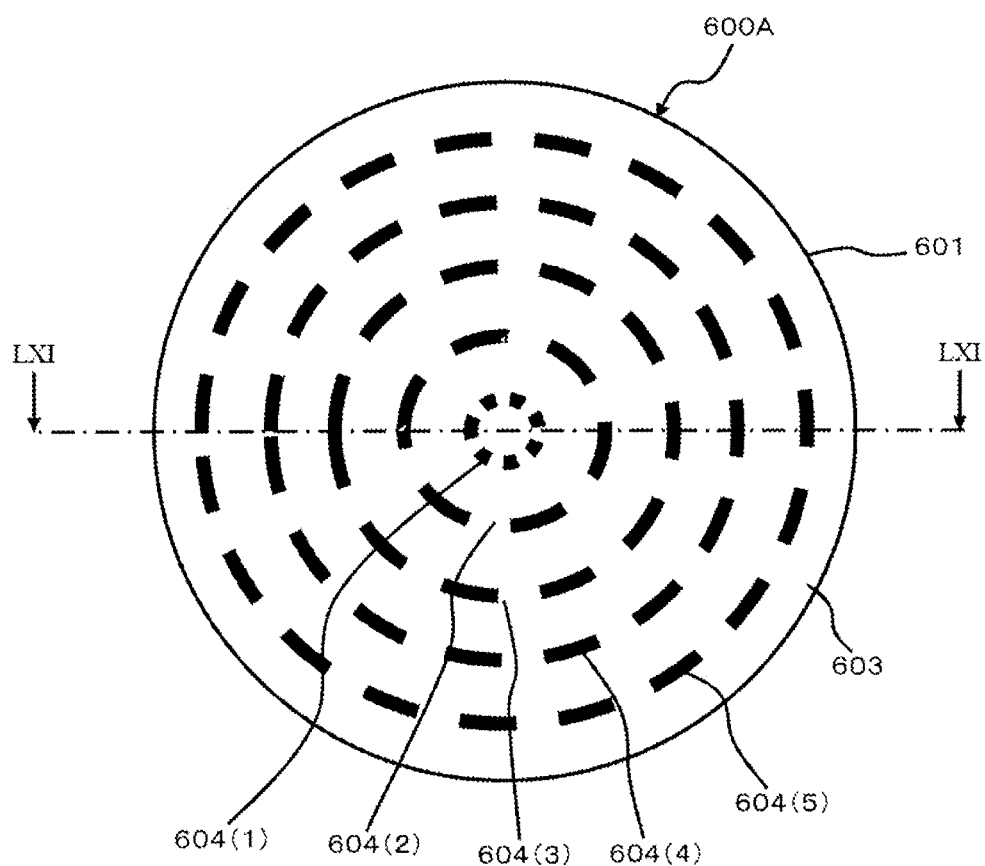
FIG. 60 is a rear view of a mirror according to a thirty-sixth embodiment.

A thirty-sixth embodiment will be described referring to FIGS. 60 and 61. FIG. 60 is a rear view of a mirror 600A according to this embodiment. A plurality of annular cooling passages 604(1) to 604(5) are concentrically provided in the mirror body 601.

Figure 61:
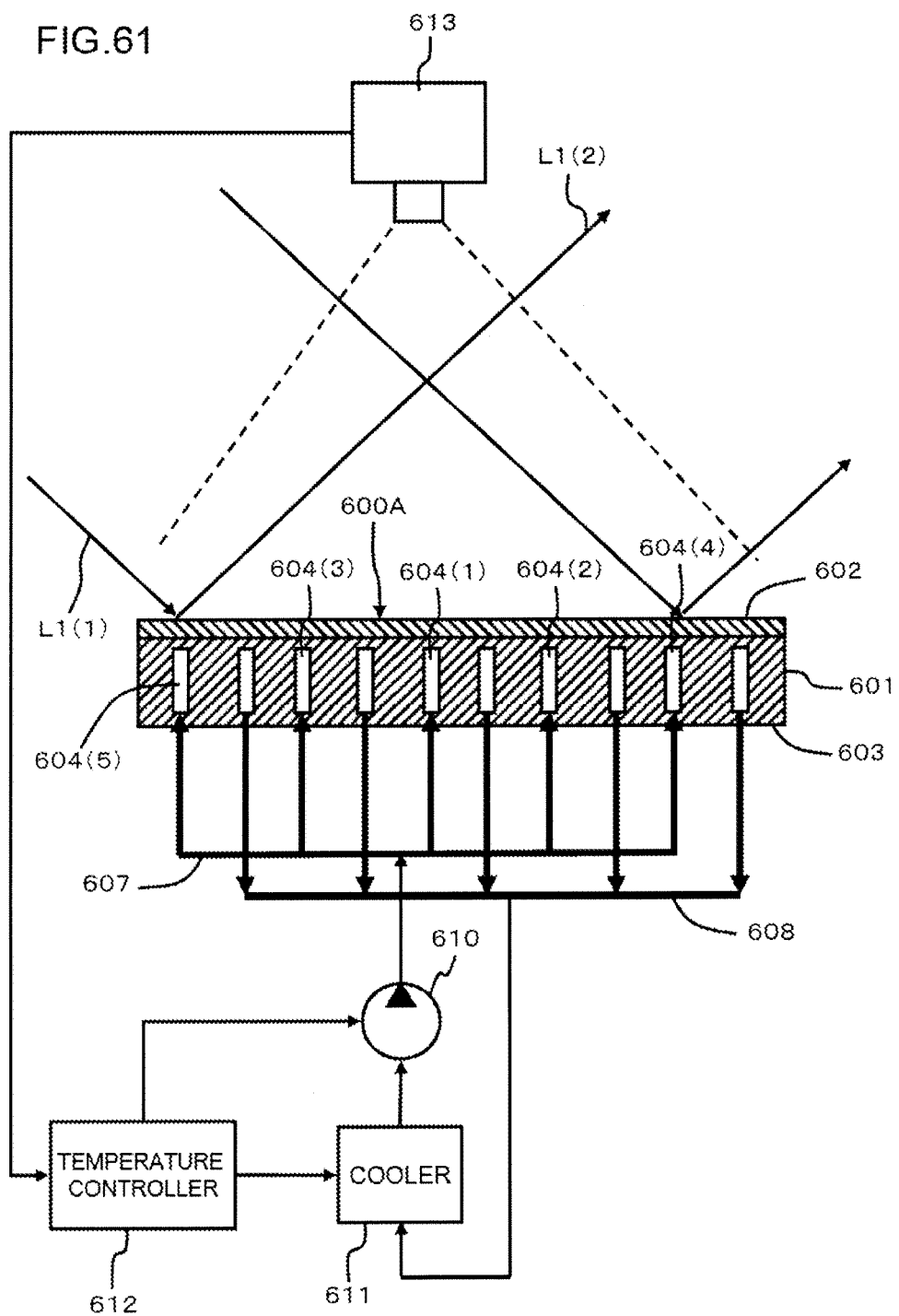
FIG. 61 is a cross-sectional view of the mirror.

FIG. 61 is a cross-sectional view of the mirror 600A. Each of the annular cooling passages 604(1) to 604(5) is provided with a flow inlet and a flow outlet apart from each other in the diametrical direction. The individual flow inlets are connected to the discharge port of the cooling pump 610 via a common flow-in passage 607. The individual flow outlets are connected to the flow inlet of the cooler 611 via a common flow-out passage 608.

The temperature of the surface 602 of the mirror 600A is detected by a temperature sensor 613 configured like a radiation thermometer. A temperature controller 612 controls the discharge rate of the cooling pump 610 and the coolant temperature based on the mirror surface temperature detected by the temperature sensor 613.

It is noted that, for example, a restriction part may be provided in a midway of a pipe for supplying the coolant to each of the annular cooling passages 604(1) to 604(5), and the flow area of the restriction part is variably controlled by the temperature controller 612. If the flow area of the restriction part provided in the cooling passage 604(1) in the center portion of the mirror 600A is increased, for example, the mirror's center portion can be cooled intensely. The embodiment with this configuration also has advantages similar to those of the thirty-fifth embodiment.

Thirty-Seventh Embodiment

Figure 62:
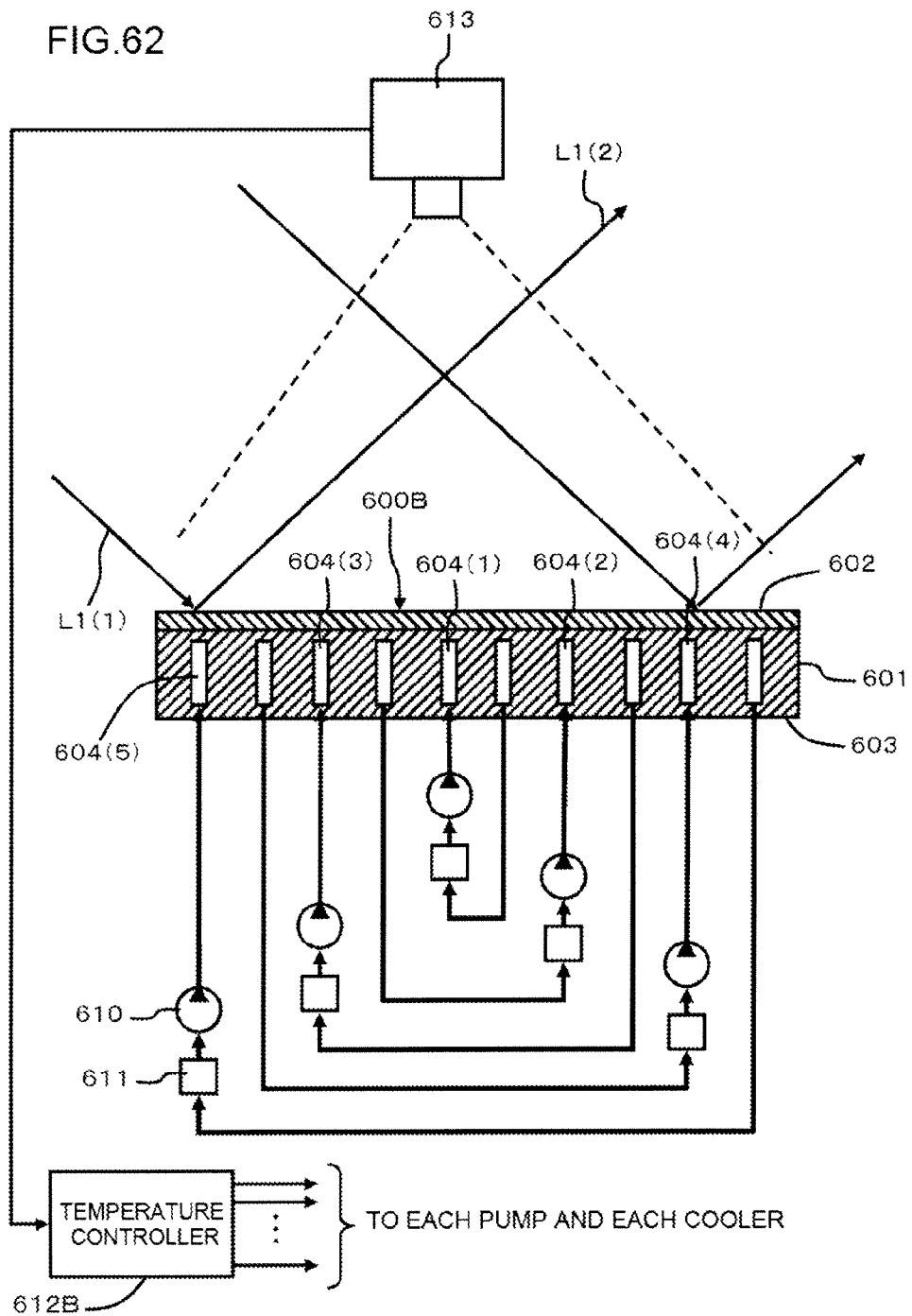
FIG. 62 is a cross-sectional view of a mirror according to a thirty-seventh embodiment.

A thirty-seventh embodiment will be described referring to FIG. 62. In the embodiment, each of the annular cooling passages 604(1) to 604(5) in the thirty-sixth embodiment is provided with the pump 610 and the cooler 611. FIG. 62 shows reference numerals affixed to some of the pumps and the coolers for the sake of convenience.

A temperature controller 612B individually controls the flow rates and temperatures of the coolants flowing in the cooling passages 604(1) to 604(5) based on a signal from the temperature sensor 613. The embodiment with this configuration also has advantages similar to those of the thirty-fifth embodiment. Further, because the flow rates and temperatures of the coolants to be supplied to the cooling passages 604(1) to 604(5) provided concentrically can be individually controlled according to the embodiment, the temperature of the mirror surface 602 can be cooled more property.

Thirty-Eighth Embodiment

A thirty-eighth embodiment will be described referring to FIG. 63. FIG. 63 is a cross-sectional view of a cooling-function equipped mirror according to the embodiment. A plurality of cooling elements 620, for example, are disposed in the mirror body 601. Further, temperature sensors 621 for detecting the temperature of the mirror surface 602 are provided in the mirror body 601. The cooling element 620 is configured as, for example, an element which utilizes the Peltier effect. Of both ends of the cooling element 620, the end portion on the side of the mirror surface 602 absorbs heat, while the end portion on the side of the rear side 603 discharges heat.

A temperature controller 612C individually controls the operations of the cooling elements 620 based on detection signals from the temperature sensors 621. The embodiment with this configuration also has advantages similar to those of the thirty-seventh embodiment.

What is claimed is:

1. A laser light source device for use in an extreme ultraviolet light source device, comprising:
    a laser oscillator that outputs laser beam;
    an amplification system that amplifies the laser beam output from the laser oscillator by at least one amplifier; and
    a focusing system that inputs the laser beam, amplified by the amplification system, into a chamber of the extreme ultraviolet light source device,
    at least the amplification system being provided with
        at least one first compensation unit that compensates a direction of laser beam and a shape of a wave front thereof in the amplification system to a predetermined direction and a predetermined wave front shape, and
        at least one compensation control unit that controls a compensation operation by the first compensation unit.

2. A laser light source device comprising:
    a laser oscillator that outputs laser beam;
    an amplification system that amplifies the laser beam output from the laser oscillator by at least one amplifier; and
    a focusing system that inputs the laser beam, amplified by the amplification system, into a chamber of the extreme ultraviolet light source device,
    at least the amplification system being provided with
        at least one first compensation unit that compensates a direction of laser beam and a shape of a wave front thereof in the amplification system to a predetermined direction and a predetermined wave front shape, and
        at least one compensation control unit that controls a compensation operation by the first compensation unit.

3. The laser light source device according to claim 2, wherein a diamond window is used as a window of the chamber, or a window of the amplifier.

4. The laser light source device according to claim 2, wherein a plurality of first compensation units are provided in the amplification system, and
    the compensation control unit controls the compensation operations of the first compensation units in order from one located upstream in a traveling direction of the laser beam to compensate the direction of the laser beam and the shape of the wave front thereof to the predetermined direction and the predetermined wave front shape.

5. The laser light source device according to claim 2, wherein a mirror for inputting the laser beam to the first compensation unit is provided with a cooling mechanism for cooling a mirror surface in an axial symmetrical fashion.

6. The laser light source device according to claim 2, wherein the first compensation unit includes a mirror of which curvature of a reflection surface is varied based on a signal from compensation control unit.

7. The laser light source device according to claim 2, wherein the first compensation unit includes a deformable mirror of which shape of a reflection surface is transformed based on a signal from the compensation control unit.

8. The laser light source device according to claim 2, wherein the first compensation unit includes a mirror capable of rotating so that an incident angle of the laser beam thereto is changed based on a signal from the compensation control unit.

9. The laser light source device according to claim 2, wherein the first compensation unit includes two mirrors each of which is capable of rotating so that an incident angle of the laser beam thereto is changed based on a signal from the compensation control unit.

10. The laser light source device according to claim 2, wherein the focusing system has an isolator including a first mirror which absorbs a first polarization component in the laser beam and reflects a second polarization component in the laser beam different from the first component in the laser beam.

11. The laser light source device according to claim 10, wherein the isolator further includes a second mirror which reflects the laser bean while giving a phase difference of $\pi/2$ to the laser beam.

12. A laser light source device comprising:
    a laser oscillator that outputs laser beam;
    an amplification system that amplifies the laser beam output from the laser oscillator by at least one amplifier; and
    a focusing system that inputs the laser beam, amplified by the amplification system, into a chamber of the extreme ultraviolet light source device,
    at least the amplification system being provided with
        at least one first compensation unit that compensates a direction of laser beam in the amplification system to a predetermined direction,
        at least one compensation control unit that controls a compensation operation by the compensation unit, wherein
    a plurality of first compensation units are provided in the amplification system, and
    the compensation control unit controls the compensation operations of the first compensation units in order from one located upstream in a traveling direction of the laser beam to compensate the direction of the laser beam to the predetermined direction.

13. The laser light source device according to claim 12, wherein a mirror for inputting the laser beam to the first compensation unit is provided with a cooling mechanism for cooling a mirror surface in an axial symmetrical fashion.

14. The laser light source device according to claim 12, wherein a diamond window is used as a window of chamber, or a window of the amplifier.

15. The laser light source device according to claim 12, wherein the first compensation unit includes a mirror capable of rotating so than an incident angle of the laser beam thereto is changed based on a signal from the compensation control unit.

16. The laser light source device according to claim 12, wherein the first compensation unit includes two mirrors each of which is capable of rotating so than an incident angle of the laser beam thereto is changed based on a signal from the compensation control unit.

17. The laser light source device according to claim 12, wherein the focusing system has an isolator including a first mirror which absorbs a first polarization component in the laser beam and reflects a second polarization component in the laser beam different from the first component in the laser beam.

18. The laser light source device according to claim 17, wherein the isolator further includes a second mirror which reflects the laser beam while giving a phase difference of $\pi/2$ to the laser beam.

* * * * *